United States Patent
Tandai et al.

(10) Patent No.: US 9,398,549 B2
(45) Date of Patent: Jul. 19, 2016

(54) WIRELESS COMMUNICATION APPARATUS FOR ESTABLISHING WIRELESS CONNECTION USING SINGLE OPERATIONAL MODE FOR BOTH TRANSMISSION AND RECEPTION OF CONNECTION REQUEST AND RESPONSE SIGNALS, AND METHOD FOR SAME

(75) Inventors: Tomoya Tandai, Kawasaki (JP); Koji Akita, Yokohama (JP); Takeshi Tomizawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1064 days.

(21) Appl. No.: 13/223,928

(22) Filed: Sep. 1, 2011

(65) Prior Publication Data

US 2012/0129463 A1 May 24, 2012

(30) Foreign Application Priority Data

Nov. 19, 2010 (JP) .................................. 2010-259446

(51) Int. Cl.
*H04B 17/00* (2015.01)
*H04W 56/00* (2009.01)

(52) U.S. Cl.
CPC ............... *H04W 56/00* (2013.01); *H04B 17/00* (2013.01)

(58) Field of Classification Search
CPC ............. H04B 17/00; H04B 7/26; H04B 1/16
USPC .............. 455/67.11, 78, 73, 83, 84, 502, 522
See application file for complete search history.

(56) References Cited

U.S. PATENT DOCUMENTS

| 8,233,456 | B1 * | 7/2012 | Kopikare | .......... | H04W 52/0216 |
|---|---|---|---|---|---|
| | | | | | 370/332 |
| 8,289,987 | B2 * | 10/2012 | Adachi | ............. | H04W 72/1289 |
| | | | | | 370/334 |

(Continued)

FOREIGN PATENT DOCUMENTS

| JP | 2003-087180 | * | 3/2003 |
|---|---|---|---|
| JP | 2003-87180 A | | 3/2003 |

(Continued)

*Primary Examiner* — MD Talukder
(74) *Attorney, Agent, or Firm* — Holtz, Holtz & Volek PC

(57) ABSTRACT

According to one embodiment, a wireless communication apparatus includes following units. The first timer measures first time intervals. The second timer measures second time intervals. The time interval selection unit selects a second time interval among second time intervals included in each first time interval. The control unit controls the transmitting unit and the receiving unit to operate, during the selected second time interval, in a first operational state in which a transmission of a connection request signal and a wait for reception of a response signal are repeatedly performed, and to operate, during each of the second time intervals other than the selected second time interval, in a second operational state in which a wait for reception of a connection request signal transmitted by another apparatus is performed for a third time interval shorter than each of the second time intervals.

9 Claims, 38 Drawing Sheets

(56) References Cited

U.S. PATENT DOCUMENTS

| | | | | |
|---|---|---|---|---|
| 8,891,492 B1* | 11/2014 | Kopikare | .......... | H04W 52/0216 370/332 |
| 2005/0111420 A1* | 5/2005 | Fujii | .................... | G06K 7/0008 370/338 |
| 2007/0218897 A1* | 9/2007 | Yukizaki | ................ | H04W 72/04 455/432.1 |
| 2009/0111485 A1* | 4/2009 | Kitani | .................. | H04W 48/18 455/456.1 |
| 2011/0021235 A1* | 1/2011 | Laroia | ................. | H04W 52/367 455/522 |
| 2011/0207465 A1* | 8/2011 | Dwyer | ................ | H04W 76/046 455/450 |
| 2012/0129463 A1* | 5/2012 | Tandai | ................... | H04W 56/00 455/67.11 |
| 2012/0170556 A1* | 7/2012 | Tsfati | ................ | H04W 72/1215 370/338 |
| 2012/0170557 A1* | 7/2012 | Tsfati | ................ | H04W 72/1215 370/338 |
| 2012/0220228 A1* | 8/2012 | Tandai | ................... | H04W 72/02 455/41.1 |
| 2013/0028346 A1* | 1/2013 | Hottinen | ................ | H04W 16/14 375/285 |

FOREIGN PATENT DOCUMENTS

| | | | |
|---|---|---|---|
| JP | 2007-202134 A | | 8/2007 |
| JP | 2007202134 A | * | 8/2007 |

* cited by examiner

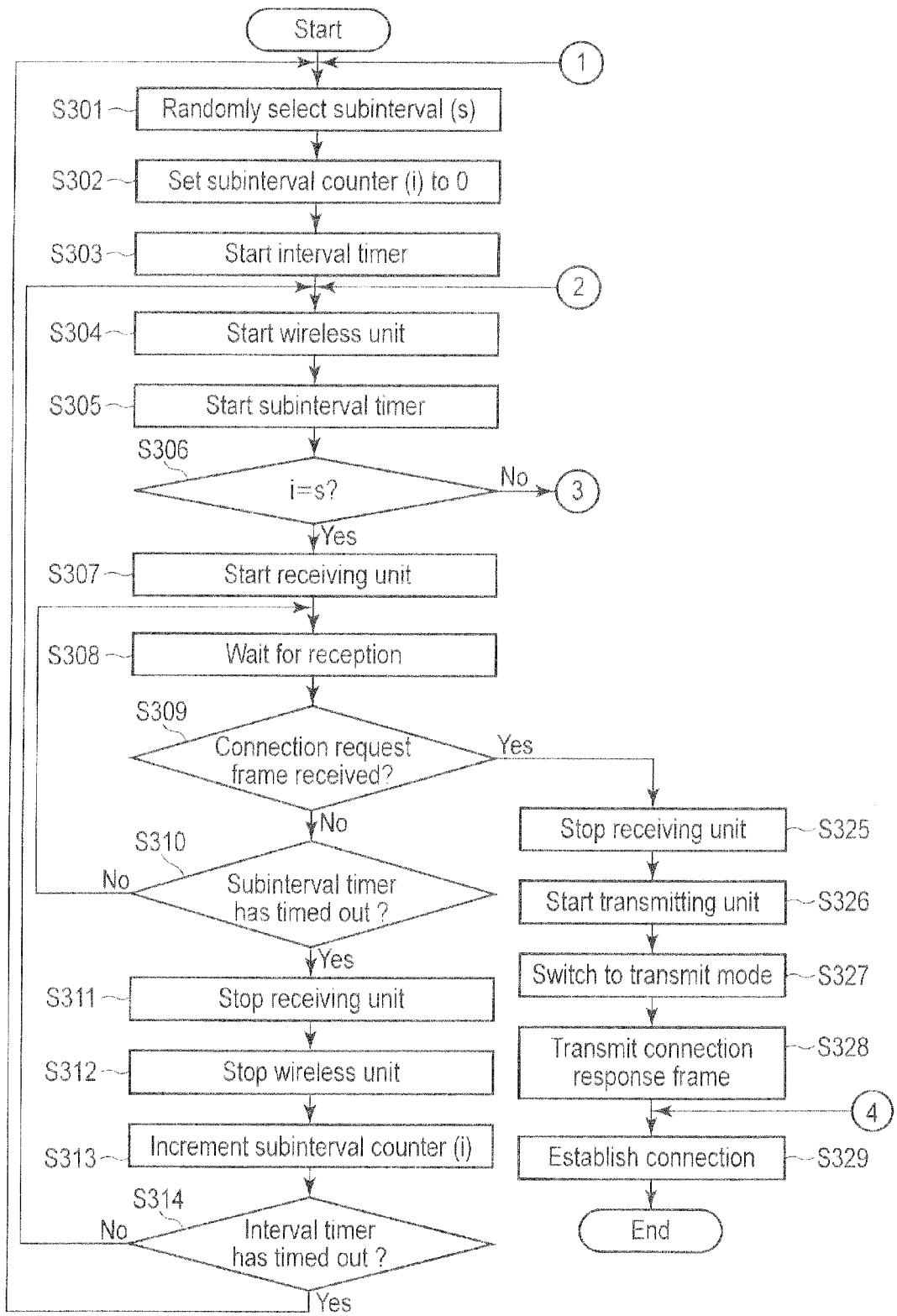
F I G. 3A

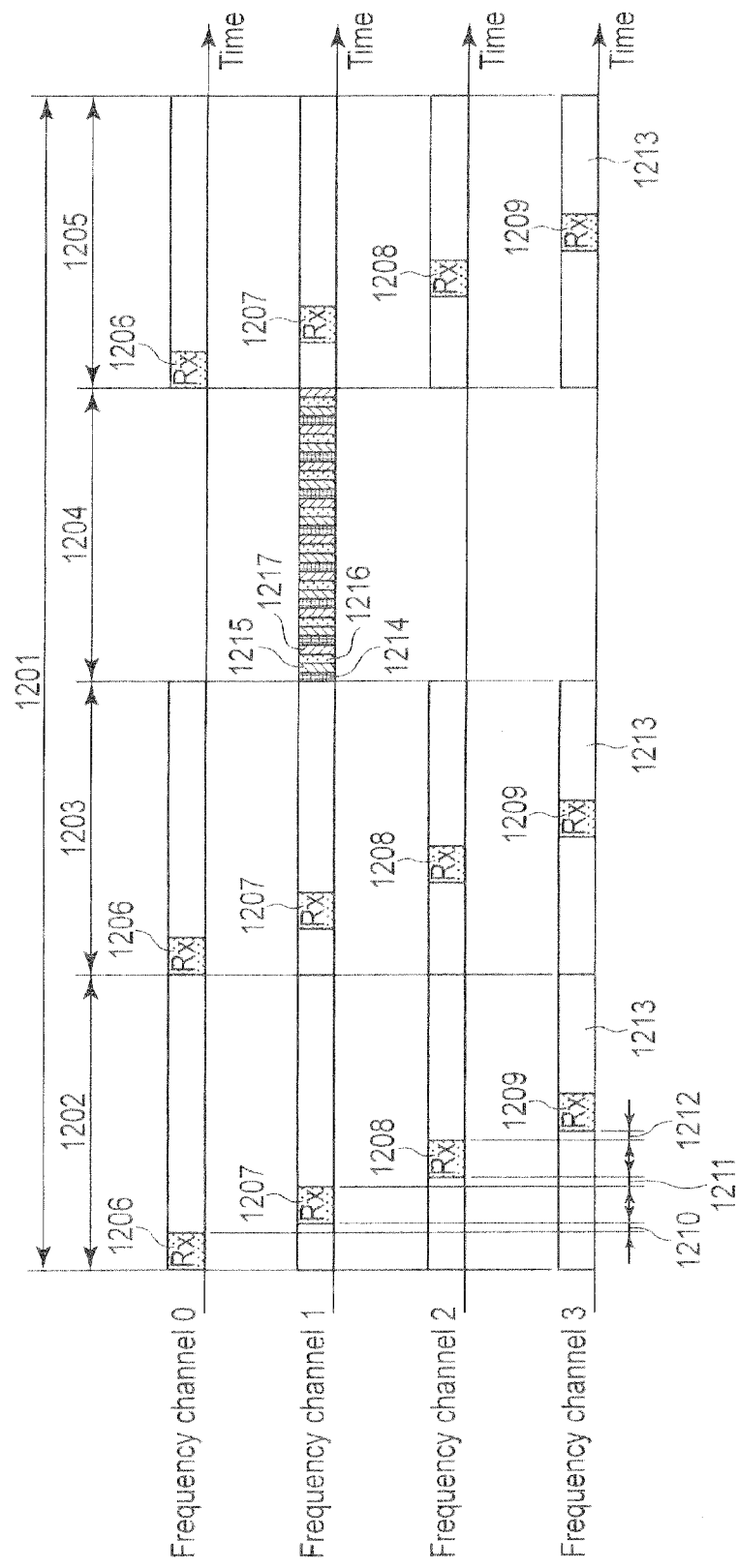
F I G. 12

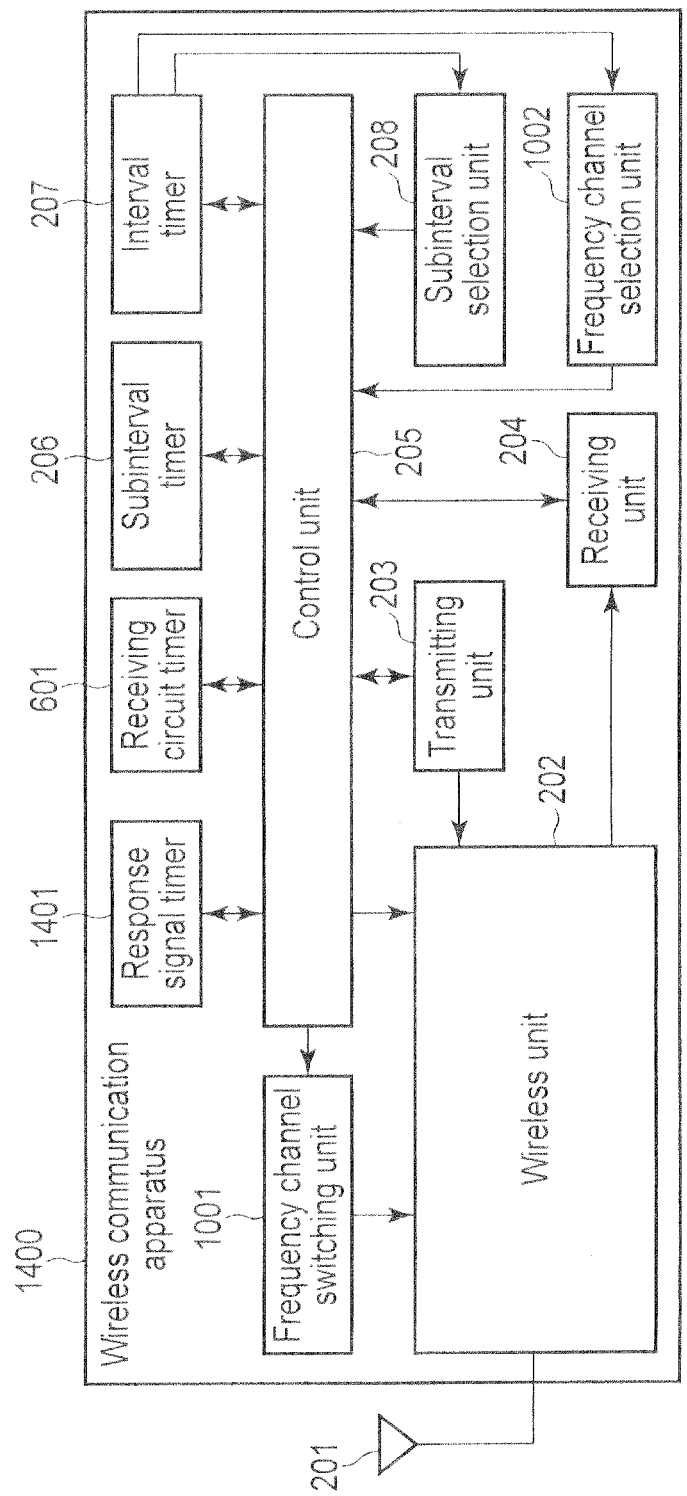
F I G. 14

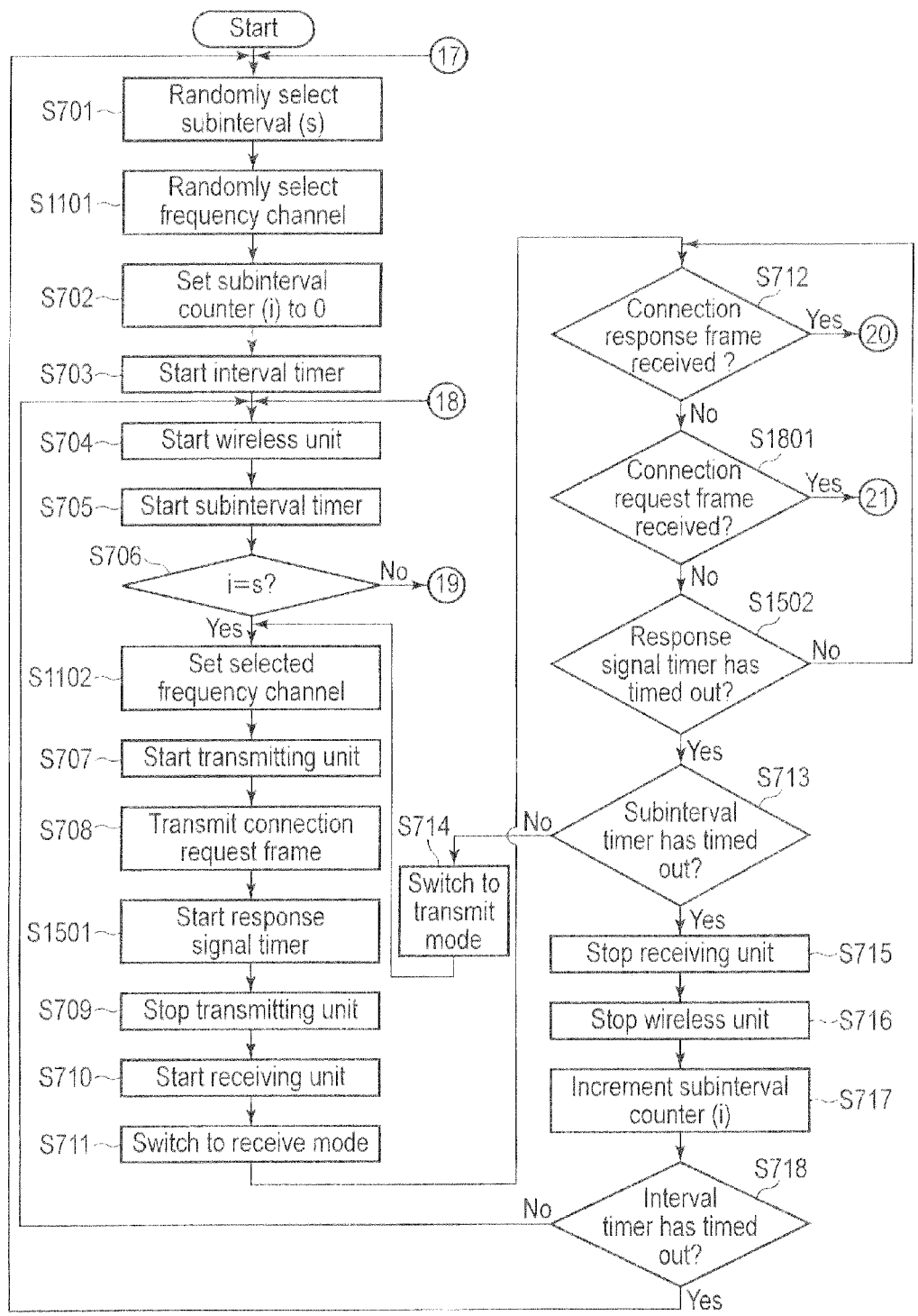
F I G. 18A

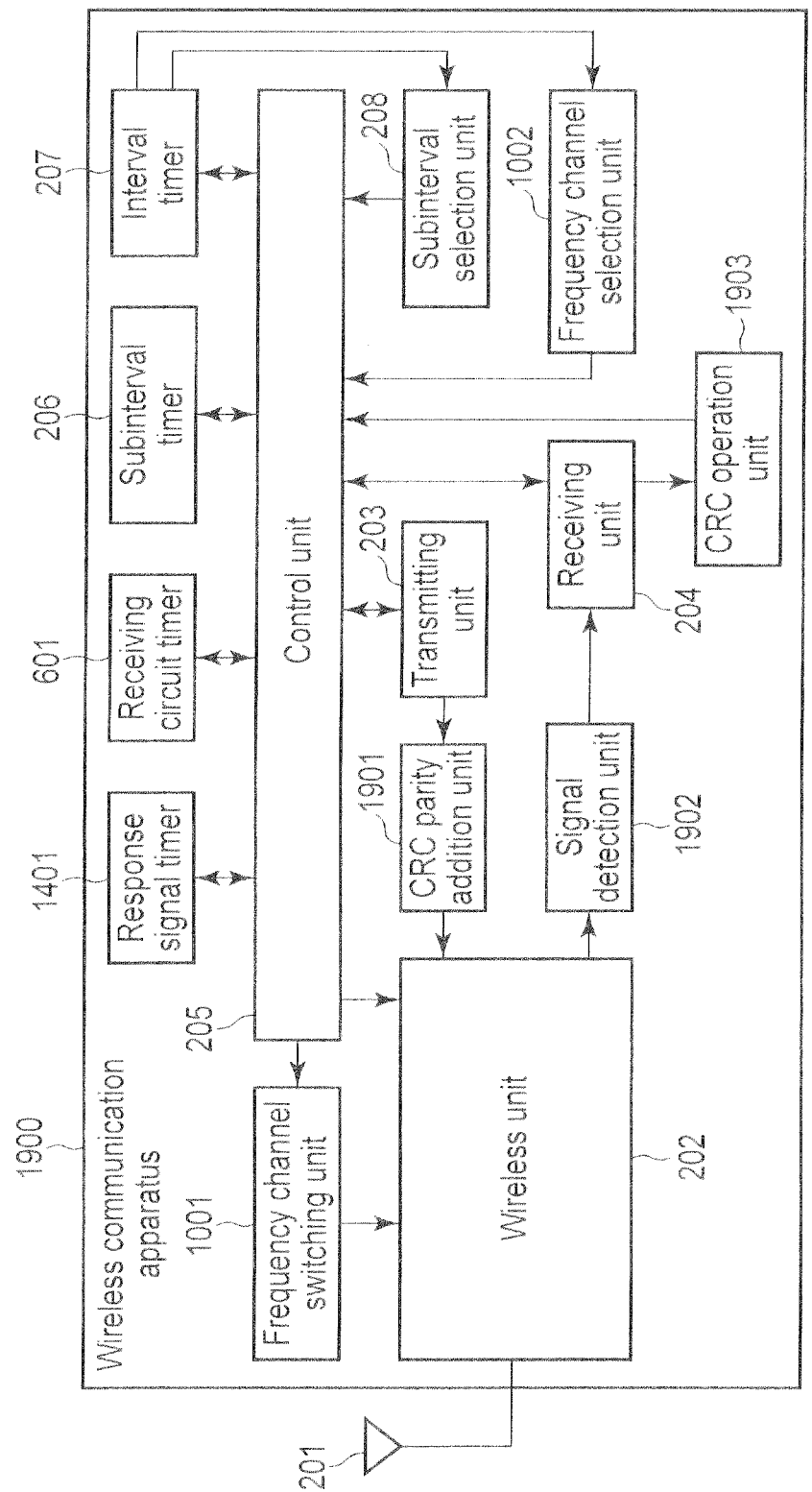
F I G. 19

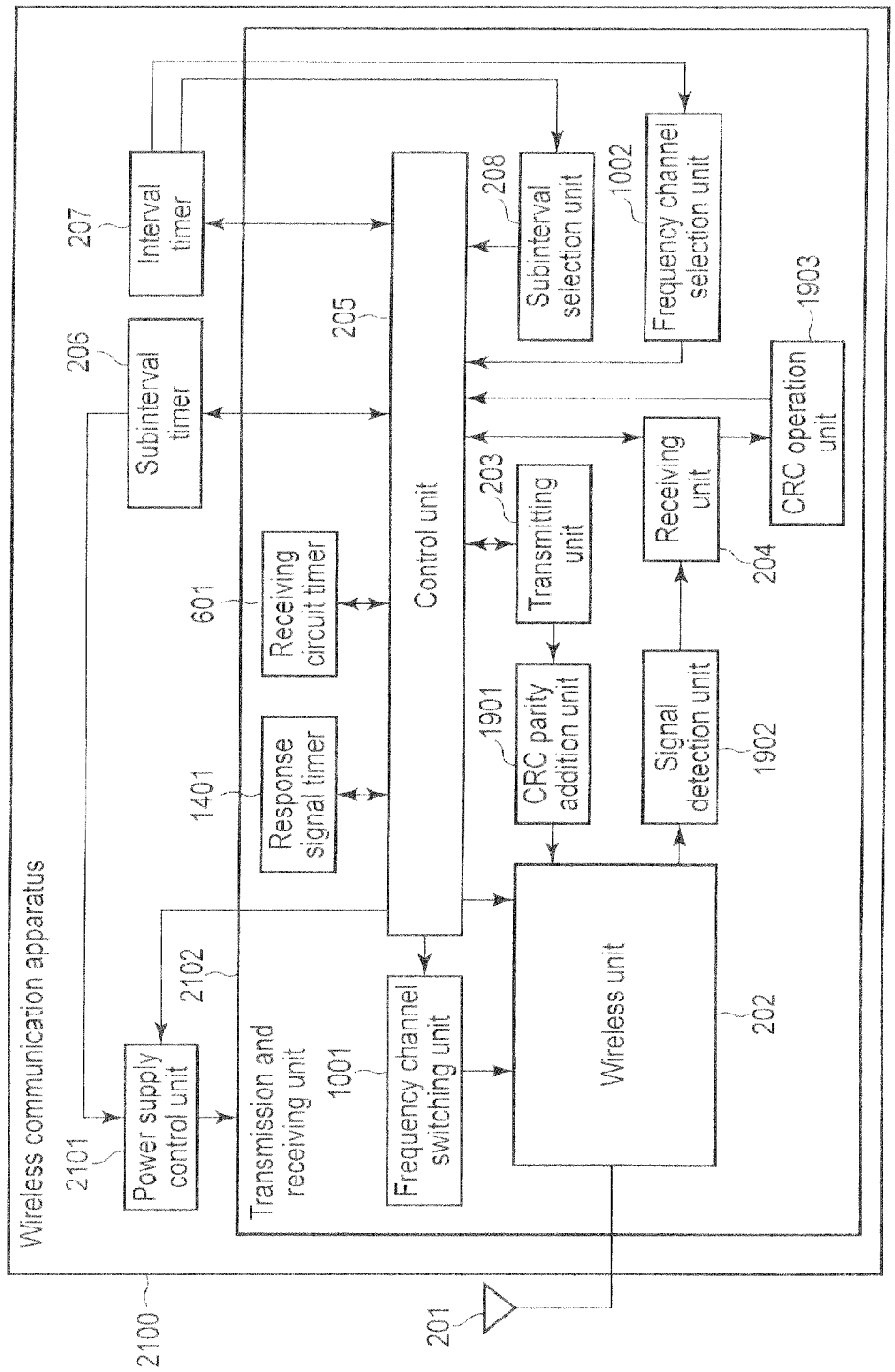
F I G. 21

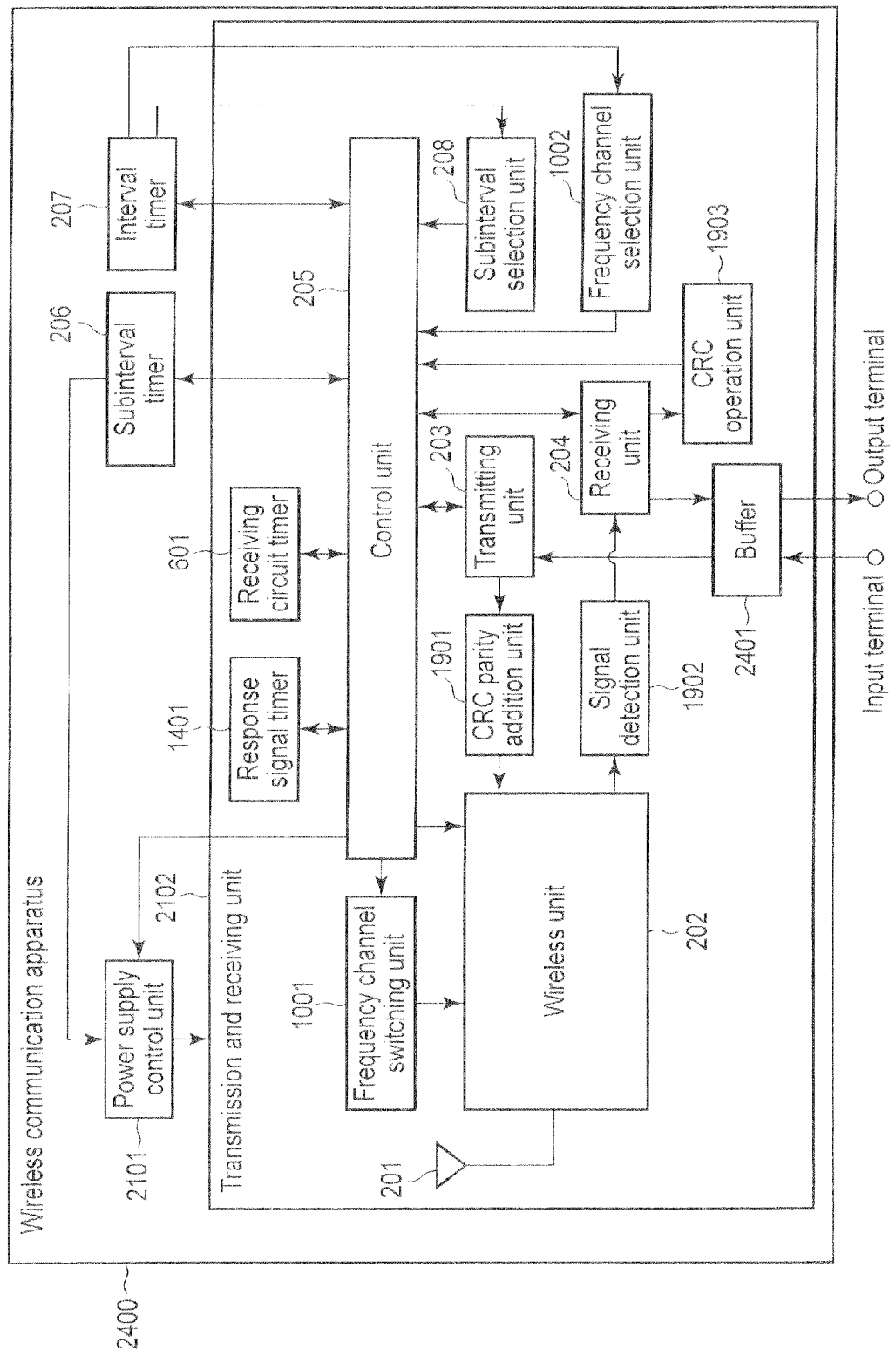
F I G. 24

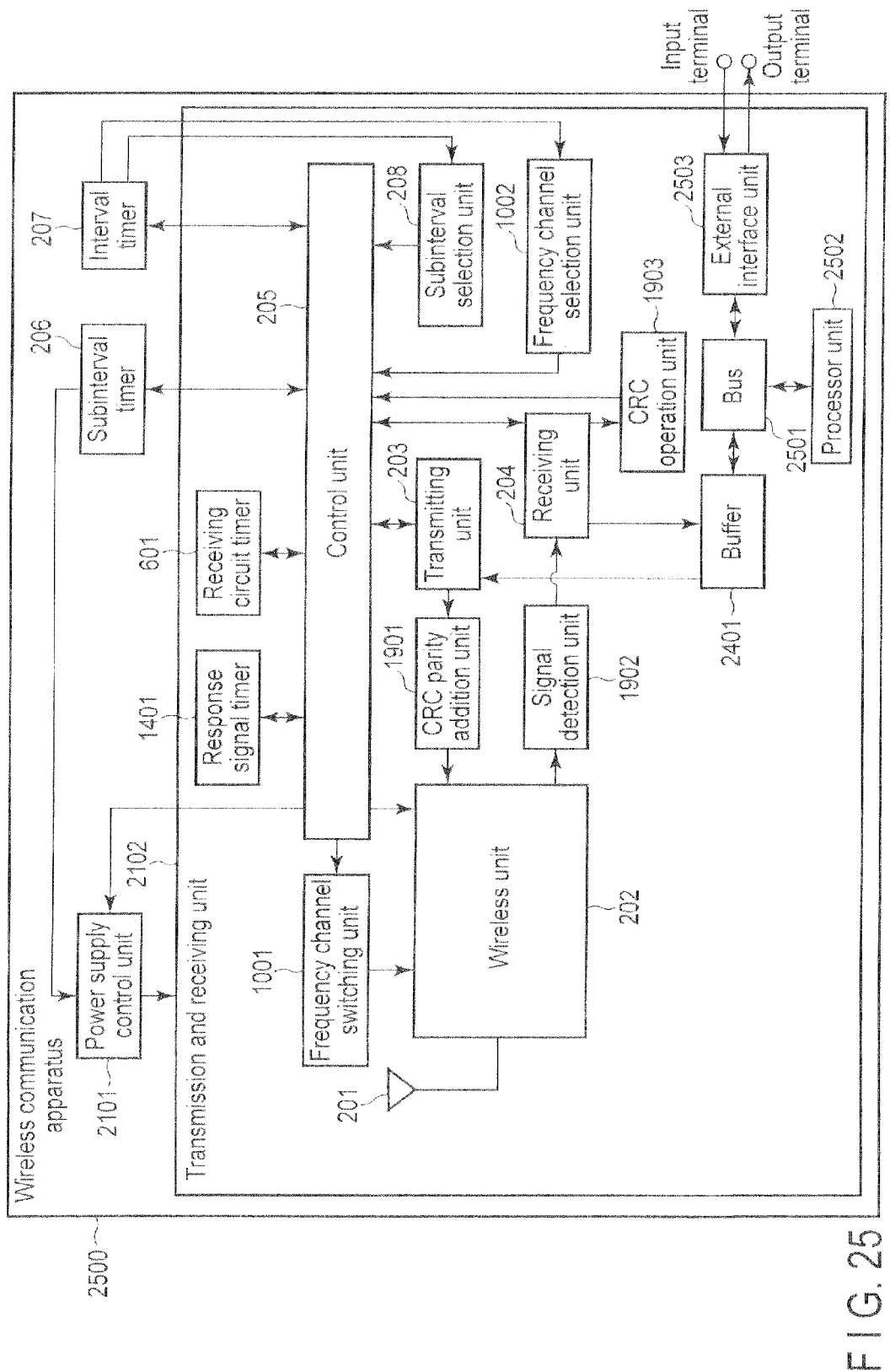
F I G. 25

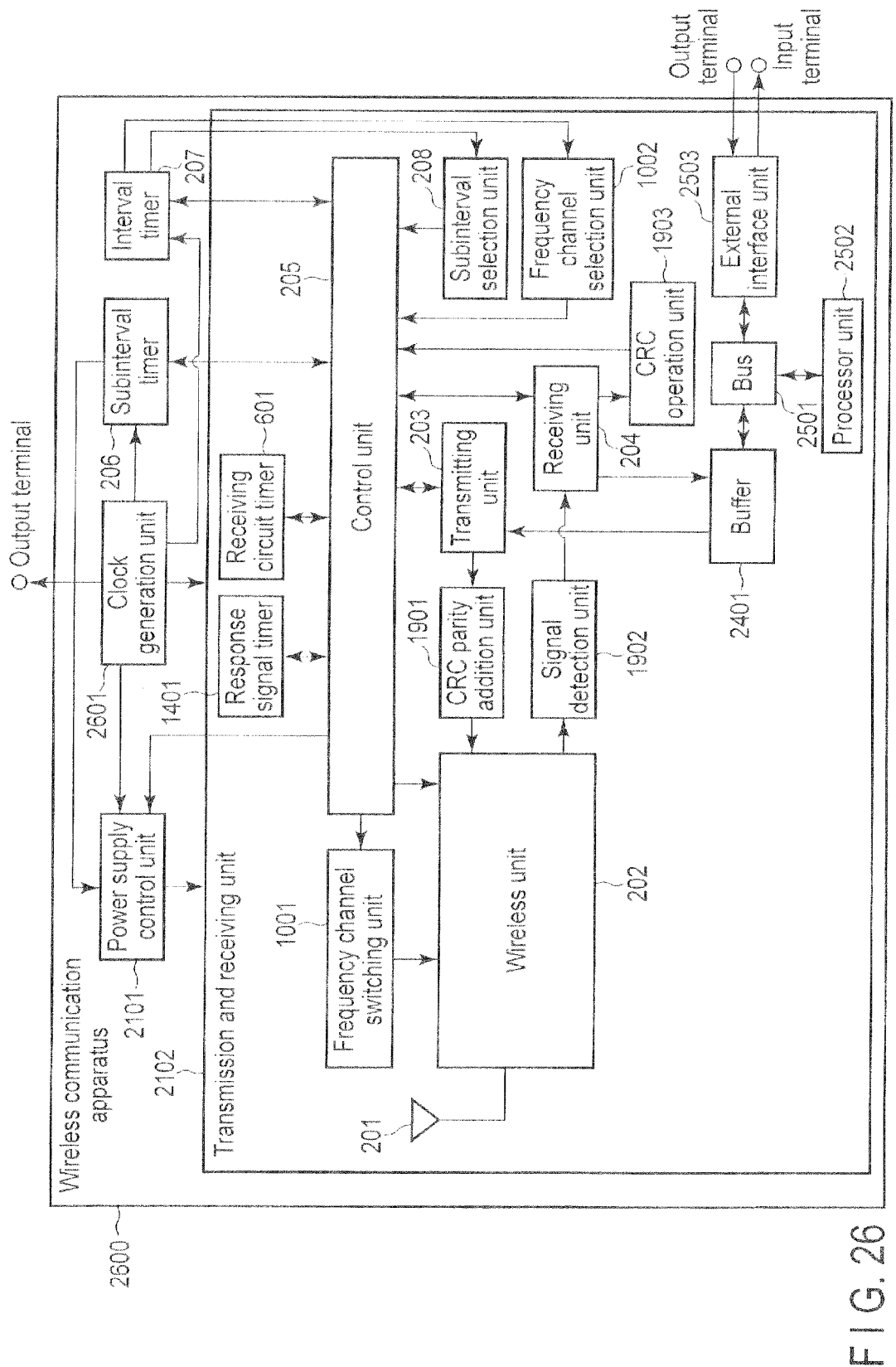
F I G. 26

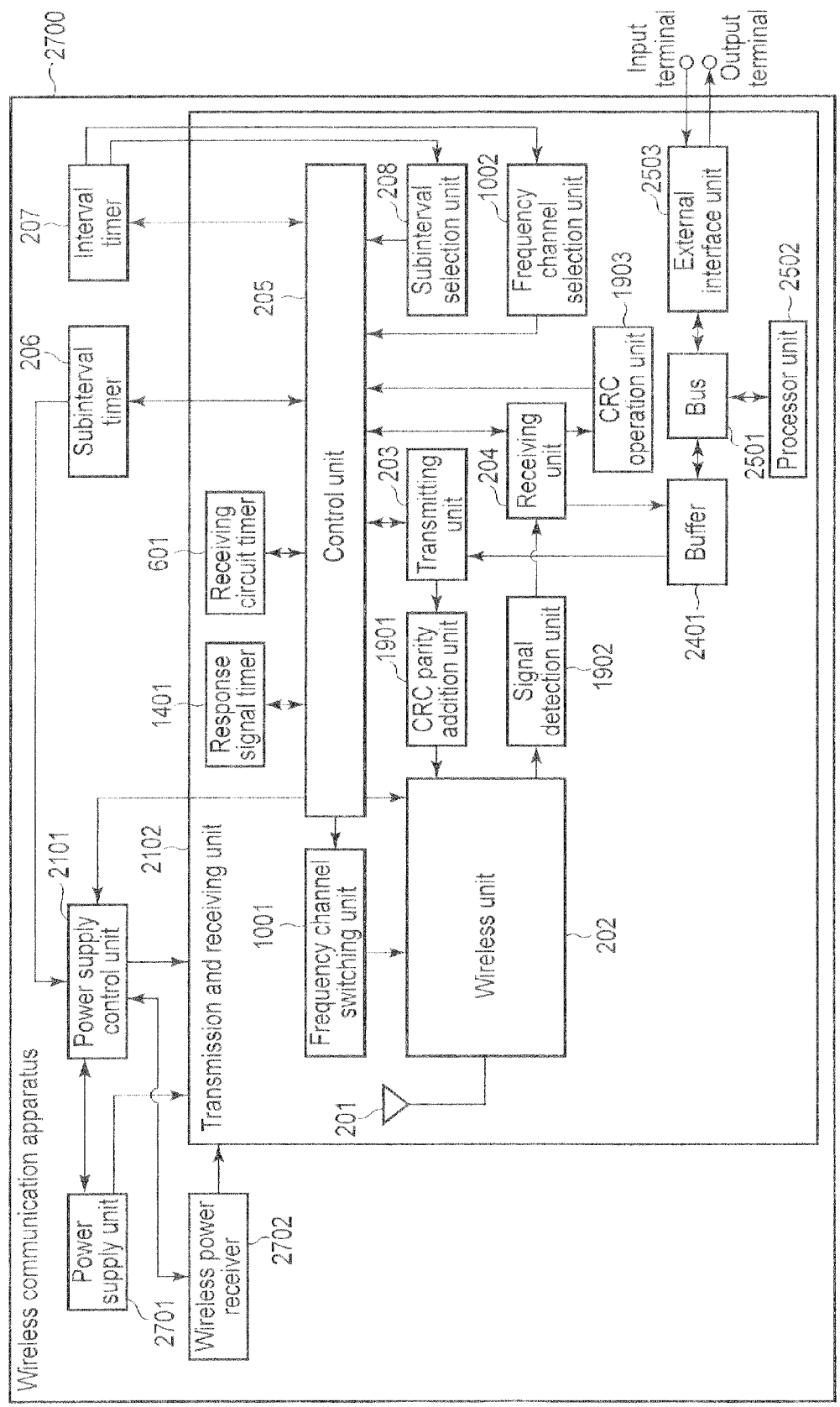
F I G. 27

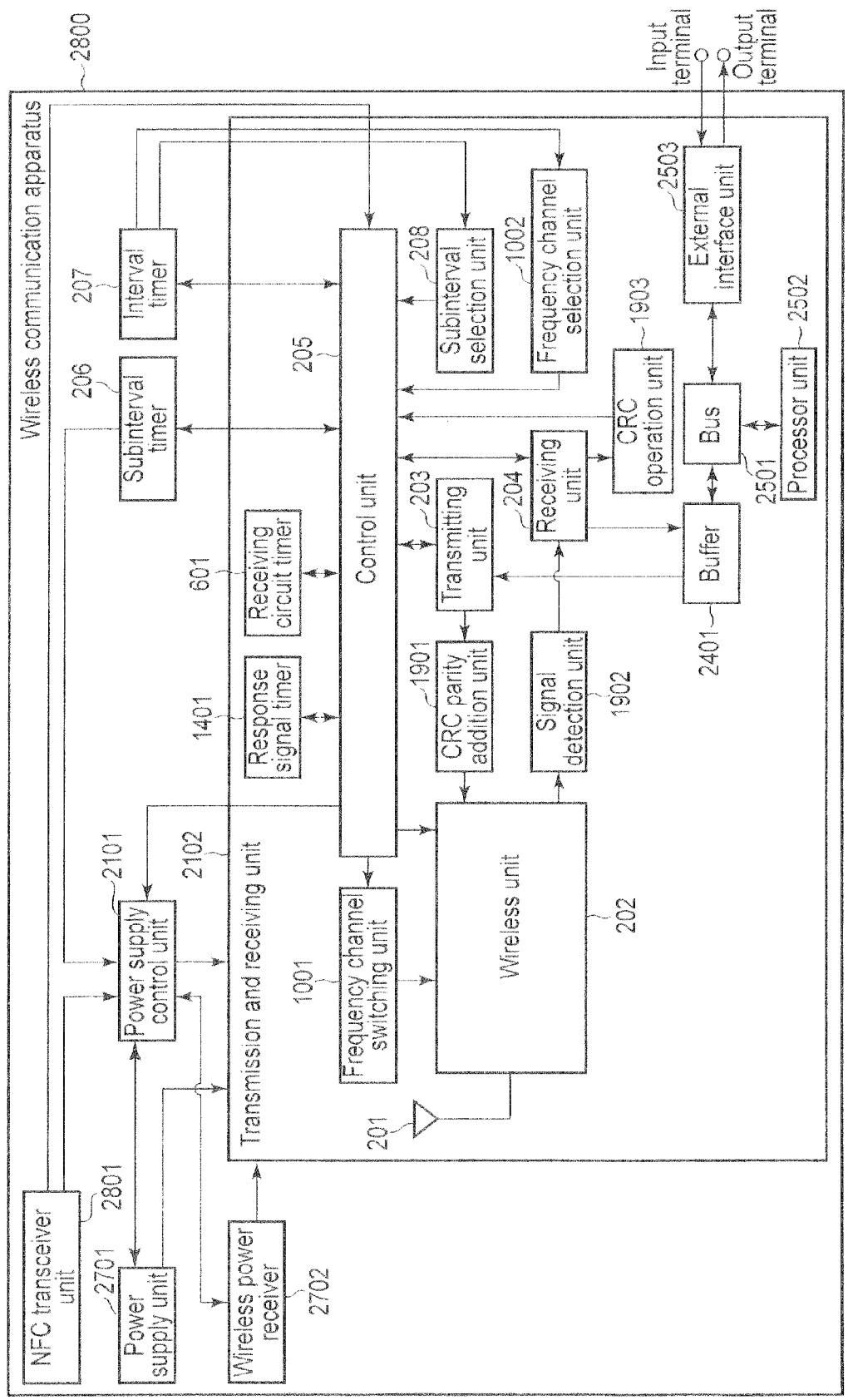
F I G. 28

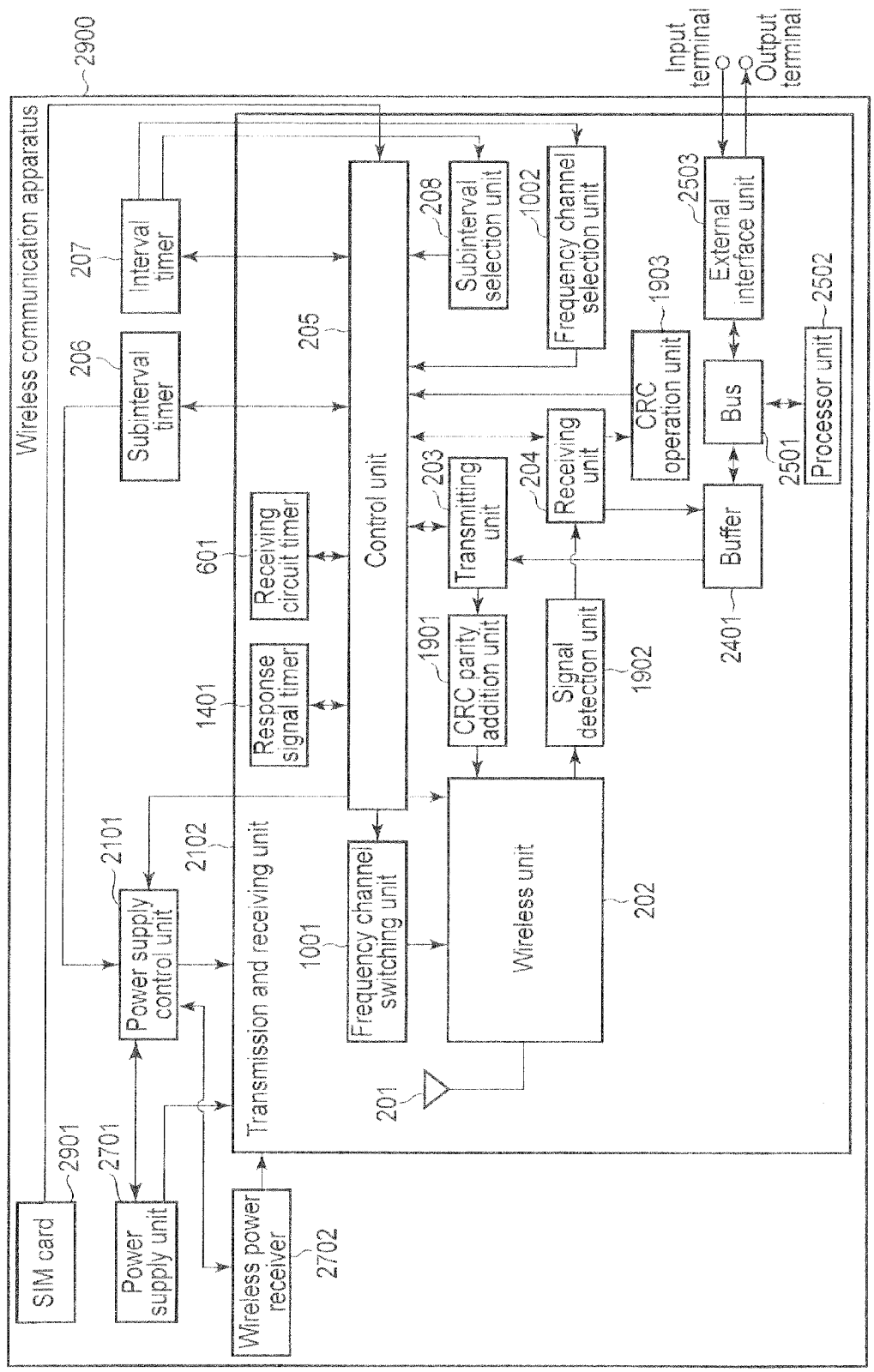
F I G. 29

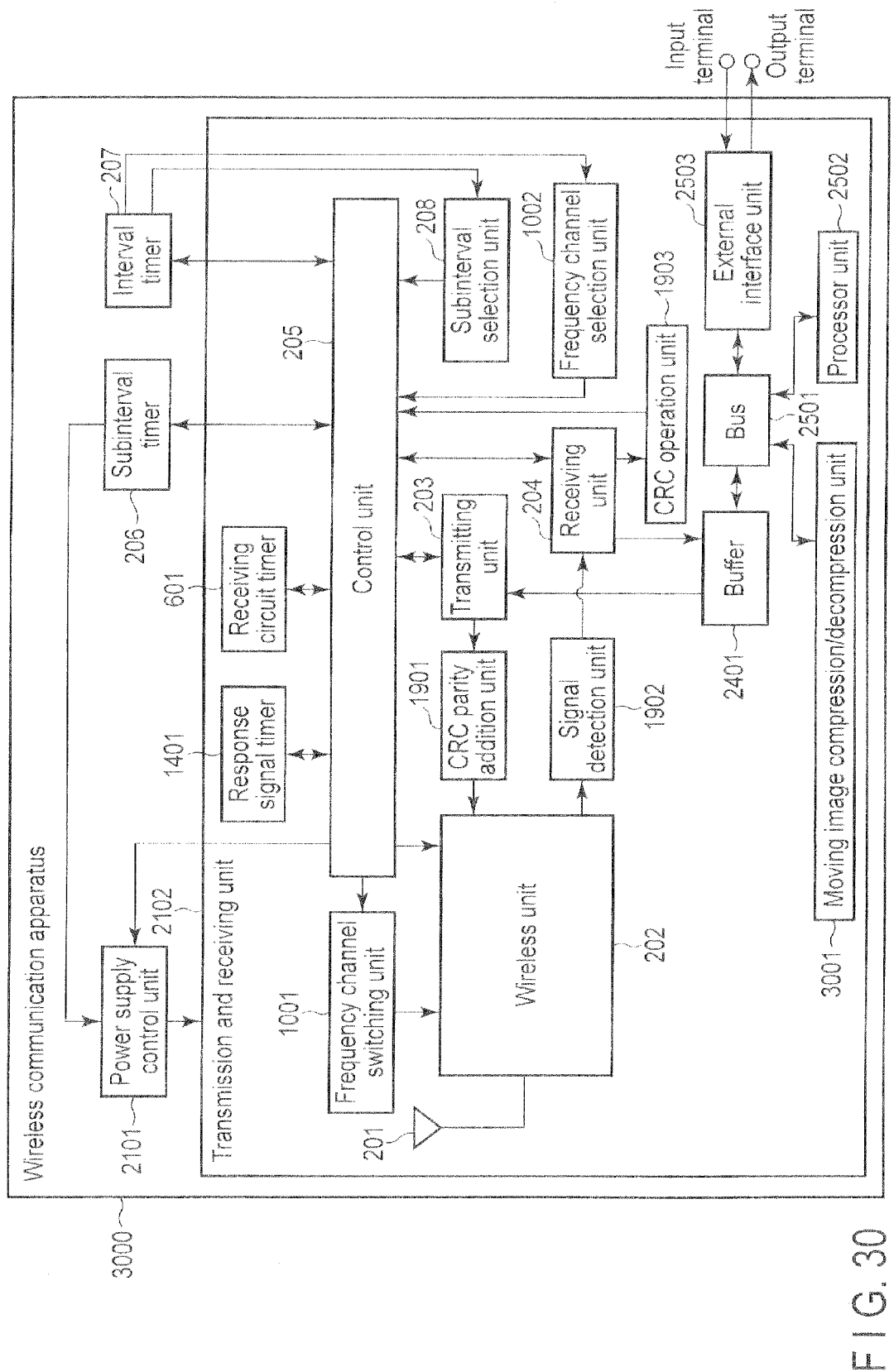
F I G. 30

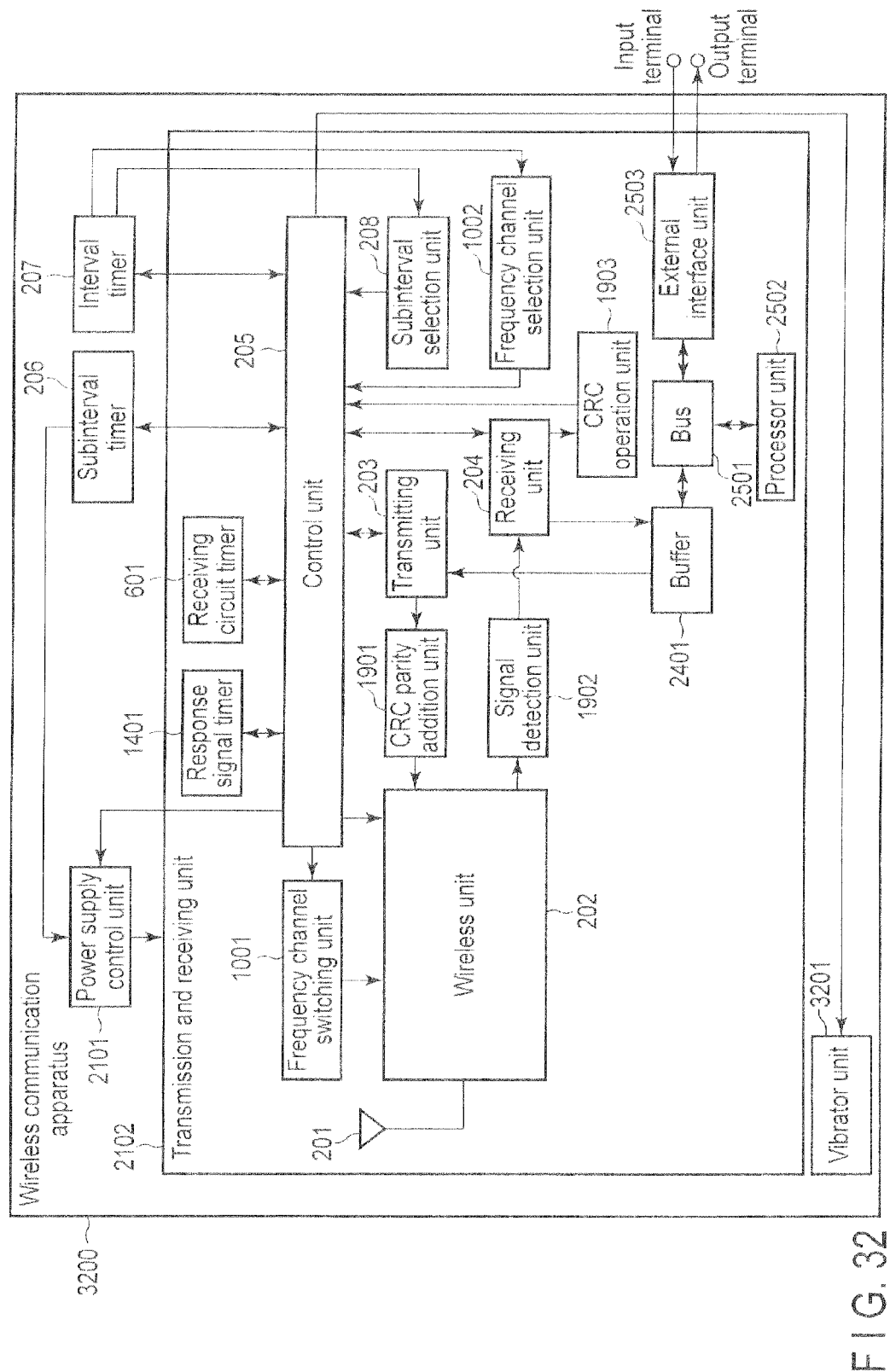
F I G. 32

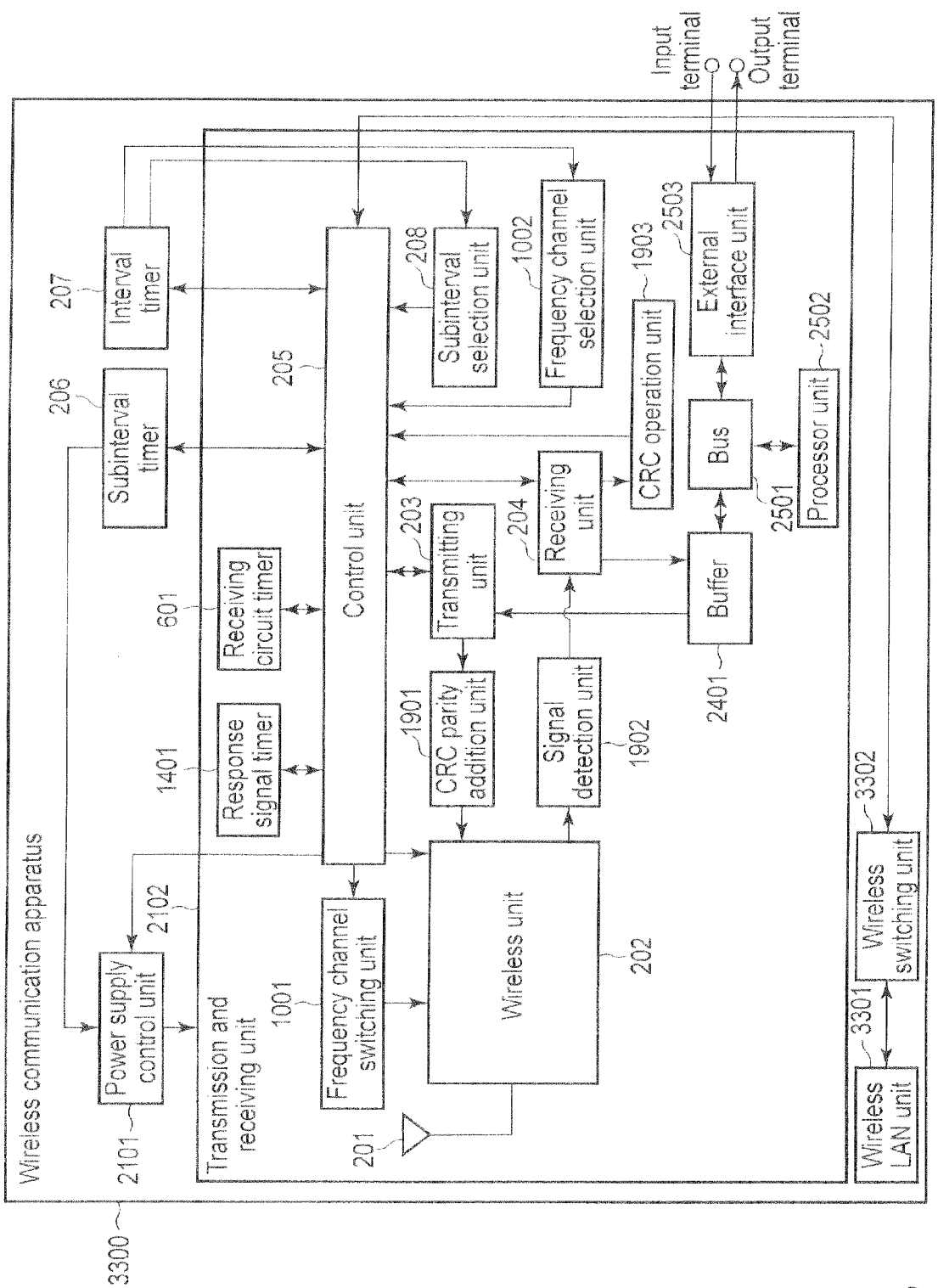
F I G. 33

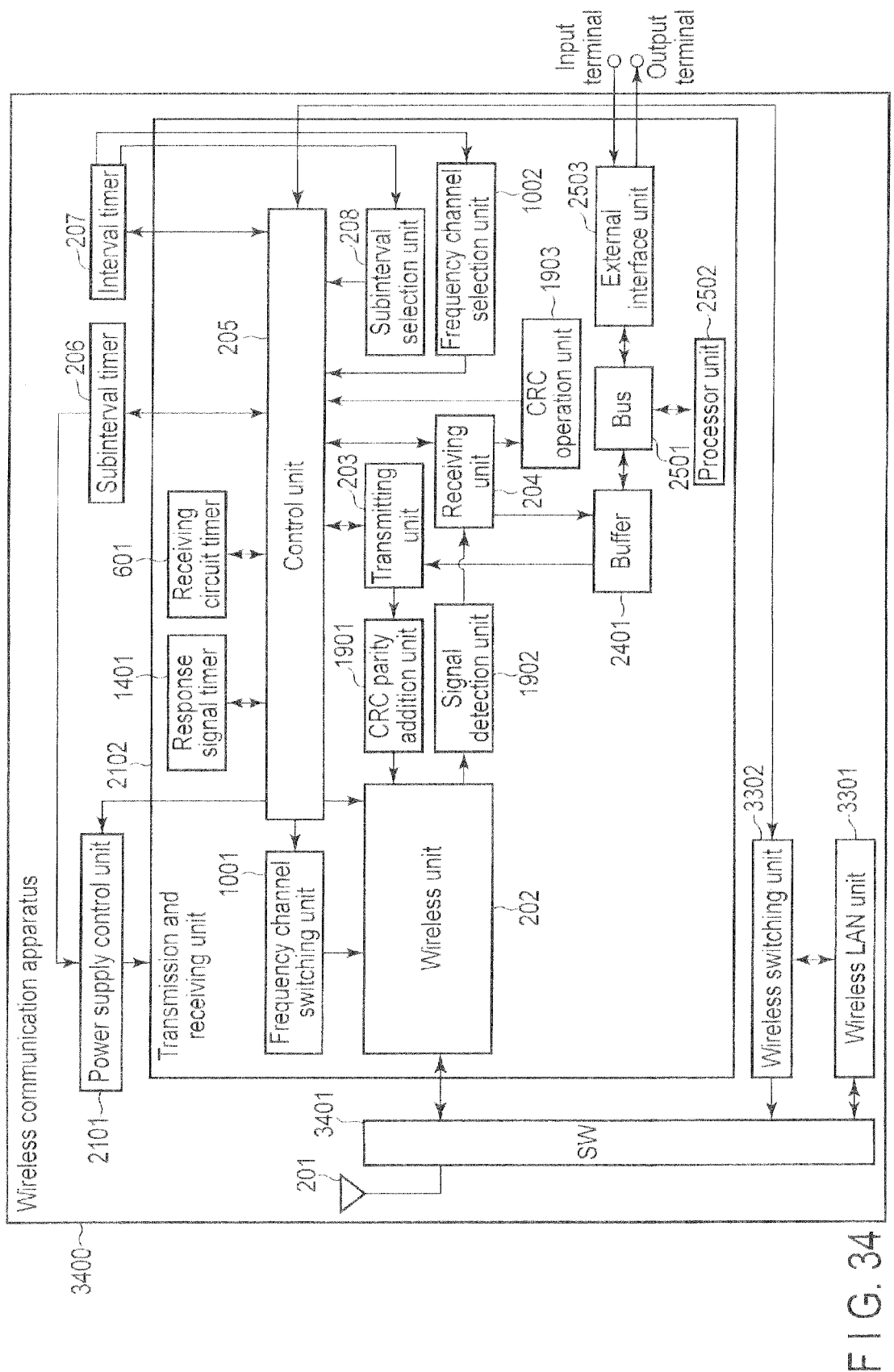
F I G. 34

WIRELESS COMMUNICATION APPARATUS FOR ESTABLISHING WIRELESS CONNECTION USING SINGLE OPERATIONAL MODE FOR BOTH TRANSMISSION AND RECEPTION OF CONNECTION REQUEST AND RESPONSE SIGNALS, AND METHOD FOR SAME

CROSS-REFERENCE TO RELATED APPLICATIONS

This application is based upon and claims the benefit of priority from prior Japanese Patent Application No. 2010-259446, filed Nov. 19, 2010, the entire contents of which are incorporated herein by reference.

FIELD

Embodiments described herein relate generally to wireless communication apparatus and method which employ short-range wireless communication.

BACKGROUND

A wireless communication system is conventionally known in which in order to establish a wireless connection, a first wireless communication apparatus periodically transmits a connection request signal and a second wireless communication apparatus waits to receive a connection request signal. In the wireless communication system, the first wireless communication apparatus transmits the connection request signal at predetermined time intervals, and the second wireless communication apparatus waits to receive a connection request signal for a period longer than the predetermined time interval. This enables the second wireless communication apparatus to receive the connection request signal from the first wireless communication apparatus.

Thus, different operation modes need to be set for the respective wireless communication apparatuses so that the first wireless communication apparatus operates in a transmit mode while the second wireless communication apparatus operates in a receive mode.

BRIEF DESCRIPTION OF THE DRAWINGS

FIG. 3A and FIG. 3B are a series of flowcharts illustrating an example of a connection trial process carried out by the wireless communication apparatus shown in FIG. 2;

FIG. 12 is a timing chart illustrating the connection trial processes shown in FIG. 11A and FIG. 11B;

FIG. 14 is a block diagram schematically showing wireless communication apparatus according to a fourth embodiment;

FIG. 18A and FIG. 18B are a series of flowcharts illustrating another example of a connection trial process carried out by the wireless communication apparatus in FIG. 14;

FIG. 19 is a block diagram schematically showing a wireless communication apparatus according to a seventh embodiment;

FIG. 21 is a block diagram schematically showing a wireless communication apparatus according to an eighth embodiment;

FIG. 24 is a block diagram schematically showing a wireless communication apparatus according to a tenth embodiment;

FIG. 25 is a block diagram schematically showing a wireless communication apparatus according to an eleventh embodiment;

FIG. 26 is a block diagram schematically showing a wireless communication apparatus according to a twelfth embodiment;

FIG. 27 is a block diagram schematically showing a wireless communication apparatus according to a thirteenth embodiment;

FIG. 28 is a block diagram schematically showing a wireless communication apparatus according to a fourteenth embodiment;

FIG. 29 is a block diagram schematically showing a wireless communication apparatus according to a fifteenth eleventh embodiment;

FIG. 30 is a block diagram schematically showing a wireless communication apparatus according to a sixteenth embodiment;

FIG. 32 is a block diagram schematically showing a wireless communication apparatus according to an eighteenth eleventh embodiment;

FIG. 33 is a block diagram schematically showing a wireless communication apparatus according to a nineteenth embodiment; and FIG. 34 is a block diagram schematically showing a wireless communication apparatus according to a twentieth embodiment.

DETAILED DESCRIPTION

Figure 1:
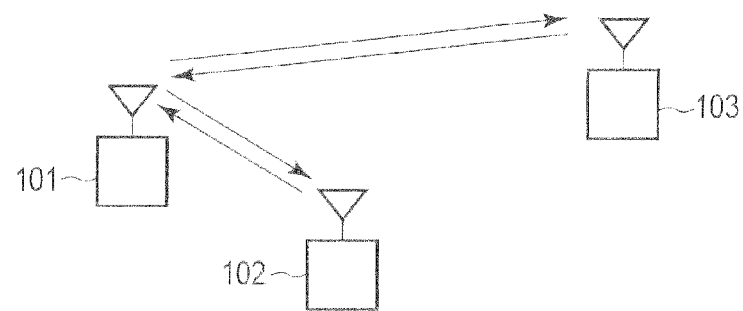
FIG. 1 is a block diagram schematically showing a wireless communication system according to various embodiments.

In general, according to one embodiment, a wireless communication apparatus includes a first timer, a second timer, a third timer, a time interval selection unit, a transmitting unit, a receiving unit, and a control unit. The first timer is configured to measure first time intervals. The second timer is configured to measure second time intervals, each first time interval including a plurality of second time intervals. The third timer is configured to measure third time intervals each shorter than a second time interval. The time interval selection unit is configured to select a second time interval among second time intervals. A time position of the selected second time interval is any one of time positions included in each of the first time intervals. The transmitting unit is configured to transmit a first response signal to respond to a first connection request signal transmitted by another wireless communication apparatus, and to transmit a second connection request signal to establish a wireless connection. The receiving unit is configured to receive a second response signal provided in response to the second connection request signal and to receive the first connection request signal. The control unit is configured to control the transmitting unit and the receiving unit to operate, during the selected second time interval, in a first operational state in which a transmission of the second connection request signal and a wait for reception of the second response signal are repeatedly performed, and to operate, during each of the second time intervals other than the selected second time interval, in a second operational state in which a wait for reception of the first connection request signal is performed for the third time interval.

Hereinafter, wireless communication apparatuses and methods according to various embodiments will be described with reference to the accompanying drawings. In the embodiments described below, components denoted by the same reference numerals are assumed to operate in the same manner, and duplicate descriptions of such components are omitted.

First Embodiment

FIG. 1 schematically shows a wireless communication system 100 including wireless communication apparatuses 101, 102, and 103 according to a first embodiment. In the wireless communication system 100, one wireless communication apparatus (for example, the wireless communication apparatus 101) communicates with another wireless communication apparatus (for example, the wireless communication apparatus 102) on a one-to-one basis. FIG. 1 illustrates that the wireless communication apparatus 101 communicates with the wireless communication apparatus 102 and then with the wireless communication apparatus 103.

More specifically, in FIG. 1, first, a wireless connection is established between the wireless communication apparatuses 101 and 102. A series of frame exchanges are then carried out between the wireless communication apparatuses 101 and 102. Thereafter, the wireless connection between the wireless communication apparatuses 101 and 102 is deleted. Then, a wireless connection is established between the wireless communication apparatuses 101 and 103. A series of frame exchanges are then carried out between the wireless communication apparatuses 101 and 103. Thereafter, the wireless connection between the wireless communication apparatuses 101 and 103 is deleted.

Furthermore, the present embodiment assumes that the wireless communication apparatus employs short-range wireless communication. For example, when a user moves the wireless communication apparatus 101 closer to the wireless communication apparatus 102, a wireless connection is established between the wireless communication apparatuses 101 and 102.

Figure 2:
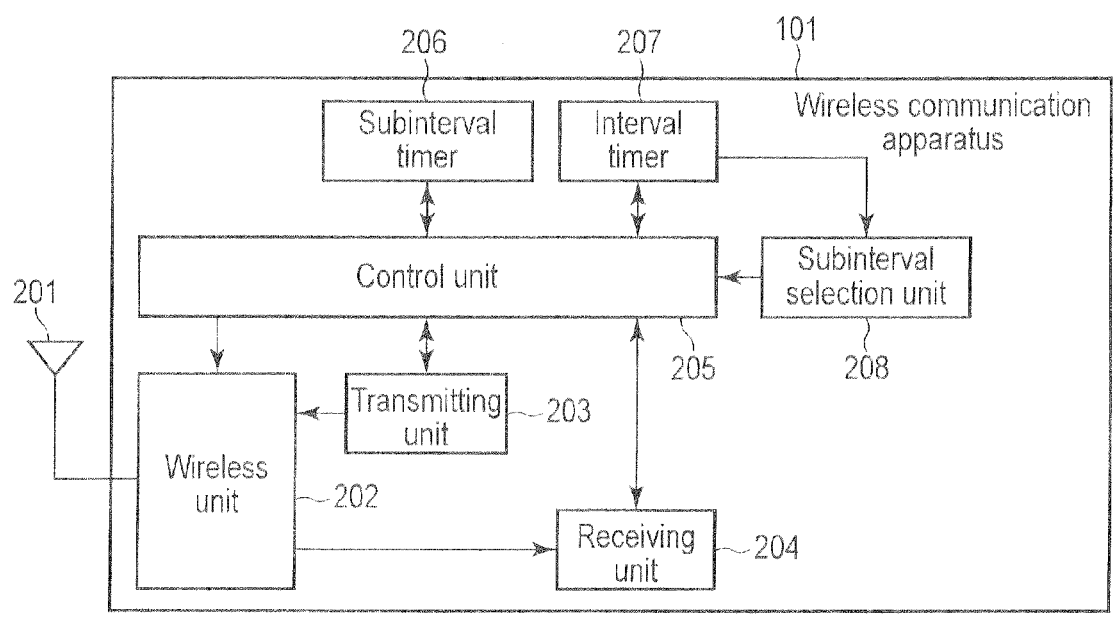
FIG. 2 is a block diagram schematically showing a wireless communication apparatus according to a first embodiment.

FIG. 2 schematically shows the wireless communication apparatus 101 according to the present embodiment. As shown in FIG. 2, the wireless communication apparatus 101 includes an antenna 201, a wireless unit 202, a transmitting unit 203, a receiving unit 204, a control unit 205, a subinterval timer 206, an interval timer 207, and a subinterval selection unit 208. The wireless communication apparatuses 102 and 103 shown in FIG. 1 are configured similarly to the wireless communication apparatus 101 shown in FIG. 2.

The transmitting unit (also referred to as a transmitting circuit) 203 transmits transmission frames (for example, connection request frames, connection response frames, and data frames) via the wireless unit 202 and the antenna 201. Specifically, the transmitting unit 203 modulates transmission frame which is received from the control unit 205. The transmitting unit 203 then performs a digital-to-analog conversion on the modulated transmission frame. The transmitting unit 203 then outputs, to the wireless unit 202, the transmission frame which has been converted into an analog signal.

The wireless unit 202 receives, from the transmitting unit 203, the transmission frame which has been converted into the analog signal. The wireless unit 202 then performs signal processing such as up-conversion and amplification on the transmission frame to generate a transmit radio frequency (RF) signal. The wireless unit 202 outputs the transmit RF signal to the antenna 201. The antenna 201 receives the transmit RF signal from the wireless unit 202. The antenna 201 then converts the transmit RF signal into a radio wave. Then, the antenna 201 transmits the radio wave.

The receiving unit (also referred to as a receiving circuit) 204 receives frames (for example, connection request frames, connection response frames, and data frames) from another wireless communication apparatus via the antenna 201 and the wireless unit 202. Specifically, first, the antenna 201 receives an RF signal transmitted by another wireless communication apparatus (for example, the wireless communication apparatus 102). The antenna 201 then outputs the received RF signal to the wireless unit 202. The wireless unit 202 performs signal processing such as an amplification and down-conversion on the RF signal from the antenna 201 to generate a baseband signal. The wireless unit 202 then outputs the generated baseband signal to the receiving unit 204.

The receiving unit 204 performs an analog-to-digital conversion on the baseband signal received from the wireless unit 202. The receiving unit 204 then demodulates the baseband signal to generate a receive frame. The receiving unit 204 outputs the receive frame to the control unit 205.

The control unit 205 controls each unit in the wireless communication apparatus 101. For example, the control unit 205 controllably starts and stops the wireless unit 202, the transmitting unit 203, the receiving unit 204, the interval timer 207, and the sub-interval timer 206. Operation of the control unit 205 will be described below in detail.

The interval timer (also referred to as the first timer) 207 measures or generates a predetermined first time interval. The interval timer 207 times out when the first time interval elapses from starting of the interval timer 207. The interval timer 207 then outputs a timeout signal. In the present embodiment, the first time interval is simply referred to an interval.

The subinterval timer (also referred to as the second timer) 206 measures or generates a predetermined second time interval. The subinterval timer 206 times out when the second time interval elapses from starting of the subinterval timer 206. The subinterval timer 206 then outputs a timeout signal. In the present embodiment, the second time interval is referred to a subinterval. The interval (i.e., the first time interval) includes a plurality of subintervals (i.e., second time intervals). In the description of the present embodiment, by way of example, the interval includes four subintervals, that is, the interval is four times as long as the subinterval. The present embodiment is not limited to examples in which the interval is an integral multiple of the subinterval.

The subinterval selection unit (also referred to as a time interval selection unit) 208 randomly selects a subinterval from a plurality of subintervals included in each interval. A time position of the subinterval selected by the subinterval selection unit 208 is any one of time positions included in each interval.

Figure 3B:
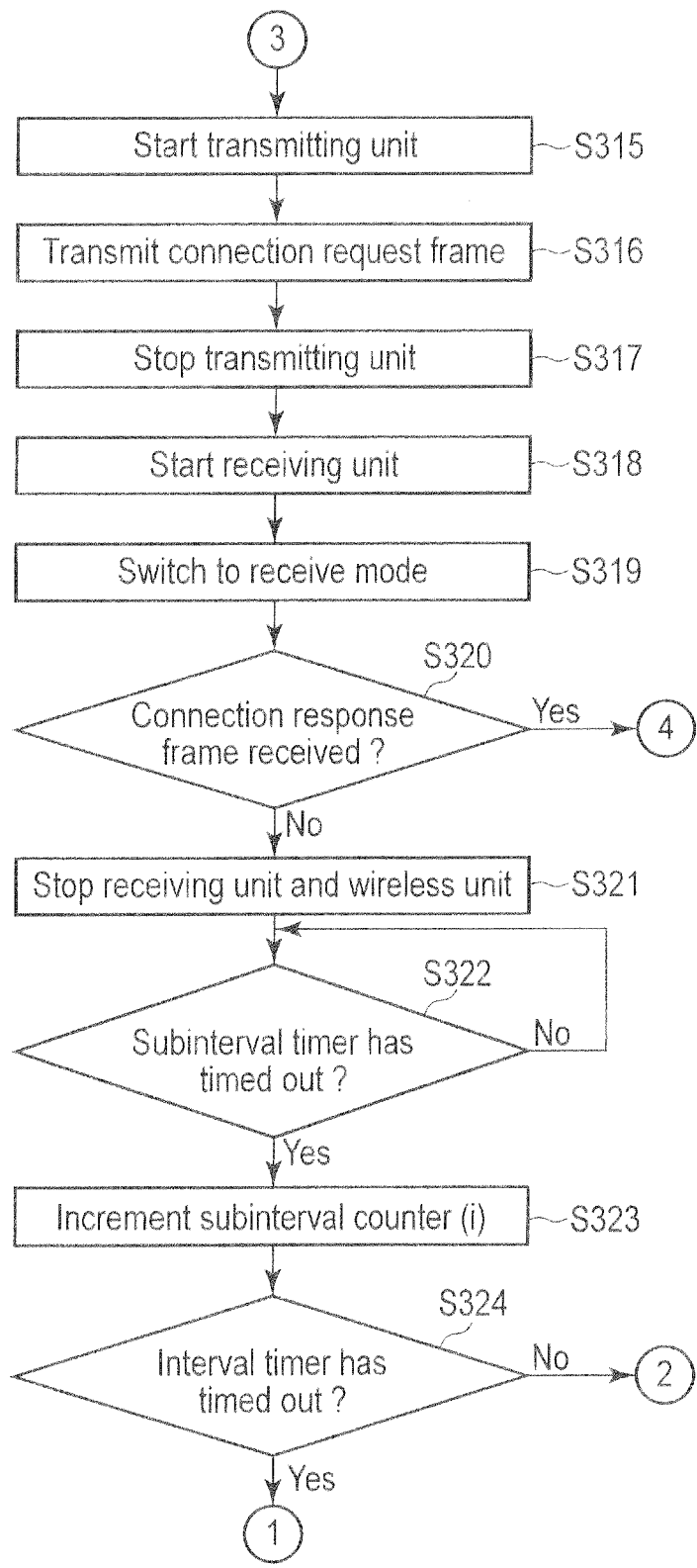

FIG. 3A and FIG. 3B show an example of a connection trial process carried out by the wireless communication apparatus 101 to establish a wireless connection. When the wireless communication apparatus 101 is started by a user, a connection trial process in FIG. 3A and FIG. 3B is started. When the connection trial process is started, first, the control unit 205 starts the interval timer 207. When the first time interval elapses from the starting of the interval timer 207, the interval timer 207 outputs a timeout signal to the subinterval selection unit 208.

Upon receiving a timeout signal from the interval timer 207, the subinterval selection unit 208 randomly selects a subinterval from a plurality of subintervals included in an interval (step S301). The subinterval selection unit 208 provides the control unit 205 with information indicating the selected subinterval. In the present embodiment, the interval includes four subintervals. In one example, the four subintervals are indexed with 0, 1, 2, and 3, respectively. The subinterval selection unit 208 randomly selects an index "s" from the indices of the subintervals. The subinterval selection unit 208 provides the control unit 205 with the selected index s.

Then, the control unit 205 clears a subinterval counter i, that is, sets the subinterval counter i to zero (step S302). If the indices of the subintervals are integral values of 0 to 3, the subinterval counter i correspondingly exhibits integral values of 0 to 3.

Subsequently, the control unit 205 starts the interval timer 207 (step S303), the wireless unit 202 (step S304), and the subinterval timer 206 (step S305). Moreover, the control unit 205 determines whether or not the index s selected in step S301 is equal to the subinterval counter i (step S306). If the index s is equal to the subinterval counter i, the process proceeds to step S307. Otherwise the process proceeds step S315 in FIG. 3E.

If the index s is equal to the subinterval counter i in step S306, the control unit 205 starts the receiving unit 204, and sets the wireless unit 202 to a receive mode (step S307). The receiving unit 204 waits to receive a connection request frame from another wireless communication apparatus (step S308). Then, the control unit 205 determines whether or not the receiving unit 204 has received a connection request frame (step S309). If the receiving unit 204 has received a connection request frame, the process proceeds to step S325. If the receiving unit 204 has not received a connection request frame, the process proceeds to step S310.

If the receiving unit 204 has not received a connection request frame in step S309, the control unit 205 determines whether or not the subinterval timer 206 has timed out (step S310). The control unit 205 recognizes that the subinterval timer 206 has timed out, by receiving a timeout signal from the subinterval timer 206. If the subinterval timer 206 has timed out, the process proceeds to step S311. Otherwise the process returns to step S308. Thus, the receiving unit 204 waits to receive a connection request frame until the subinterval timer 206 times out.

If the subinterval timer 206 times out before the receiving unit 204 receives a connection request frame, the control unit 205 stops the receiving unit 204 (step S311) and the wireless unit 202 (step S312). Moreover, the control unit 205 increments the subinterval counter i, that is, increases the subinterval counter i by one (step S313).

Then, the control unit 205 determines whether or not the interval timer 207 has timed out (step S314). The control unit 205 recognizes that the interval timer 207 has timed out, by receiving a timeout signal from the interval timer 207. If the interval timer 207 has timed out, the process returns to step S301. If the interval timer 207 has not timed out, the process returns to step S304.

On the other hand, if the receiving unit 204 has received a connection request frame in step S309, the control unit 205 stops the receiving unit 204 (step S325). The control unit 205 then starts the transmitting unit 203 (step S326), and switches the wireless unit 202 to a transmit mode (step S327). Then, the control unit 205 generates a connection response frame to respond to the connection request frame received from the other wireless communication apparatus. The control unit 205 then provides the connection response frame to the transmitting unit 203. The transmitting unit 203 transmits the connection response frame via the wireless unit 202 and the antenna 201 (step S328). As a result, a wireless connection is established between wireless communication apparatus 101 and the other wireless communication apparatus (step S329).

Furthermore, if the index s of the subinterval is not equal to the subinterval counter i in step S306, then as shown in FIG. 3B, the control unit 205 starts the transmitting unit 203 (step S315). The control unit 205 then sets the wireless unit 202 to the transmit mode. Moreover, the control unit 205 generates a connection request frame used to establish a wireless connection and provides the connection request frame to the transmitting unit 203. The transmitting unit 203 transmits the connection request frame to establish a wireless connection, via the wireless unit 202 and the antenna 201 (step S316). After the transmitting unit 203 transmits the connection request signal, the control unit 205 stops the transmitting unit 203 (step S317). The control unit 205 then starts the receiving unit 204 (step S318) and switches the wireless unit 202 to the receive mode (step S319).

Then, the control unit 205 determines whether or not the receiving unit 204 has received a connection response frame provided in response to the connection request frame in step S316 (step S320). If the receiving unit 204 has received a connection response frame, a wireless connection is established (step S329 in FIG. 3A). If the receiving unit 204 fails to receive a connection response frame within a predetermined period, the control unit 205 stops the wireless unit 202 and the receiving unit 204 (step S321). Then, the control unit 205 determines whether or not the subinterval timer 206 has timed out (step S322). The control unit 205 waits until the subinterval timer 206 times out. When the subinterval timer 206 times out, the control unit 205 increments the subinterval counter i (step S323). Then, the control unit 205 determines whether or not the interval timer 207 has timed out (step S324). If the interval timer 207 has timed out, the process returns to step S301 in FIG. 3A. If the interval timer 207 has not timed out, the process returns to step S304 in FIG. 3A.

In the wireless communication system 100 according to the present embodiment, the other wireless communication apparatus, which is a communication partner, also carries out the above-described connection trial process. The wireless communication apparatus 101 and the other wireless communication apparatus repeat the above-described connection trial process until a wireless connection is established.

Figure 4:
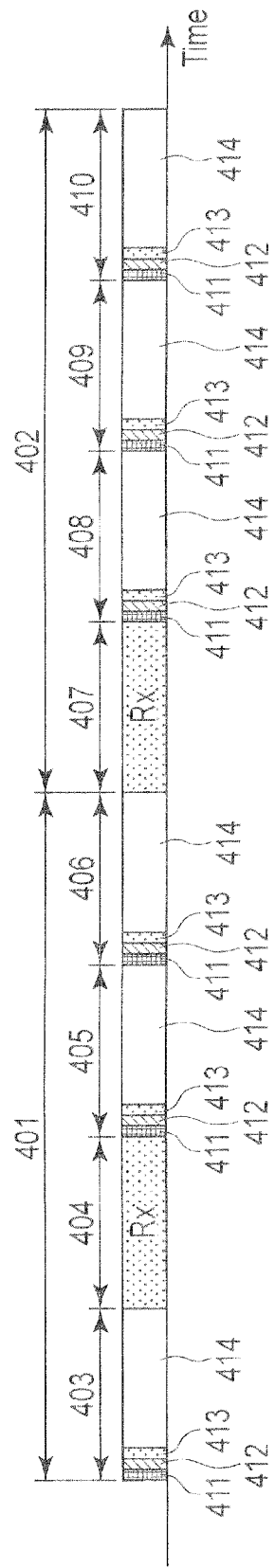
FIG. 4 is a timing chart illustrating the connection trial process shown in FIG. 3A and FIG. 3B.

FIG. 4 is a timing chart of the connection trial process shown in FIG. 3A and FIG. 3B. FIG. 4 shows two consecutive intervals 401 and 402. The intervals 401 and 402 include four subintervals 403 to 406 and four subintervals 407 to 410, respectively. In an example illustrated in FIG. 4, for the first interval 401, the second subinterval 404 is selected by the subinterval selection unit 208. For the second interval 402, the first subinterval 407 is selected by the subinterval selection unit 208.

Thus, the index s of a subinterval included in and selected from a certain interval may be different from that of a subinterval included in and selected from an interval which is continuous with the certain interval. That is, the time position of the selected subinterval in the interval varies with the interval.

During the selected subintervals 404 and 407, the wireless communication apparatus 101 operates in an operational state where the wireless communication apparatus 101 waits to receive a connection request frame from another wireless communication apparatus. During each of the subintervals other than the selected ones 404 and 407, that is, the subintervals 403, 405, 406, 408, 409, and 410, the wireless communication apparatus 101 operates in an operational state where the wireless communication apparatus 101 transmits a connection request frame at least once and waits receive a connection response frame provided in response to the transmitted connection request frame. Specifically, each of the subintervals 403, 405, 406, 408, 409, and 410 includes a period 411 required to transmit the connection request frame, a period 412 required to switch the wireless unit 202 from the transmit mode to the receive mode, and a reception wait period 413 during which the receiving unit 204 waits to receive a connection response frame. The reception wait period 413 is a time interval with a predetermined length. The reception wait period 413 refers to a timeout period for an operation of waiting to receive a connection response frame provided in response to the connection request frame transmitted during the last period 411.

During the period 411 starting at the start time of each of the subintervals 403, 405, 406, 408, 409, and 410, the transmitting unit 203 transmits a connection request frame. When the connection request frame is transmitted, then during the period 412 succeeding the period 411, the control unit 205 stops the transmitting unit 203 and starts the receiving unit 204. Then, during the period 413 succeeding the period 412, the receiving unit 204 waits to receive a connection response frame. The remaining period 414, which corresponds to each subinterval from which the periods 411, 412, and 413 are excluded, the wireless unit 202, the transmitting unit 203, and the receiving unit 204 are stopped.

Figure 5:
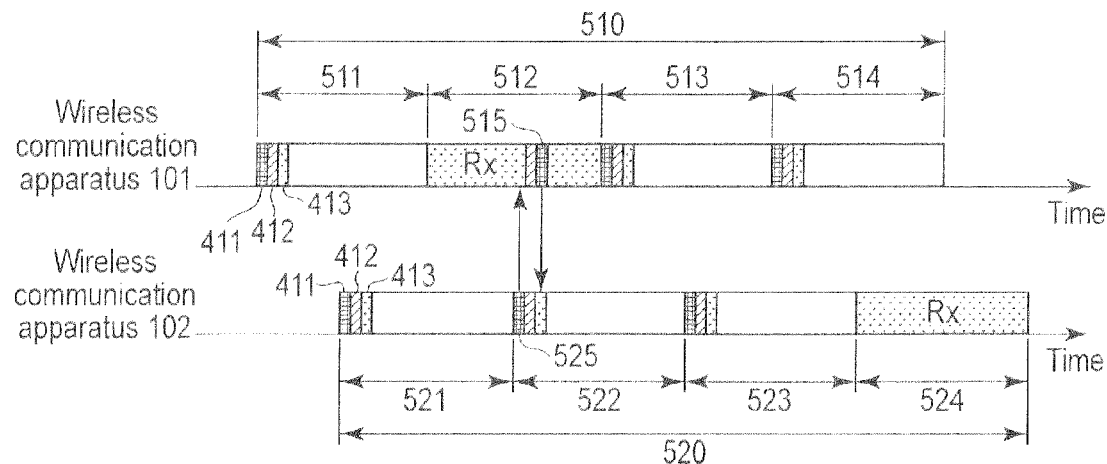
FIG. 5 is a timing chart illustrating that two wireless communication apparatuses each carry out the connection trial process shown in FIG. 3A and FIG. 3B.

FIG. 5 is a timing chart illustrating an example of connection trial processes carried out by the wireless communication apparatuses 101 and 102, respectively. In FIG. 5, the wireless communication apparatus 101 operates based on an interval 510 including four subintervals 511 to 514. The wireless communication apparatus 102 operates based on an interval 520 including four subintervals 521 to 524. As shown in FIG. 5, the intervals 510 and 520 may begin at different points of time.

For the interval 510, the second subinterval 512 is selected. The wireless communication apparatus 101 keeps the receiving unit 204 active during the selected subinterval 512 and waits to receive a connection request frame. During each of the subintervals of the interval 510 other than the subinterval 512, that is, the subintervals 511, 513, and 514, the wireless communication apparatus 101 operates as follows. At the start time of the subinterval, the wireless communication apparatus 101 transmits a connection request frame. After transmitting the connection request frame, the wireless communication apparatus 101 switches from the transmit mode to the receive mode. The wireless communication apparatus 101 then waits to receive a connection response frame during the predetermined period 413.

For the interval 520, the fourth subinterval 524 is selected. The wireless communication apparatus 102 keeps the receiving unit 204 active during the selected subinterval 524 and waits to receive a connection request frame. During each of the subintervals of the interval 520 other than the subinterval 524, that is, the subintervals 521, 522, and 523, the wireless communication apparatus 102 operates as follows. At the start time of the subinterval, the wireless communication apparatus 102 transmits a connection request frame. After transmitting the connection request frame, the wireless communication apparatus 102 switches from the transmit mode to the receive mode. The wireless communication apparatus 102 then waits to receive a connection response frame during the predetermined period 413.

In FIG. 5, at a timing during the subinterval 522 when the wireless communication apparatus 102 transmits a connection request frame 525, the wireless communication apparatus 101 is waiting for reception. Thus, the wireless communication apparatus 101 receives the connection request frame 525 from the wireless communication apparatus 102. Upon receiving the connection request frame 525, the wireless communication apparatus 101 switches the wireless unit 202 from the receive mode to the transmit mode. When a predetermined time interval elapses, the wireless communication apparatus 101 transmits a connection response frame 515 in response to the connection request frame 525. When the wireless communication apparatus 102 receives the connection response frame 515 from the wireless communication apparatus 101, a wireless connection is established between the wireless communication apparatuses 101 and 102.

After the connection is established, data frames are transmitted between the wireless communication apparatuses 101 and 102, though this is not shown in FIG. 5.

As described above, the wireless communication apparatus according to the present embodiment randomly selects one subinterval from a plurality of subintervals included in each interval. During the selected subinterval, the wireless communication apparatus waits to receive a connection request frame from another wireless communication apparatus. During each of the subintervals other than the selected one, the wireless communication apparatus transmits a connection request frame. Thus, a wireless connection with another wireless communication apparatus serving as a communication partner can be established without the need to set an operation mode different from the other wireless communication apparatus.

Second Embodiment

In the first embodiment, during a subinterval selected by the subinterval selection unit 208, the wireless communication apparatus waits to receive a connection request frame from another wireless communication apparatus. During each of the subintervals other than the selected one, the wireless communication apparatus transmits a connection request frame. In contrast, in a second embodiment, during selected subinterval, the wireless communication apparatus transmits a connection request frame. During each of the subintervals other than the selected one, the wireless communication apparatus waits to receive a connection request frame from another wireless communication apparatus. In the present embodiment, each interval is assumed to include four subintervals as is the case with the first embodiment.

Figure 6:
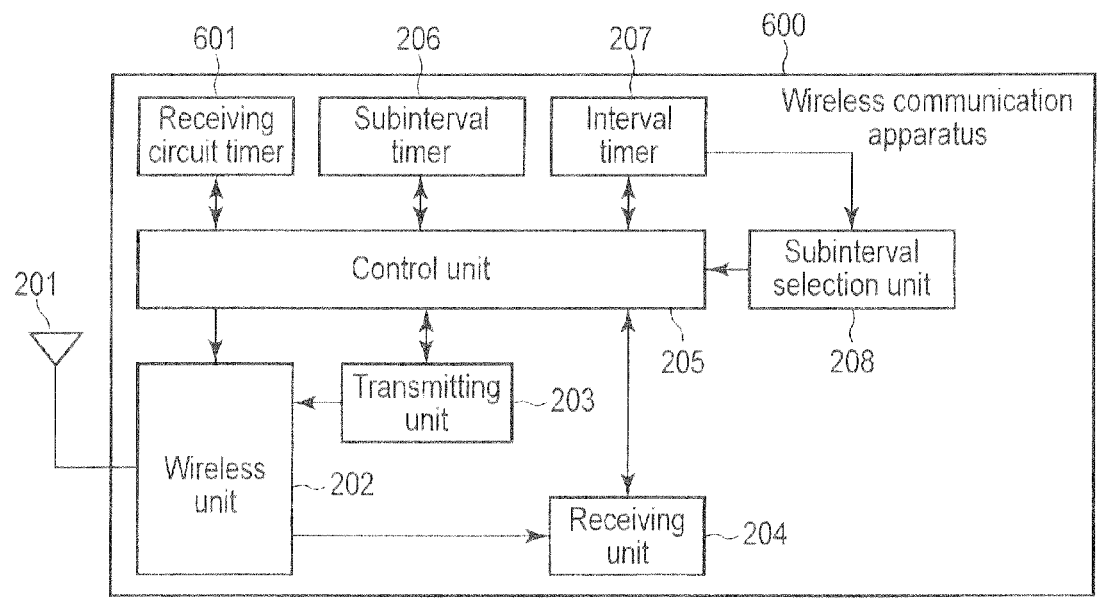
FIG. 6 is a block diagram schematically showing a wireless communication apparatus according to a second embodiment.

FIG. 6 schematically shows a wireless communication apparatus 600 according to the second embodiment. The wireless communication apparatus 600 includes a receiving circuit timer (also referred to as a third timer) 601 in addition to the components of the wireless communication apparatus 101 shown in FIG. 2. The receiving circuit timer 601 is used to limit the time for which the receiving unit 204 is kept active. The receiving circuit timer 601 measures or generates a third time interval that is shorter than the subinterval (second time interval). When the third time interval elapses from starting of the receiving circuit timer 601, the timer 601 times out and outputs a timeout signal.

Figure 7A:
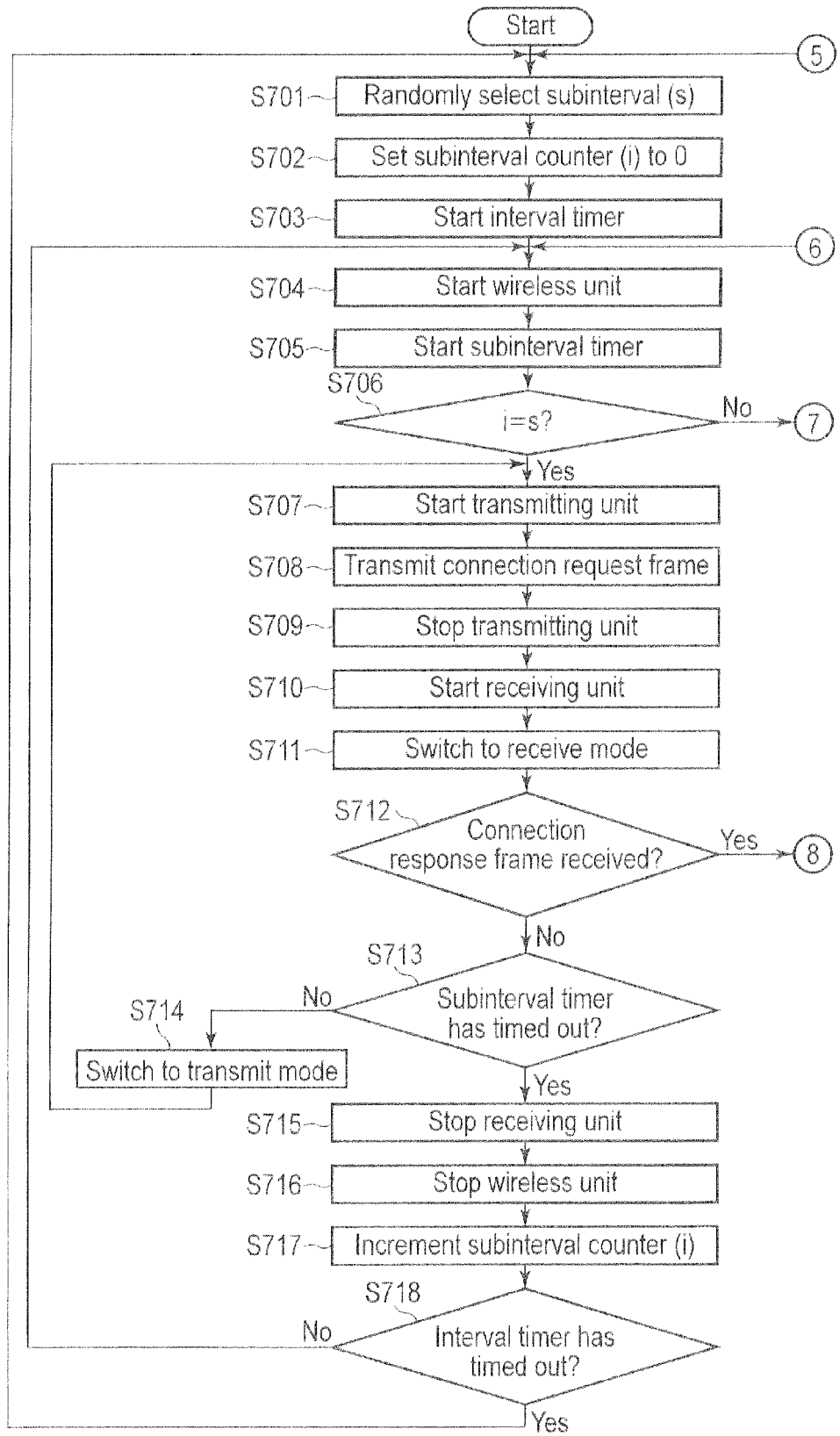
FIG. 7A and FIG. 7B are a series of flowcharts illustrating an example of a connection trial process carried cut by the wireless communication apparatus shown in FIG. 6.
Figure 7B:
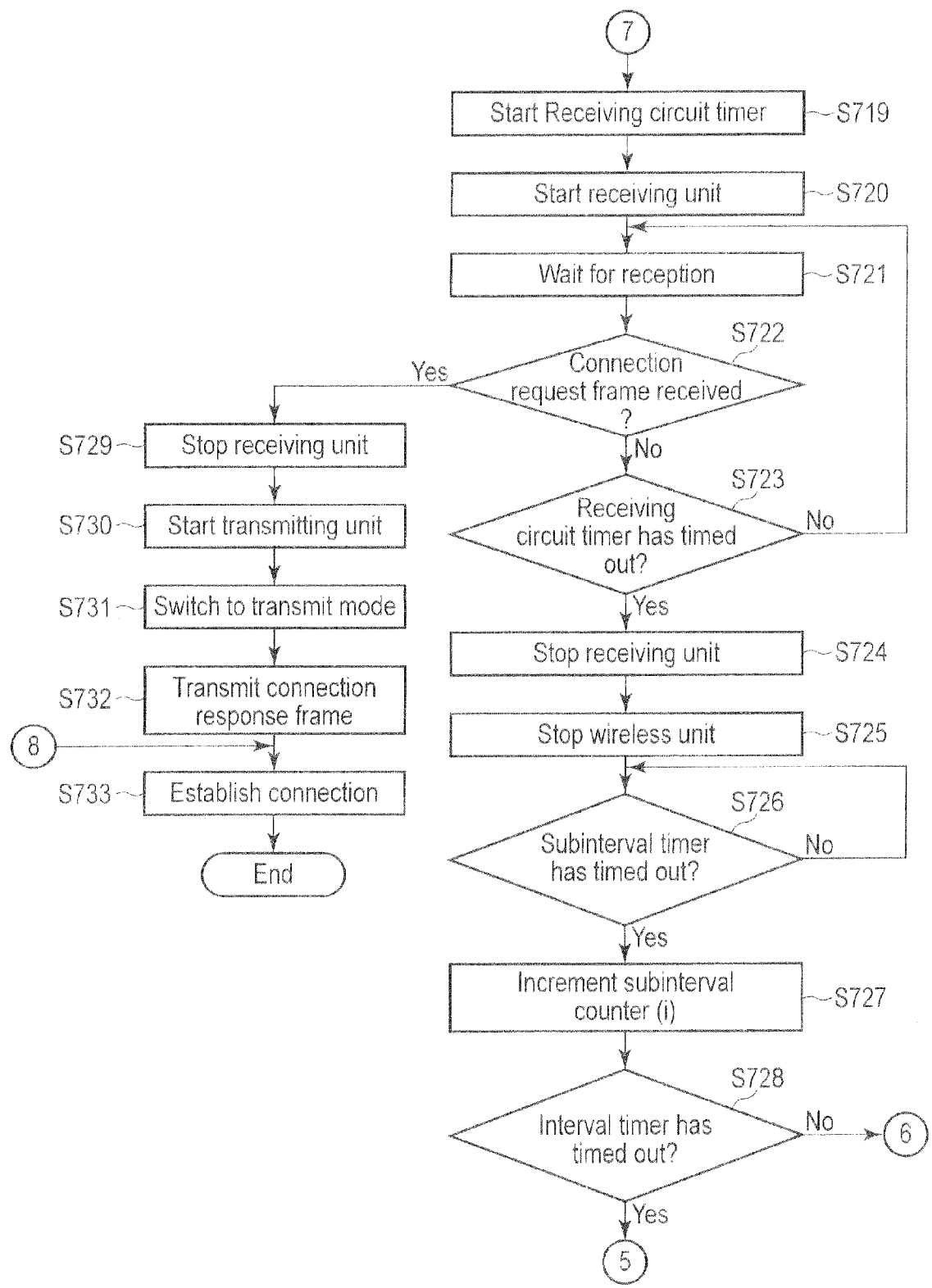

FIG. 7A and FIG. 7B illustrate an example of a connection trial process carried out by the wireless communication apparatus 600 to establish a wireless connection. Steps S701 to S705 in FIG. 7A involve the same operations as those in steps S301 to S305 in FIG. 3A and will thus not be described in detail.

When the user starts the wireless communication apparatus 600, the connection trial process shown in FIG. 7A and FIG. 7B starts. When the connection trial process starts, first, the interval timer 207 is started. When the first time interval elapses from the starting of the interval timer 207, the timer 207 outputs a timeout signal to the subinterval selection unit 208. Upon receiving the timeout signal from the interval timer 207, the subinterval selection unit 208 randomly selects one subinterval from a plurality of subintervals (step S701). In step S701, as described above, the subinterval selection unit 208 randomly selects one index s from the indices of 0 to 3 and provides the selected index s to the control unit 205.

Then, the control unit 205 sets the subinterval counter i to zero (step S702). Moreover, the control unit 205 starts the interval timer 207 (step S703), the wireless unit 202 (step S704), and the subinterval timer 206 (step S705).

Then, the control unit 205 determines whether or not the index s selected in step S701 is equal to the subinterval counter i (step S706). If the index s is equal to the subinterval counter i, the process proceeds to step S707. If the index s is not equal to the subinterval counter i, the process proceeds to step S719 in FIG. 7B.

If the index s is equal to the subinterval counter i, the control unit 205 starts the transmitting unit 203, and sets the wireless unit 202 to the transmit mode (step S707). The transmitting unit 203 transmits a connection request frame via the wireless unit 202 and the antenna 201 (step S708). After the transmitting unit 203 transmits the connection request frame, the control unit 205 stops the transmitting unit 203 (step S709). The control unit 205 then starts the receiving unit 204 (step S710) and switches the wireless unit 202 to the receive mode (step S711). Thus, the receiving unit 204 is set to a reception wait state in which the receiving unit 204 waits to receive a connection response frame for responding to the connection request frame transmitted in step S708.

Then, the control unit 205 determines whether or not the receiving unit 204 has received a connection response frame (step S712). If the receiving unit 204 has received a connection response frame, the process proceeds to step S733 in FIG. 7B. Then, a wireless connection with another wireless communication apparatus having responded to the connection request frame in step S709 is established (step S733).

If the receiving unit 204 is determined to have not received a connection response frame in step S712, the control unit 205 determines whether or not the subinterval timer 206 has timed out (step S713). If the subinterval timer 206 has not timed out, the control unit 205 stops the receiving unit 204, and sets the wireless unit 202 to the transmit mode (step S714). Thereafter, the process returns to step S707, and the wireless communication apparatus 600 repeats step S707 and the subsequent processing.

If the subinterval timer 206 has timed out in step S713, the control unit 205 stops the receiving unit 204 (step S715) and stops the wireless unit 202 (step S716). Moreover, the control unit 205 increments the subinterval counter i (step S717). Subsequently, the control unit 205 determines whether or not the interval timer 207 has timed out (step S718). If the interval timer 207 has timed out, the process returns to step S701. If the interval timer 207 has not timed out, the process returns to step S704.

On the other hand, if the index s of the selected subinterval is not equal to the subinterval counter i in step S706, the process proceeds to step S719 in FIG. 7B. The control unit 205 starts the receiving circuit timer 601 (step S719) and the receiving unit 204 (step S720). The receiving unit 204 waits to receive a connection request frame from another wireless communication apparatus (step S721).

The control unit 205 determines whether or not the receiving unit 204 has received a connection request frame (step S722). If the receiving unit 204 has not received a connection request frame, the control unit 205 determines whether or not the receiving circuit timer 601 has timed out (step 723). If the receiving circuit timer 601 has not timed out, the process returns to step S721. The receiving unit 204 waits to receive a connection request frame until the receiving circuit timer 601 times out.

If the receiving circuit timer 601 has timed out, the control unit 205 stops the receiving unit 204 (step S724) and stops the wireless unit 202 (step S725). Then, the control unit 205 determines whether or not the subinterval timer 206 has timed out (step S726). The control unit 205 waits until the subinterval timer 206 times out. When the subinterval timer 206 times out, the control unit 205 increments the subinterval counter i (step S727). Moreover, the control unit 205 determines whether or not the interval timer 207 has timed out (step S728). If the interval timer 207 has timed out, the process returns to step S701 in FIG. 7A. If the interval timer 207 has not timed out, the process returns to step S704 in FIG. 7A.

On the other hand, if the receiving unit 204 receives a connection request frame from another wireless communication apparatus in step S722, the control unit 205 stops the receiving unit 204 (step S729). The control unit 205 then starts the transmitting unit 203 (step S730), and switches the wireless unit 202 to the transmit mode (step S731). Then, to respond to the connection request frame received in step S722, the transmitting unit 203 transmits a connection response frame (step S732). When the other wireless communication apparatus receives the connection response frame from the wireless communication apparatus 600, a wireless connection is established between these wireless communication apparatuses (step S733).

Figure 8:
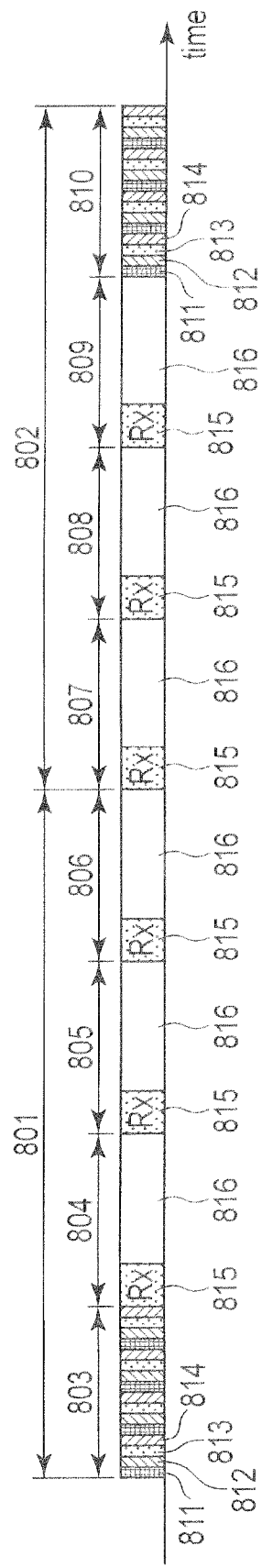
FIG. 8 is a timing chart illustrating the connection trial processes shown in FIG. 7A and FIG. 7B.

FIG. 8 is a timing chart illustrating the connection trial process in FIG. 7A and FIG. 7B. In FIG. 8, two consecutive intervals 801 and 802 are shown. The first interval 801 includes four subintervals 803 to 806. The second interval 802 includes four subintervals 807 to 810. For the first interval 801, the first subinterval 803 is selected by the subinterval selection unit 208. For the second interval 802, the fourth subinterval 810 is selected by the subinterval selection unit 208.

During the selected subintervals 803 and 810, the wireless communication apparatus 600 operates in a first operational state in which a transmission of a connection request frame and a wait for reception of a connection response frame provided in response to the connection request frame are repeatedly performed. More specifically, first, during a period 811 starting at the start time of each of the subintervals 803 and 810, the transmitting unit 203 transmits a connection request frame. After the connection request frame is transmitted, then during a period 812, the control unit 205 switches from the transmitting circuit to the receiving circuit. That is, the control unit 205 stops the transmitting unit 203, starts the receiving unit 204, and sets the wireless unit 202 to the receive mode.

Subsequently, the receiving unit 204 waits to receive a connection response frame for a predetermined period 813. If the receiving unit 204 fails to receive a connection response frame within the predetermined period 813, then during the period 814, the control unit 205 switches from the receiving circuit to the transmitting circuit. That is, the control unit 205 stops the receiving unit 204, starts the transmitting unit 203, and sets the wireless unit 202 to the transmit mode. Then, the transmitting unit 203 transmits a connection request frame again. In this manner, during each of the subintervals 803 and 810, the wireless communication apparatus repeatedly transmits a connection request frame and waits to receive a connection response frame.

During each of the subintervals other than the selected ones 803 and 810, that s, the subintervals 804 to 809, the wireless communication apparatus 600 operates in a second operational state in which a wait for reception of a connection request frame from another wireless communication apparatus is performed for a predetermined period 815. The reception wait period 815, during which the receiving unit 204 waits to receive a connection request frame, is equal to the total of the period 811 required to transmit a connection request frame, the period 812 required to switch from the transmitting circuit to the receiving circuit, the reception wait period 813 for a connection response frame, and the period 814 required to switch from the receiving circuit to the transmitting circuit. The reception wait period 815 for a connection request frame is also equal to the third time interval set in the receiving circuit timer 601. The total of the periods 811 to 814 corresponds to a unit time interval during which a transmission of a connection request frame and a wait for reception of a connection response frame provided in response to the connection request frame are performed.

During the remaining period 816 of each of the subintervals 804 to 809, the wireless unit 202, the transmitting unit 203, and the receiving unit 204 are stopped.

Figure 9:
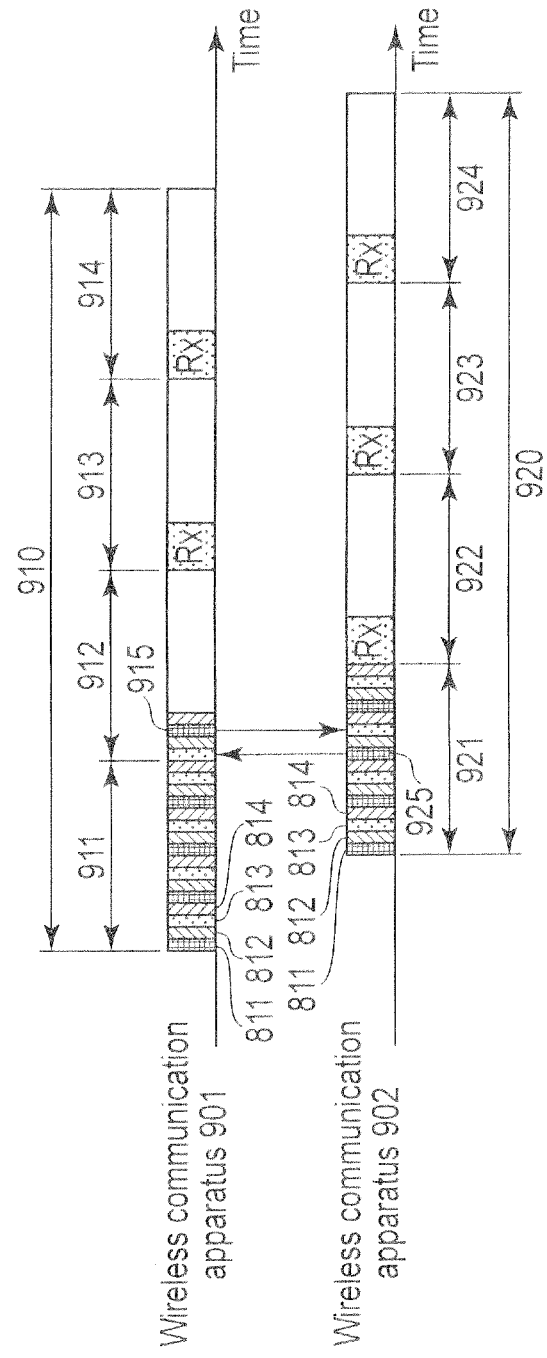
FIG. 9 is a timing chart illustrating that two wireless communication apparatuses each carry out the connection trial process shown in FIG. 7A and FIG. 7B.

FIG. 9 is a timing chart illustrating an example of connection trial processes carried out by wireless communication apparatuses 901 and 902 according to the present embodiment. The wireless communication apparatuses 901 and 902 are configured similarly to the wireless communication apparatus 600 shown in FIG. 6.

The wireless communication apparatus 901 operates based on an interval 910 including four subintervals 911 to 914. For the interval 910, the first subinterval 911 is selected by the subinterval selection unit 208. As described above with reference to FIG. 8, during the selected subinterval 911, the wireless communication apparatus repeatedly transmits a connection request frame and waits to receive a connection response frame. During each of the subintervals other than the selected one 911, that is, the subintervals 912, 913, and 914, the receiving unit 204 waits to receive a connection request frame from another wireless communication apparatus for the third time interval.

Furthermore, the wireless communication apparatus 902 operates based on an interval 920 including four subintervals 921 to 924. For the interval 920, the first subinterval 921 is selected by the subinterval selection unit 208. During the selected subinterval 921, the wireless communication apparatus 902 repeatedly transmits a connection request frame and waits to receive a connection response frame. During each of the subintervals other than the selected one 921, that is, the subintervals 922, 923, and 924, the receiving unit 204 waits to receive a connection request frame from another wireless communication apparatus for the third time interval. As shown in FIG. 9, the intervals 910 and 920 may begin at different points of time.

In FIG. 9, at a timing during the subinterval 921 when the wireless communication apparatus 902 transmits a connection request frame, the wireless communication apparatus 901 is waiting for reception. Thus, the wireless communication apparatus 901 receives a connection request frame 925 from the wireless communication apparatus 902. Upon receiving the connection request frame 925, the wireless communication apparatus 901 switches from the receiving circuit to the transmitting circuit. When a predetermined period elapses, the wireless communication apparatus 901 transmits a connection response frame 915. When the wireless communication apparatus 902 receives the connection response frame 915 from the wireless communication apparatus 901, a wireless connection is established between the wireless communication apparatuses 901 and 902.

As described above, the wireless communication apparatus according to the second embodiment randomly selects one subinterval from a plurality of subintervals included in each interval. Then, during the selected subinterval, the wireless communication apparatus transmits a connection request frame. During each of the subintervals other than the selected one, the wireless communication apparatus waits to receive connection response frame from another wireless communication apparatus. Thus, a wireless connection with the other wireless communication apparatus, serving as a communication partner, can be established without the need to set an operation mode different from that for the other wireless communication apparatus. Moreover, the wireless communication apparatus according to the present embodiment uses the receiving circuit timer 601 to limit the period when the receiving unit 204 waits for reception, to a small value. This enables a reduction in the power consumption of the receiving unit 204. The second embodiment is preferable in the case where the receiving unit 204 consumes a large amount of power.

Third Embodiment

In the first and second embodiments, the wireless communication apparatus has been described which carries out a connection trial process using a particular frequency channel. In contrast, in a third embodiment, a wireless communication apparatus will be described which carries out a connection trial process using a plurality of frequency channels.

In the present embodiment, each interval is assumed to include four subintervals as is the case with the above-described embodiments. Furthermore, as is the case with the second embodiment, the wireless communication apparatus according to the present embodiment transmits a connection request frame during a selected subinterval, and during each of the subintervals other than the selected one, waits to receive a connection response frame from another wireless communication apparatus.

Figure 10:
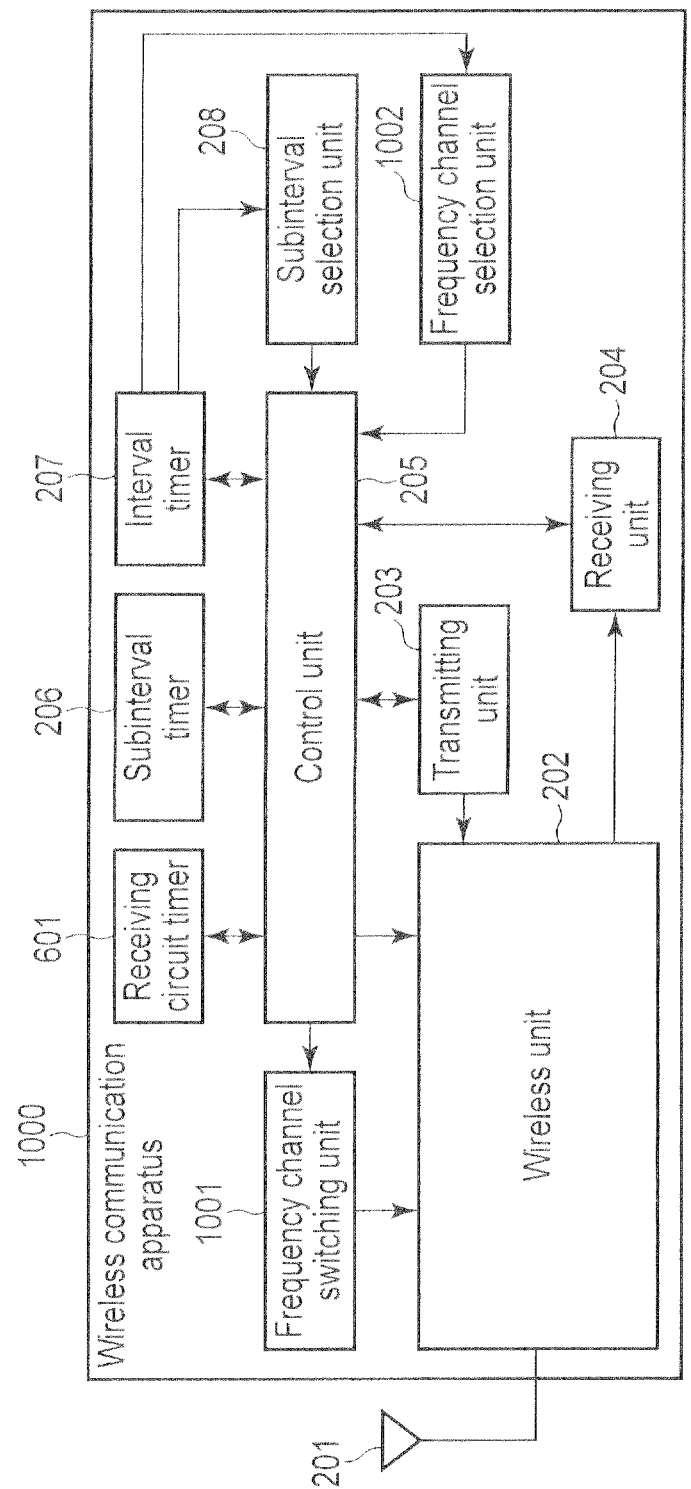
FIG. 10 is a block diagram schematically showing wireless communication apparatus according to a third embodiment.

FIG. 10 schematically shows a wireless communication apparatus 1000 according to the third embodiment. The wireless communication apparatus 1000 includes a frequency channel switching unit 1001 and a frequency channel selection unit 1002 in addition to the components of the wireless communication apparatus 600 shown in FIG. 6. The frequency channel selection unit 1002 randomly selects one frequency channel from a plurality of frequency channels used for a connection trial process. The frequency channel switching unit 1001 switches the frequency channel used by the wireless unit 202, in accordance with the frequency channel selected by the frequency channel selection unit 1002.

Figure 11A:
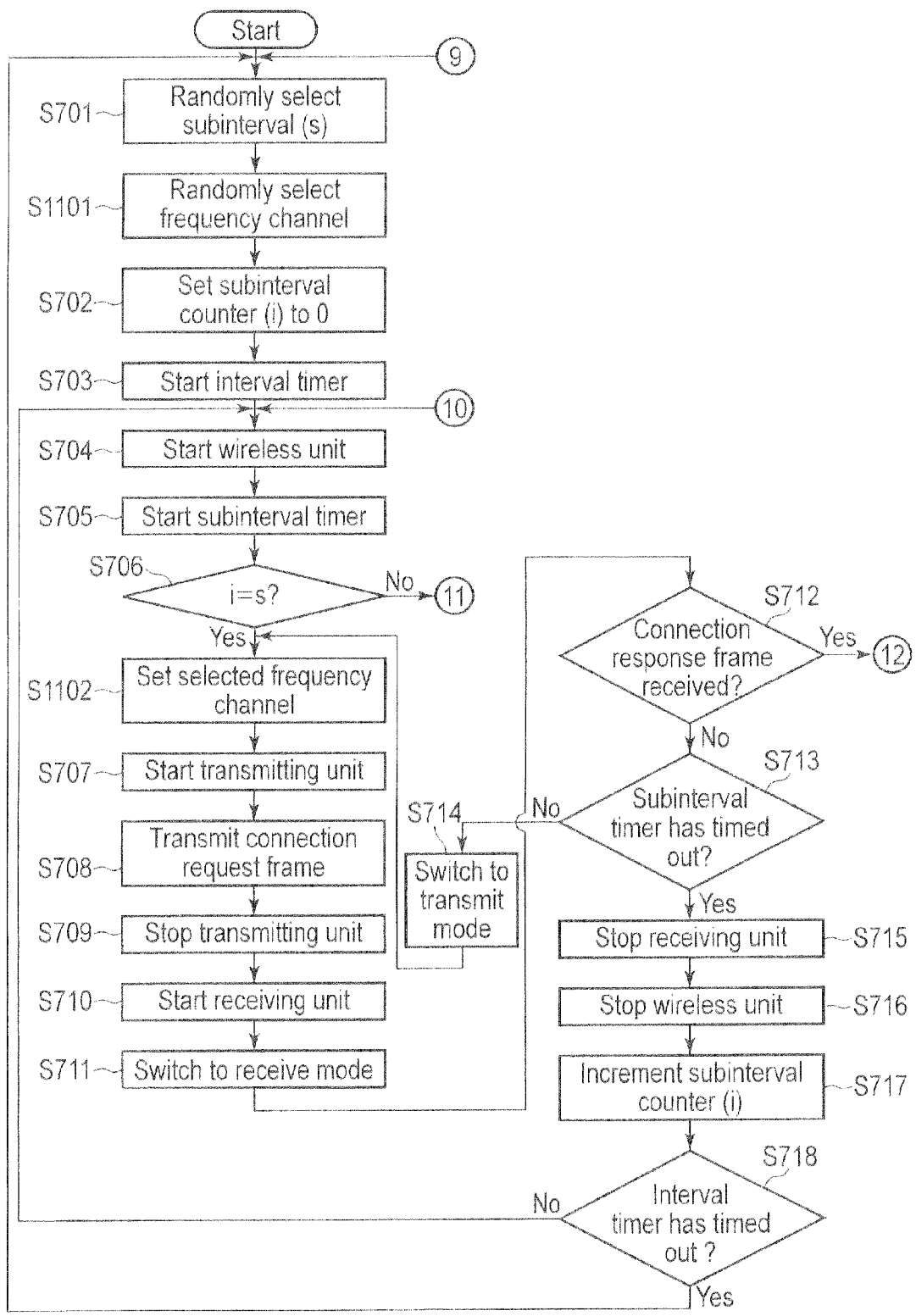
FIG. 11A and FIG. 11B are a series of flowcharts illustrating an example of a connection trial process carried out the wireless communication apparatus shown in FIG. 10.
Figure 11B:
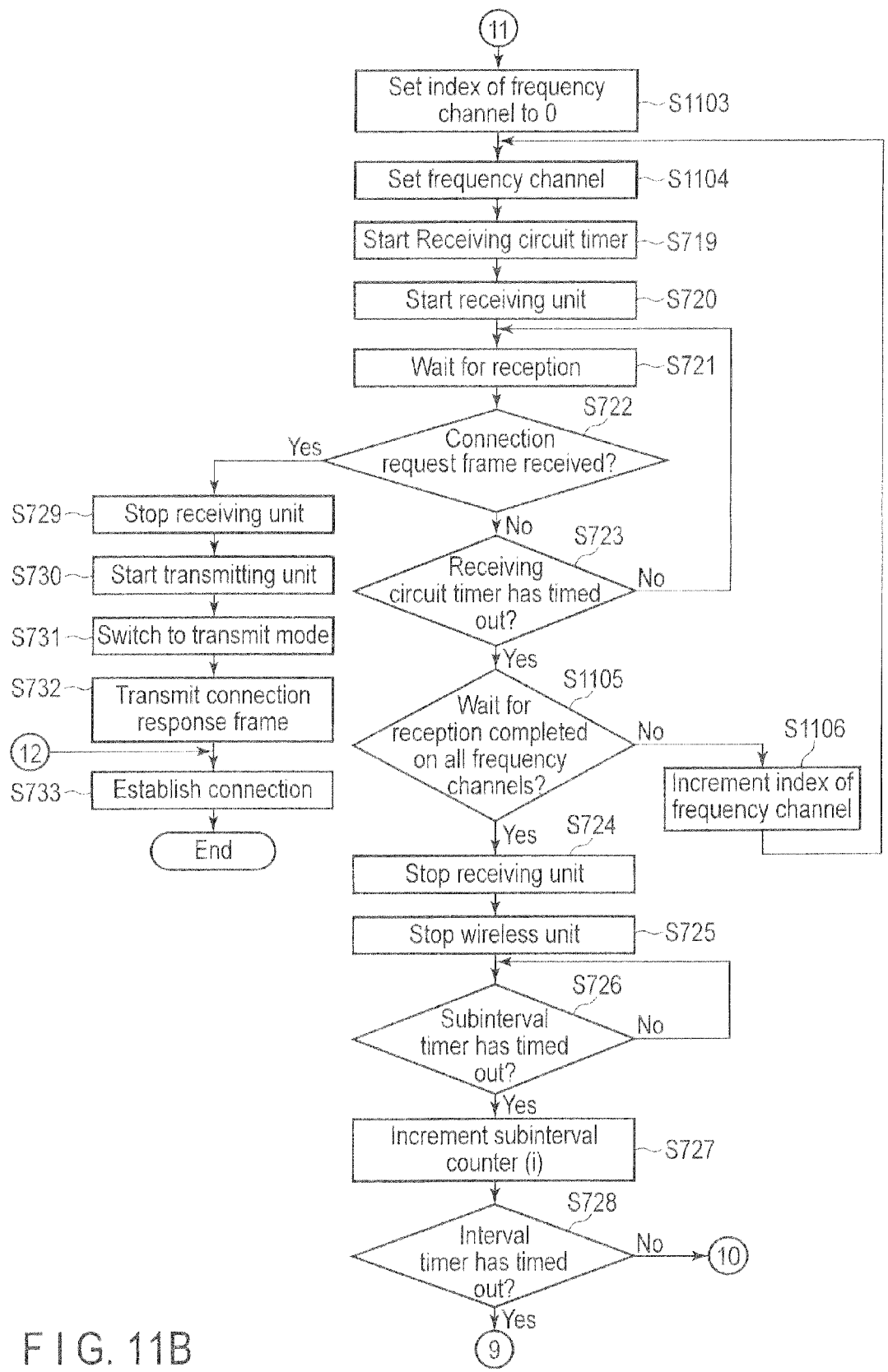

FIG. 11A and FIG. 11B show an example of a connection trial process carried out by the wireless communication apparatus 1000. The same steps in FIG. 11A and FIG. 11B as those in FIG. 7A and FIG. 7B are denoted by reference numerals similar to those shown in FIG. 7A and FIG. 7B. Description of these steps is appropriately omitted.

As shown in FIG. 11A, when started by the user, the wireless communication apparatus 1000 starts a connection trial process. In the connection trial process, first, the interval timer 207 is started. In the present embodiment, when the first time interval elapses from the starting of the interval timer 207, the interval timer 207 outputs a timeout signal to the subinterval selection unit 208 and the frequency selection unit 1002. Upon receiving the timeout signal from the interval timer 207, the subinterval selection unit 208 randomly selects one of the plurality of subintervals (step S701). As described above, the subinterval selection unit 208 randomly selects one index s from the indices of 0 to 3, and provides the index s to the control unit 205.

Then, upon receiving the timeout signal from the interval timer 207, the frequency channel selection unit 1002 randomly selects one frequency channel from the plurality of frequency channels, and provides the selected frequency channel to the control unit 205 (step S1101). In the present embodiment, the number of the frequency channels used is four, and the four frequency channels are indexed with 0, 1, 2, and 3, respectively. The frequency channel selection unit 1002 randomly selects one index f from the indices of 0 to 3, and provides the selected index f to the control unit 205.

Upon receiving the index s of the subinterval and the index f of the frequency channel, the control unit 205 sets the subinterval counter i to zero (step S702). Moreover, the control unit 205 starts the interval timer 207 (step S703), the wireless unit 202 (step S704), and the subinterval timer 206 (step S705).

Then, the control unit 205 determines whether or not the index s selected in step S701 is equal to the subinterval counter i (step S706). If the selected index s is equal to the subinterval counter i, the process proceeds to step S1102. Otherwise the process proceeds to step S1103 in FIG. 11B.

If the selected index s is equal to the subinterval counter i, the frequency channel switching unit 1001 sets the selected frequency channel selected in step S1101, for the wireless unit 202 (step S1102). Specifically, the control unit 205 provides the index f of the frequency channel selected in step S1101 to the frequency channel switching unit 1001. The frequency channel switching unit 1001 switches the frequency channel used by the wireless unit 202 to the frequency channel with the index f.

Then, the control unit 205 starts the transmitting unit 203 (step S707). The transmitting unit 203 transmits a connection request frame via the wireless unit 202 and the antenna 201 (step S708). After the transmitting unit 203 transmits the connection request frame, the control unit 205 stops the transmitting unit 203 (step S709). The control unit 205 further starts the receiving unit 204 (step S710) and switches the wireless unit 202 to the receive mode (step S711). Thus, the receiving unit 204 waits to receive a connection response frame provided in response to the connection request frame transmitted in step S709.

Then, the control unit 205 determines whether or not the receiving unit 204 has received a connection response frame (step S712). If the receiving unit 204 has received a connection response frame, the process proceeds to step S733 in FIG. 115. Then, a wireless connection with another wireless communication apparatus having responded to the connection request frame of step S708 is established (step S733).

In step S712, if the receiving unit 204 has not received a connection response frame, the control unit 205 determines whether or not the subinterval timer 206 has timed out (step S713). If the subinterval timer 206 has not timed out, the control unit 205 stops the receiving unit 204 and switches the wireless unit 202 to the transmit mode (step S714). Thereafter, the process returns to step S1102, and step S1102 and the subsequent steps are repeated.

In step S713, if the subinterval timer 206 has timed out, the process proceeds to step S715. Processing in steps S715 to S718 is similar to that described with reference to FIG. 7A and will thus not be described below.

On the other hand, if the index s of the selected subinterval is not equal to the subinterval counter i in step S706 in FIG. 11A, the process proceeds to step S1103 in FIG. 11B. The control unit 205 sets the index of the frequency channel to zero (step S1103). The control unit 205 then provides the index to the frequency channel switching unit 1001. The frequency channel switching unit 1001 sets the frequency channel with the index received from the control unit 205, for the wireless unit 202 (step S1104). Then, the control unit 205 starts the receiving circuit timer 601 (step S719) and the receiving unit (step S720). The receiving unit 204 waits to receive a connection request frame transmitted by another wireless communication apparatus on the frequency channel set in step S1104 (step S721).

The control unit 205 determines whether or not the receiving unit 204 has received a connection request frame (step S722). If the receiving unit 204 has not received a connection request frame, the control unit 205 determines whether or not the receiving circuit timer 601 has timed out (step S723). If the receiving circuit timer 601 has not timed out. The process returns to step S721. Thus, the receiving unit 204 continues to wait to receive a connection request frame until the receiving circuit timer 601 times out.

If the receiving circuit timer 601 has timed out, the control unit 205 determines whether or not a wait for reception has been carried out on all the frequency channels (step S1105). If a wait for reception has failed to be carried out on any frequency channel, the process proceeds to step S1106. The control unit 205 increments the index of the frequency channel (step S1106). Subsequently, the control unit 205 provides the index of the frequency channel updated in step S1106, to the frequency channel switching unit 1001. The process returns to step S1104.

Upon determining in step S1105 that a wait for reception has been carried out on all the frequency channels, the process proceeds to step S724. Processing in step S724 and the subsequent steps is similar to that described with reference to FIG. 7B and will thus not be described below. In step S728 in FIG. 11B, if the interval timer 207 has timed out, the process returns to step S701 in FIG. 11A. If the interval timer 207 has not timed out, the process returns to step S704 in FIG. 11A.

On the other hand, when the receiving unit 204 receives a connection response frame from another wireless communication apparatus in step S722, the control unit 205 stops the receiving unit 204 (step S729). The control unit 205 further starts the transmitting unit 203 (step S730) and switches the wireless unit 202 to the transmit mode (step 731). Then, to respond to the connection request frame received in step S722, the transmitting unit 203 transmits a connection response frame (step S732). When the other wireless communication apparatus receives the connection response frame 600, a wireless connection is established (step S733).

FIG. 12 is a timing chart illustrating the connection trial process shown in FIG. 11A and FIG. 11B. In FIG. 12, a wireless communication apparatus 1000 operates based on an interval 1201 with four subintervals 1202 to 1205. For the interval 1201, the third subinterval 1204 is selected by the subinterval selection unit 208 and a frequency channel 1 is selected by the frequency channel selection unit 1002.

During the selected subinterval 1204, the wireless communication apparatus 1000 repeatedly transmits a connection request frame and waits to receive a connection response frame. More specifically, first, during the first period 1214 of the subinterval 1204, the frequency channel for the wireless unit 202 is set to the frequency channel 1 and the transmitting unit 203 transmits a connection request frame on the frequency channel 1. Hereinafter, a frequency channel with the index f is referred to as a frequency channel f.

After the transmission of the connection request frame, during a period 1215, the control unit 205 switches from the transmitting circuit to the receiving circuit. Then, the receiving unit 204 waits to receive a connection response frame for a predetermined period 1216. If no connection response frame has been received during the period 1216, then during a period 1217, the control unit 205 switches from the receiving circuit to the transmitting circuit. Thereafter, the transmitting unit 203 retransmits a connection request frame. In this manner, during the selected subinterval, the wireless communication apparatus uses the selected frequency channel to repeatedly transmit a connection request frame and wait to receive a connection response frame.

During each of the subintervals other than the selected subinterval 1204, that is, the subintervals 1202, 1203, and 1205, the wireless communication apparatus 1000 waits to receive a connection request frame from another wireless communication apparatus on each frequency channel for a predetermined period. For example, in the subinterval 1202, first, during a period 1206, a frequency channel 0 is set for the wireless unit 202. The receiving unit 204 waits to receive a connection request frame on the frequency channel 0. If no connection request frame has been received during the period 1206, then during a period 1210, the wireless unit 202 is switched to the frequency channel 1. During a period 1207, the receiving unit 204 waits to receive a connection request frame on the frequency channel 1. Moreover, if no connection request frame has been received during the period 1207, then during a period 1211, the wireless unit 202 is switched to a frequency channel 2. During a period 1208, the receiving unit 204 waits to receive a connection request frame on the frequency channel 2. Furthermore, if no connection request frame has been received during the period 1208, then during a period 1212, the wireless unit 202 is switched to a frequency channel 3. During a period 1209, the receiving unit 204 waits to receive a connection request frame on the frequency channel 3. In this manner, during each of the subintervals 1202, 1203, and 1204, the wireless communication apparatus 1000 waits for reception on all the frequency channels.

Each of the reception wait periods 1206 to 1209 for a connection request frame is equal to the total of a period 1214 required to transmit a connection request frame, a period 1215 required to switch from the transmitting circuit to the receiving circuit, a reception wait period 1216 for a connection response frame, and a period 1217 required to switch from the receiving circuit to the transmitting circuit. Furthermore, each of the reception wait periods 1206 to 1209 is equal to the third time interval set in the receiving circuit timer 601.

During the remaining period 1213 in each of the subintervals 1202, 1203, and 1205, the wireless unit 202, the transmitting unit 203, and the receiving unit 204 are stopped.

Figure 13:
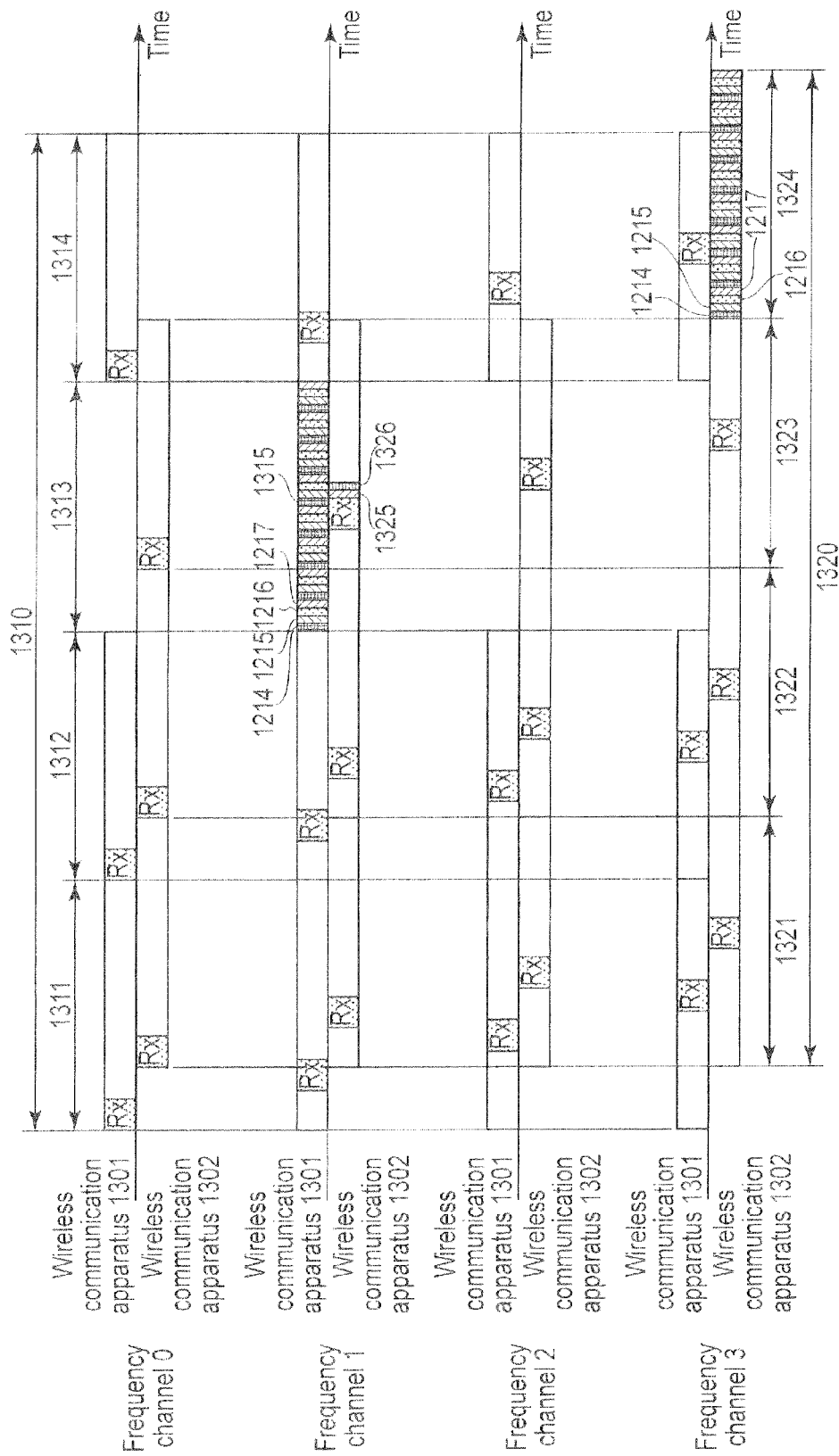
FIG. 13 is a timing chart illustrating that two wireless communication apparatuses each carry out the connection trial process shown in FIG. 11A and FIG. 11B.

FIG. 13 is a timing chart illustrating an example of a connection trial process carried out by wireless communication apparatuses 1301 and 1302 according to the present embodiment. Each of the wireless communication apparatuses 1301 and 1302 is configured similarly to the wireless communication apparatus 1000 shown in FIG. 10.

The wireless communication apparatus 1301 operates based on an interval 1310 including four subintervals 1311 to 1314. For the interval 1310, the third subinterval 1313 is selected by the subinterval selection unit 208. During the selected subinterval 1313, the wireless communication apparatus 1301 repeatedly transmits a connection request frame and waits to receive a connection response frame, on the frequency channel selected by the frequency channel selection unit 1002. In this example, the frequency channel 1 is selected. Furthermore, during each of the subintervals other than the selected subinterval 1313, that is, the subintervals 1311, 1312, and 1314, the wireless communication apparatus 1301 waits to receive a connection request frame from another wireless communication apparatus on each frequency channel for a predetermined period.

Furthermore, the wireless communication apparatus 1302 operates based on an interval 1320 with four subintervals 1321 to 1324. For the interval 1320, the fourth subinterval 1324 is selected by the subinterval selection unit 208. During the selected subinterval 1324, the wireless communication apparatus 1302 repeatedly transmits a connection request frame and waits to receive a connection response frame, on the frequency channel selected by the frequency channel selection unit 1002. In this example, the frequency channel 3 is selected. Furthermore, during each of the subintervals other than the selected subinterval 1324, that is, the subintervals 1321, 1322, and 1323, the wireless communication apparatus 1302 waits to receive a connection request frame from another wireless communication apparatus on each frequency channel for a predetermined period.

In FIG. 13, at a timing during the subinterval 1313 when the wireless communication apparatus 1301 transmits a connection request frame 1315 on the frequency channel 1, the wireless communication apparatus 1302 is waiting for reception on the frequency channel 1. Thus, the wireless communication apparatus 1302 receives the connection request frame 1315 from the wireless communication apparatus 1301. Upon receiving the connection request frame 1315, the wireless communication apparatus 1302 switches from the receiving circuit to the transmitting circuit during the period 1325 and transmits a connection response frame 1326 in response to the connection request frame 1315. When the wireless communication apparatus 1301 receives the connection response frame 1326, a wireless connection is established between the wireless communication apparatuses 1301 and 1302.

As described above, the wireless communication apparatus according to the third embodiment searches for another wireless communication apparatus serving as a communication partner, while switching among predetermined frequency channels. Thus, a wireless connection can be established without the need to set an operation mode different from that for the other wireless communication apparatus and to set the same frequency channel as that for the other wireless communication apparatus.

Fourth Embodiment

FIG. 14 schematically shows a wireless communication apparatus 1400 according to a fourth embodiment. The wireless communication apparatus 1400 shown in FIG. 14 includes a response signal timer (also referred to as a fourth timer) 1401 in addition to the components of the wireless communication apparatus 1000 shown in FIG. 10. The response signal timer 1401 is used to limit the reception wait time for a connection response frame provided in response to a connection request frame which the transmitting unit 203 transmits. The response signal timer 1401 measures or generates a fourth time interval. When the fourth time interval elapses from starting of the response signal timer 1401, the timer 1401 times out and outputs a timeout signal.

Figure 15A:
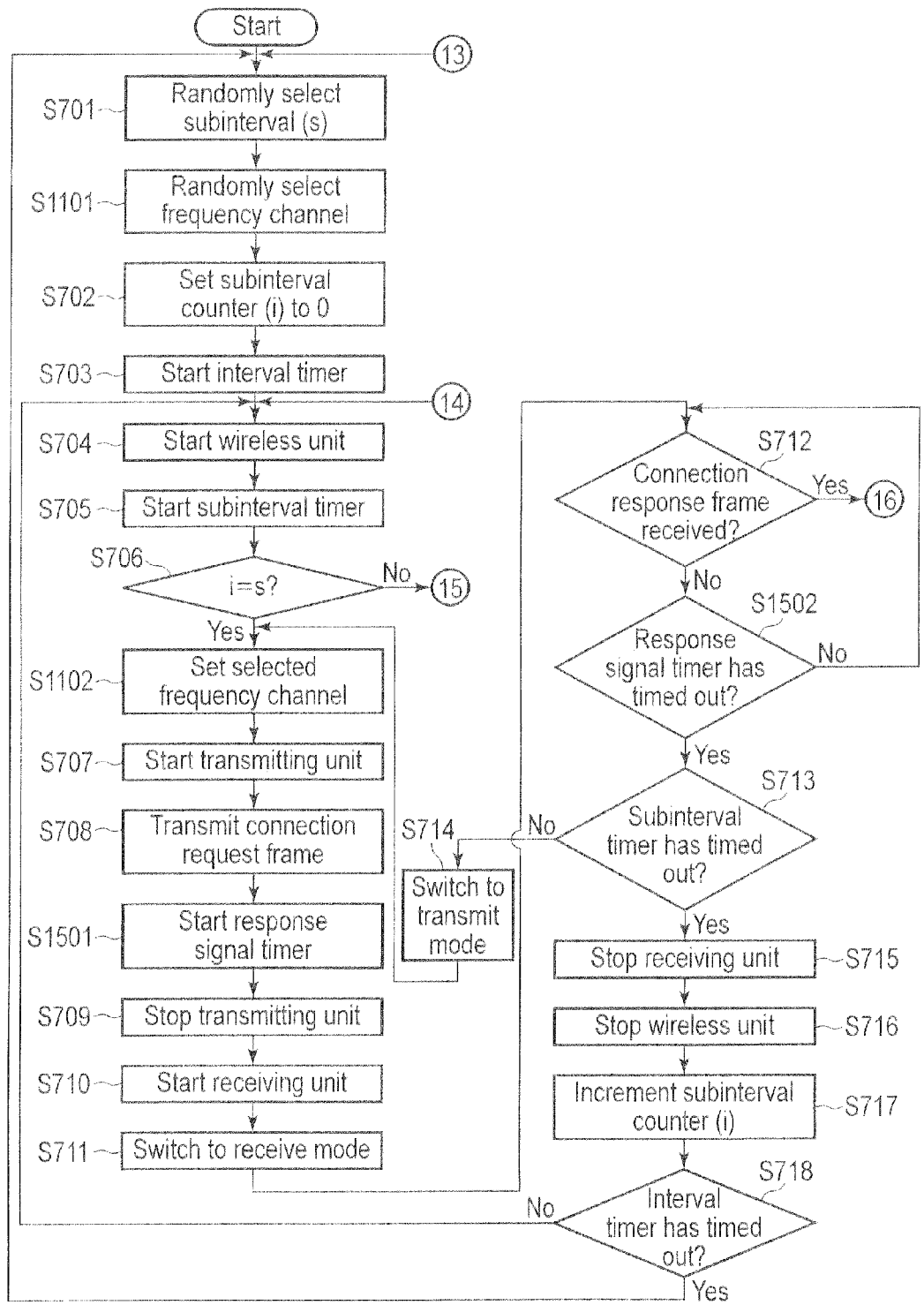
FIG. 15A and FIG. 15B are a series of flowcharts illustrating an example of a connection trial process carried out the wireless communication apparatus shown in FIG. 14.
Figure 15B:
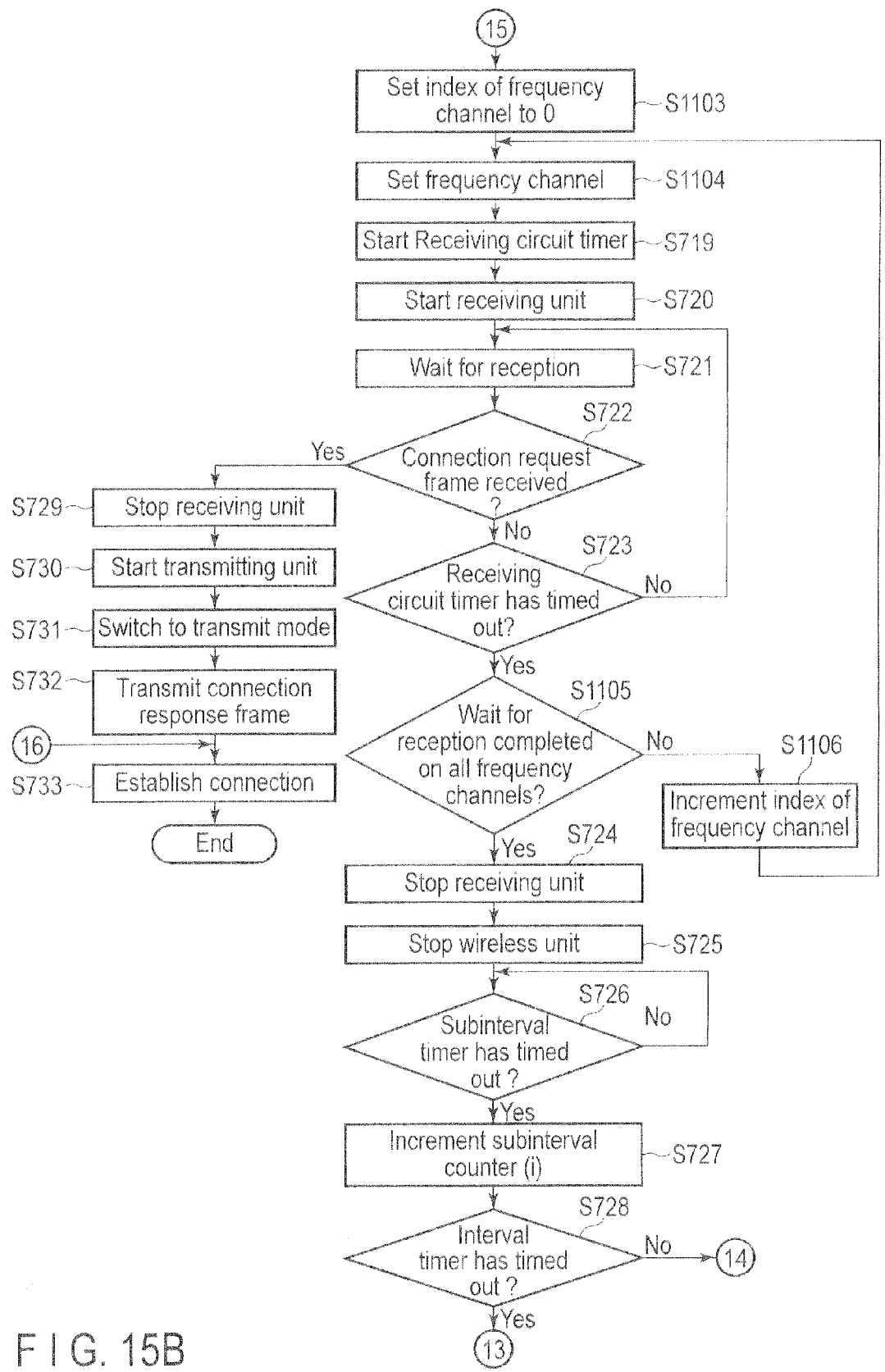

FIG. 15A and FIG. 15B illustrate an example of a connection trial process carried out by the wireless communication apparatus 1400. The same steps in FIG. 15A as those in FIG. 7A and FIG. 11A are denoted by reference numerals similar to those shown in FIG. 7A and FIG. 11A. Description of these units and portions is appropriately omitted. Processing illustrated in FIG. 15B is the same as that described above with reference to FIG. 11B and will not be described below.

Processing in step S701 to step S706 in FIG. 15A is the same as that described above with reference to FIG. 11A and will not be described below. In step S706, if the index s of the subinterval selected in step S701 is equal to the subinterval counter i, the process proceeds to step S1102. Otherwise the process proceeds to step S1103 in FIG. 153.

If the index s is equal to the subinterval counter i in step S706, the control unit 205 provides the index f of the frequency channel selected in step S1101 to the frequency channel switching unit 1001. The frequency channel switching unit 1001 sets the frequency channel with the index f for the wireless unit 202 (step S1102). Moreover, the control unit 205 starts the transmitting unit 203 (step S707). The transmitting unit 203 transmits a connection request frame via the wireless unit 202 and the antenna 201 (step S708). After the transmitting unit 203 transmits the connection request signal, the control unit 205 starts the response signal timer 1401 (step S1501). Moreover, the control unit 205 stops the transmitting unit 203 (step 709) and starts the receiving unit 204 (step S710). The control unit 205 further switches the wireless unit 202 to the receive mode (step S711). Thus, the receiving unit 204 starts to wait to receive a connection response frame for responding to the connection request frame transmitted in step S709.

Then, the control unit 205 determines whether or not the receiving unit 204 has received a connection response frame (step S712). If the receiving unit 204 has received a connection response frame, the process proceeds to step S733 in FIG. 15B. Then, a wireless connection with another wireless communication apparatus having responded to the connection request frame in step S708 is established (step S733).

If the receiving unit 204 has not received connection response frame, the control unit 205 determines whether or not the response signal timer 1401 has timed out (step S1502). If the response signal timer 1401 has not timed out, the process returns to step S712. If the response signal timer 1401 has timed out, the process proceeds to step S713. That is, the receiving unit 204 continues to wait to receive a connection response frame after the wireless unit 202 is switched to the receive mode in step S711 and before the response signal timer 1401 times out.

Processing in step S713 and the subsequent steps in FIG. 15A is the same as that described above with reference to FIG. 7A and will not be described below.

Figure 16:
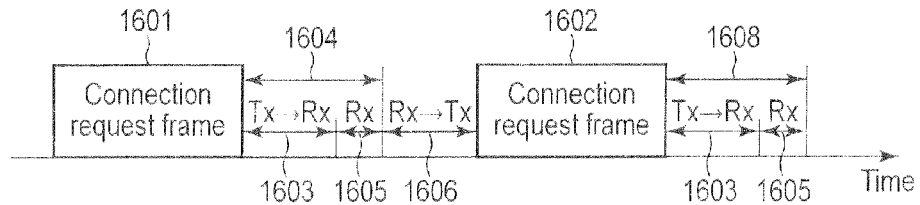
FIG. 16 is a schematic diagram illustrating a reception wait period for a connection response frame during the connection trial process shown in FIG. 11A and FIG. 11B.

FIG. 16 is a timing chart illustrating an example of a process in which the wireless communication apparatus 1400 transmits a connection request frame. During the subinterval selected by the subinterval selection unit 208, the transmitting unit 203 of the wireless communication apparatus 1400 transmits a connection request frame 1601 using the frequency channel selected by the frequency channel selection unit 1002. At a timing when the transmitting unit 203 completes transmitting the connection request frame, the control unit 205 starts the response signal timer 1401. The control unit 205 further switches the wireless unit 202 to the receive mode, and starts the receiving unit 204. The receiving unit 204 waits to receive a connection response frame until the response signal timer 1401 times out.

A period 1604 shown in FIG. 16 indicates the fourth time interval measured by the response signal timer 1401. A period 1603 indicates a period required to switch the wireless unit 202 from the transmit mode to the receive mode. A period 1605 when the receiving unit 204 waits for reception corresponds to the fourth time interval 1604 minus the period 1603 required to switch the operation mode of the wireless unit 202. By way of example, given that the fourth time interval is set to 3 microseconds and that the period required to switch from the transmit mode to the receive mode is 2 microseconds, the reception wait time for a connection response frame is 1 microsecond.

If no connection response frame is received before the response signal timer 1401 times out, then during a period 1606, the control unit 205 switches the wireless unit 202 to the transmit mode. Thereafter, the transmitting unit 203 retransmits the connection request frame 1602.

In the present embodiment, a unit time interval during which a transmission of a connection request frame and a wait for reception of a connection response frame provided in response to the connection request frame are performed, is equal to the total of the period 1601 required to transmit a connection request frame, the fourth time interval 1604, and the period 1606 required to switch from the receiving circuit to the transmitting circuit.

As described above, the wireless communication apparatus according to the present embodiment transmits a connection request frame while using the response signal timer 1401 to limit the reception wait period for a connection response frame for responding to a connection request frame, to the minimum required value. This enables a reduction in the time required to establish a connection.

Fifth Embodiment

In a fifth embodiment, the reception wait period for a connection request frame from another wireless communication apparatus will be described.

Figure 17A:
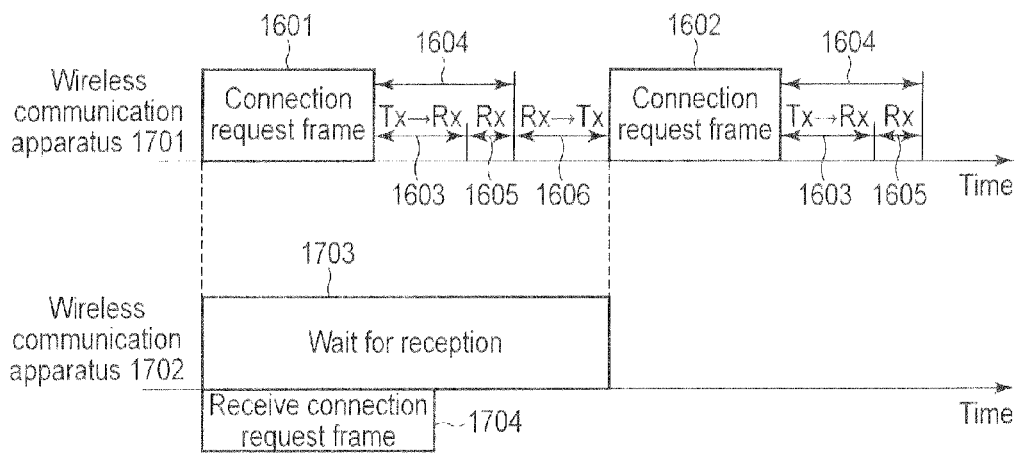
FIG. 17A is a schematic diagrams illustrating an example of a reception wait period for a connection request frame during the connection trial process shown in FIG. 11A and FIG. 11B.
Figure 17B:
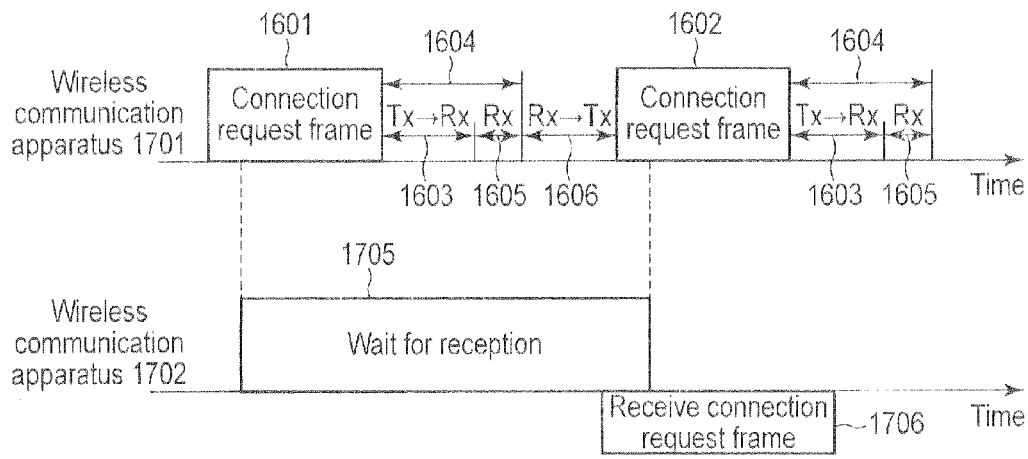
FIG. 17B is a schematic diagrams illustrating another example of a reception wait period for a connection request frame during the connection trial process shown in FIG. 11A and FIG. 11B.

FIG. 17A and FIG. 17B are timing chart showing examples of a process of a wait for reception of a connection request frame. More specifically, FIG. 17A and FIG. 17B illustrate examples in which at a timing when a wireless communication apparatus 1701 transmits a connection request frame, a wireless communication apparatus 1702 is waiting to receive a connection request frame. Each of the wireless communication apparatus 1701 and 1702 is configured similarly to the wireless communication apparatus 1400 shown in FIG. 14.

In the present embodiment, reception wait periods 1703 and 1705 are each equal to the total of a period 1601 required to transmit a connection request frame, the fourth time interval 1604 measured by the response signal timer 1401, and a period 1606 required to switch from the receive mode to the transmit mode.

As shown in FIG. 17A, if the wireless communication apparatus 1702 is waiting for reception at a timing when the wireless communication apparatus 1701 transmits a connection request frame 1601, the wireless communication apparatus 1702 receives the connection request frame during a period 1704.

Furthermore, as shown in FIG. 17B, if the wireless communication apparatus 1701 starts to wait for reception after the start time of the period when the wireless communication apparatus 1701 transmits the connection request frame 1601, then during a period 1706, the wireless communication apparatus 1702 receives the next connection request frame 1602 transmitted by the wireless communication apparatus 1701.

As described above, a connection request frame can be reliably received by setting the reception wait period for a connection request frame equal to the total of the period required to transmit the connection request frame, the fourth time interval measured by the response signal timer 1401, and the period required to switch from the receive mode to the transmit mode. The reception wait period for a connection request frame may be set longer than the total time.

Sixth Embodiment

In each of the above-described embodiments, while waiting to receive a connection response frame provided to response to a connection request frame, the wireless communication apparatus may receive a connection request frame from another wireless communication apparatus. In a sixth embodiment, a connection trial process will be described which is carried out by the wireless communication apparatus 1400 shown in FIG. 14 taking into account the case where while waiting to receive a connection response frame, the wireless communication apparatus receives a connection request frame from another wireless communication apparatus.

Figure 18B:
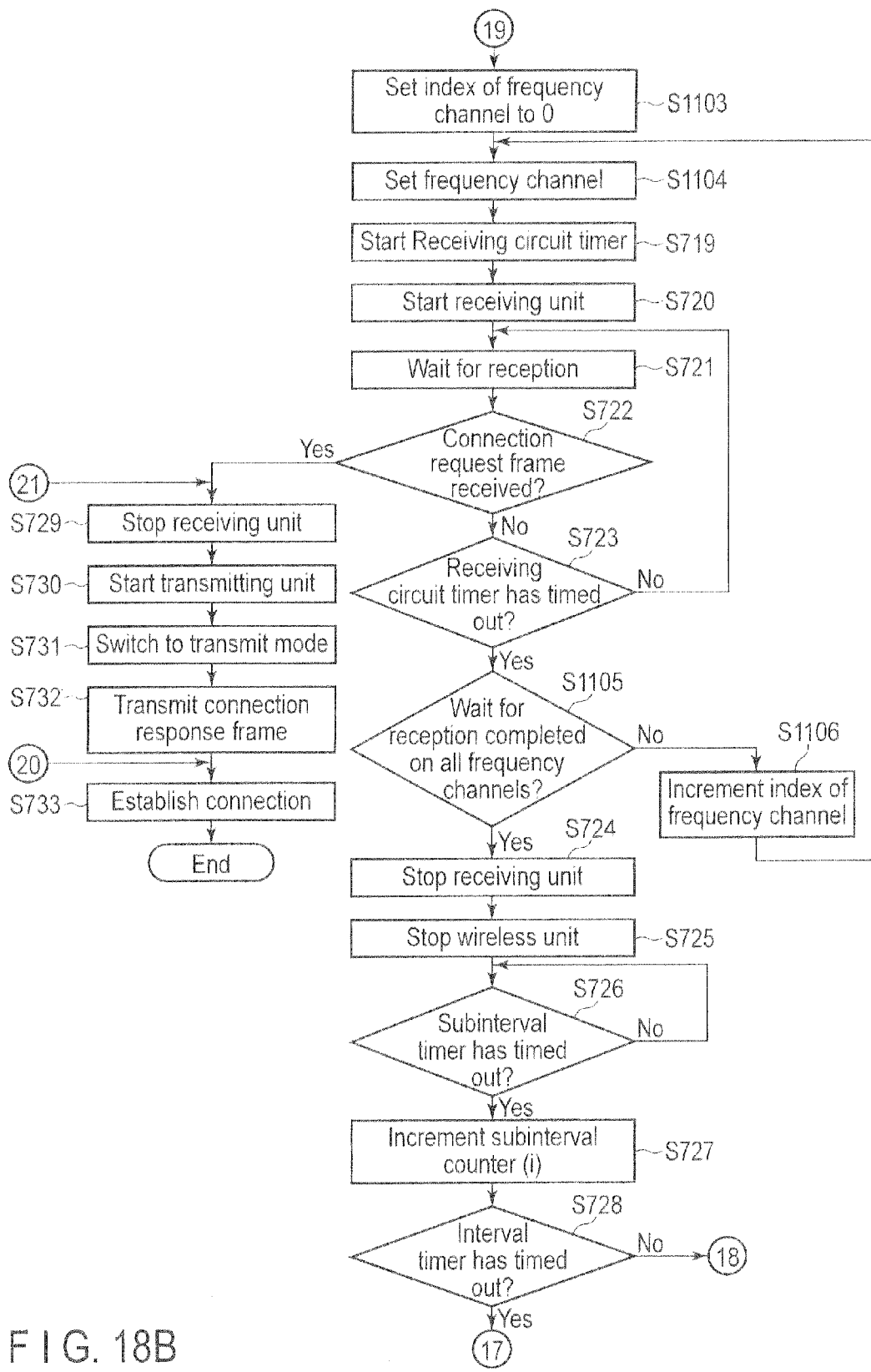

FIG. 18A and FIG. 18B show an example of a connection trial process according to the present embodiment. The same steps in FIG. 18A as those in FIG. 7A, FIG. 21A, and FIG. 15A are denoted by reference numerals similar to those shown in FIG. 7A, FIG. 11A, and FIG. 15A. Description of these steps is appropriately omitted. Processing illustrated in FIG. 18B is the same as that described above with reference to FIG. 11B and will not be described below.

In FIG. 18A, step S1801 is additionally carried out between step S712 and step S1502. In step S712, while waiting to receive a connection response frame provided in response to the connection request frame transmitted in step S709, the wireless communication apparatus determines whether or not the receiving unit 204 has received a connection response frame. If the receiving unit 204 has received a connection response frame, the process proceeds to step S733 in FIG. 18B, where a wireless connection is established.

If the receiving unit 204 has received a connection response frame, the process proceeds to step S1801. The control unit 205 determines whether or not the receiving unit 204 has received a connection request frame from another wireless communication apparatus while waiting to receive a connection response frame provided in to response to the connection request frame transmitted in step S709 (S1801). If the receiving unit 204 has not received a connection request frame, the process proceeds to step S1502. Processing in step S1502 and the subsequent steps is the same as that described above with reference to FIG. 7A and will not be described below.

If the receiving unit 204 has received a connection request frame in step S1801, the process proceeds to step S729 in FIG. 18B. The control unit 205 stops the receiving unit 204 (step S729), starts the transmitting unit 203 (step S730), and switches the wireless unit 202 to the transmit mode (step S731). Then, the transmitting unit 203 transmits a connection response frame (step S732). The connection response frame is received by the other wireless communication apparatus, therefore a wireless connection is established (step 733).

As described above, when a connection request frame is received during a wait for reception of a connection response frame, responding to the received connection request frame allows a connection to be established even if both two wireless communication apparatus are operating in a first operational state.

Seventh Embodiment

FIG. 19 schematically shows a wireless communication apparatus 1900 according to a seventh embodiment. The wireless communication apparatus 1900 includes a cyclic redundancy check (CRC) parity addition unit 1901, a signal detection unit 1902, and a CRC operation unit 1903 in addition to the components of the wireless communication apparatus 1400 shown in FIG. 14.

The CRC parity addition unit 1901 adds a CRC parity code to a transmission frame output from the control unit 205. The CRC parity addition unit 1901 then provides the resultant transmission frame to the transmitting unit 203. The signal detection unit 1902 measures the power level of a signal delivered from the wireless unit 202 to the receiving unit 204. If the measured power level is equal to or greater than a preset threshold, the signal detection unit 1902 determines that a signal has been detected. The signal detected by the signal detection unit 1902 is demodulated by the receiving unit 204. The CRC operation unit 1903 performs a CRC operation on the demodulated signal.

Figure 20A:
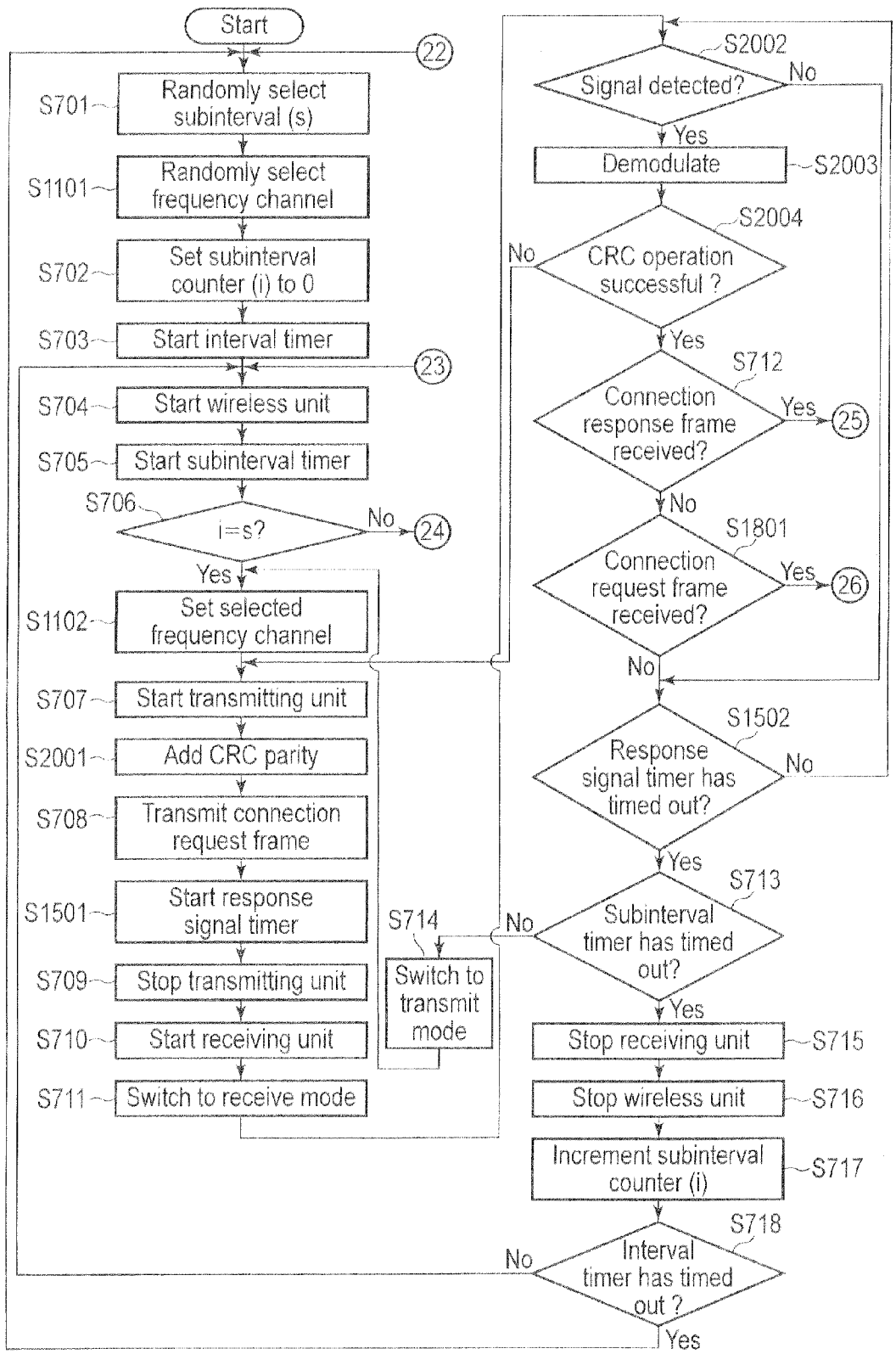
FIG. 20A and FIG. 20B are a series of flowcharts illustrating an example of a connection trial process carried out by the wireless communication apparatus shown in FIG. 19.
Figure 20B:
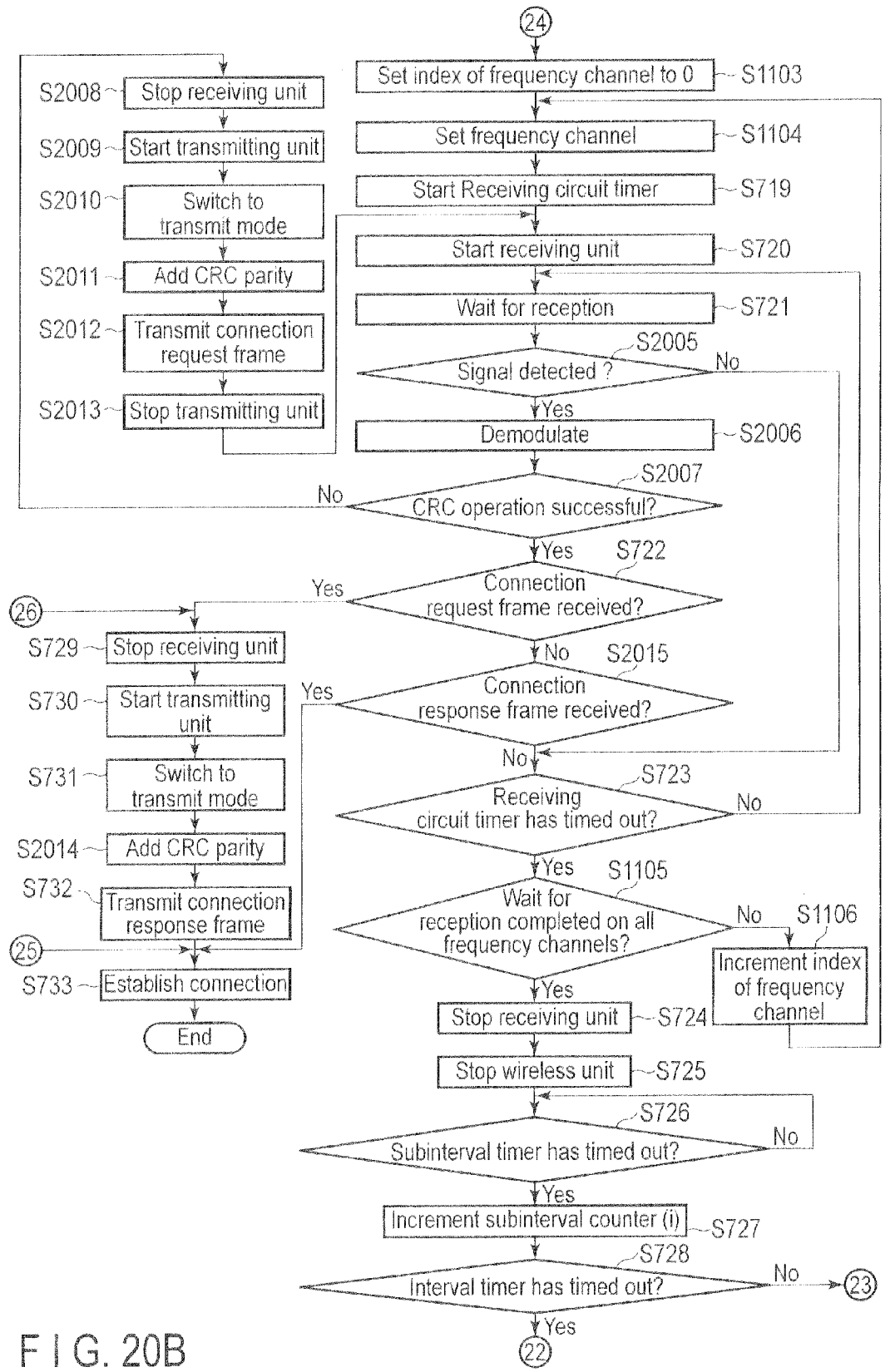

FIG. 20A and FIG. 20B illustrate an example of a connection trial process carried out by the wireless communication apparatus 1900. The same units and portions in FIG. 20A and FIG. 20B as those in FIG. 18A and FIG. 18B are denoted by reference numerals similar to those shown in FIG. 18A and FIG. 18A. Description of these units and portions is appropriately omitted.

As shown in FIG. 20A, when started by the user, the wireless communication apparatus 1900 begins a connection trial process. When the connection trial process is begun, first, the control unit 205 starts the interval timer 207. In the present embodiment, when the first time interval elapses from the starting of the interval timer 207, the timer 207 outputs a timeout signal to the subinterval selection unit 208 and the frequency channel selection unit 1002. Upon receiving the timeout signal from the interval timer 207, the subinterval selection unit 208 randomly selects a subinterval from the plurality of subintervals (step S701). As described above, the subinterval selection unit 208 randomly selects one index s from the indices of 0 to 3 and provides the selected index s to the control unit 205.

Then, upon receiving the timeout signal from the interval timer 207, the frequency channel selection unit 1002 randomly selects a frequency channel from a plurality of predetermined frequency channels (step S1101). In the present embodiment, the number of the frequency channels used is four, and the four frequency channels are indexed with 0, 1, 2, and 3, respectively. In this case, the frequency channel selection unit 1002 randomly selects one of the indices of 0 to 3, that is, the index f. The selected index f is delivered to the control unit 205.

Upon receiving the index s of the subinterval and the index f of the frequency channel, the control unit 205 sets the subinterval counter i to zero (step S702). Moreover, the control unit 205 starts the interval timer 207 (step S703), the wireless unit 202 (step S704), and the subinterval timer 206 (step S705).

Then, the control unit 205 determines whether or not the index s selected in step S701 is equal to the subinterval counter i (step S706). If the selected index s is equal to the subinterval counter i, the process proceeds to step S1102. If the selected index is different from the subinterval counter i, the process proceeds to step S1103 in FIG. 20B.

If the selected index s is equal to the subinterval counter i, the control unit 205 provides the index f of the frequency channel selected in step S1101 to the frequency channel switching unit 1001. The frequency channel switching unit 1001 switches the frequency channel used by the wireless unit 202 to the frequency channel with the index f (step S1102). The control unit 205 starts the transmitting unit 203 (step S707).

Then, the CRC parity addition unit 1901 adds a CRC parity code to a connection request frame (step S2001). The transmitting unit 203 transmits the connection request frame with the CRC parity added thereto, via the wireless unit 202 and the antenna 201 (step S708).

After the transmitting unit 203 transmits the connection request signal, the control unit 205 starts the response signal timer (step S1501). Moreover, the control unit 205 stops the transmitting unit 203 (step S709) and starts the receiving unit 204 (step S710). The control unit 205 further switches the wireless unit 202 to the receive mode (step S711). Thus, the receiving unit 204 starts to wait to receive a connection response frame provided in response to the connection request frame transmitted in step S708.

Then, the control unit 205 determines whether or not the signal detection unit 1902 has detected a signal during a wait for reception of a connection response frame (step S2002). If the signal detection unit 1902 has not detected a signal, the process proceeds to step S2003. If the signal detection unit 1902 has failed to detect a signal, the process proceeds to step S1502.

If the signal detection unit 1902 detects a signal in step S2002, the receiving unit 204 carries out a demodulation process on the detected signal (step S2003). Subsequently, the CRC operation unit 1903 performs a CRC operation on the demodulated signal to determine whether or not the CRC operation has been successful (step S2004). If the result of the CRC operation indicates a reception error, the process returns to step S707. If the CRC operation has been successful, the process proceeds to step S712. The control unit 205 then determines whether or not the signal detected in step S2002 is a connection response frame provided in response to the connection request frame transmitted in step S708 (step S712). If the signal detected in step S2002 is a connection response frame, the process proceeds to step S733 in FIG. 20B, where a wireless connection is established (step S733).

If the signal detected in step S2002 is determined not to be a connection response frame in step S712, the control unit 205 determines whether or not the signal is a connection request frame from another wireless communication apparatus (step S1801). If the signal is a connection request frame from another wireless communication apparatus, the process proceeds to step S729 in FIG. 20B. Otherwise the process proceeds to step S1502.

In step S729 in FIG. 20B, the control unit 205 stops the receiving unit 204. Moreover, the control unit 205 starts the transmitting unit 203 (step S730) and switches the wireless unit 202 to the transmit mode (step S731). Then, the CRC parity addition unit 1901 adds a CRC parity code to a connection response frame (step S2014). The transmitting unit 203 then transmits the connection response frame (step S732). When the other wireless communication apparatus receives the connection response frame, a wireless connection is established (step S733).

If the signal received in step S1801 is determined not to be a connection request frame, the process proceeds to step S1502. The control unit 205 determines whether or the response signal timer 1401 has timed out (step S1502). If the response signal timer 1401 has not timed out, the process returns to step S2002. If the response signal timer 1401 has timed out, the process proceeds to step S713.

Processing in step S713 and the subsequent steps in FIG. 20A is the same as that described above with reference to FIG. 7A and will not be described below.

On the other hand, in step S706, if the index s of the subinterval selected by the subinterval selection unit 208 is not equal to the subinterval counter i, the process proceeds to step S1103. The control unit 205 sets the index of the frequency to zero (step S1103). The control unit 205 then provides the set index to the frequency channel switching unit 1001. The frequency channel switching unit 1001 sets the frequency channel with the index received from the control unit 205, for the wireless unit 202 (step S1104). Then, the control unit 205 starts the receiving circuit timer 601 (step S719) and the receiving unit 204 (step S720). The receiving unit 204 waits to receive a connection request frame from another wireless communication apparatus (step S721).

Then, the control unit 205 determines whether or not the signal detection unit 1902 has detected a signal (step S2005). If the signal detection unit 1902 has not detected a signal, the process proceeds to step S723. Then, the receiving unit 204 waits for reception until the receiving circuit timer 601 times out.

In step S2005, if the signal detection unit 1902 detects a signal, the receiving unit 204 carries out a demodulation process on the signal (step S2006). The CRC operation unit 1903 performs a CRC operation on the demodulated signal to determine whether or not the CRC operation has been successful (step S2007). If the CRC operation has been successful, the control unit 205 determines whether or not the frame received by the receiving unit 204 is a connection request frame (step S722). If the frame received by the receiving unit 204 is not a connection request frame, the control unit 205 determines whether or not the frame is a connection response frame (step S2015). If the frame received by the receiving unit 204 is not a connection response frame, the control unit 205 determines whether or not the receiving circuit timer 601 has timed out (step S723). If the receiving circuit timer 601 has not timed out, the process returns to step S721. The receiving unit 204 continues to wait to receive a connection request frame until the receiving circuit timer 601 times out.

If the receiving circuit timer 601 has timed out, the process proceeds to step S1105. Processing in step S1105 and the subsequent steps in FIG. 20B is the same as that described above with reference to FIG. 7B and FIG. 11B and will not be described below.

In step S722, if the receiving unit 204 receives a connection request frame, the control unit 205 stops the receiving unit 204 (step S729). Moreover, the control unit 205 starts the transmitting unit 203 (step S730), and switches the wireless unit 202 to the transmit mode (step S731). Then, the CRC parity addition unit 1901 adds a CRC parity code to a connection response frame (step S2014). The transmitting unit 203 transmits the connection response frame (step S732). When the other wireless communication apparatus receives the connection response frame from wireless communication apparatus 1900, a wireless connection is established (step S733).

Furthermore, in step S2007, if the result of the CRC operation indicates a reception error, the process proceeds to step S2008. The control unit 205 stops the receiving unit 204 (step S2008), and starts the transmitting unit 203 (step S2009). The control unit 205 further switches the wireless unit 202 to the transmit mode (step S2010). Then, the CRC parity addition unit 1901 adds a CRC parity code to a connection request frame (step S2011). The transmitting unit 203 transmits the connection request frame with the CRC parity code added thereto (step S2012). As described above, if a reception error results from the reception of a connection request frame from the other wireless communication apparatus, the wireless communication apparatus 1900 transmits a connection request frame to the other wireless communication apparatus.

Upon completing the transmission of the connection request frame, the control unit 205 stops the transmitting unit 203 (step S2013). The control unit 205 further starts the receiving unit 204 (step S720), and switches the wireless unit 202 to the receive mode. The receiving unit 204 waits to receive a connection response frame provided in response to the connection request frame transmitted in step S2012 (step S721). The signal detection unit 1902 detects a signal (step S2005), and the receiving unit 204 demodulates the signal (step S2006). The CRC operation unit 1903 performs a CRC operation on the demodulated signal (step S2007). When the CRC operation is successful, the control unit 205 determines whether or not the received signal is a connection request frame (step S722). If the received signal is a connection request frame, the process proceeds to step S729. Otherwise the process proceeds to step S2015. The control unit 205 determines whether or not the received signal is a connection response frame provided in response to the connection request frame transmitted in step S2012 (step S2015). When the signal received in step S2015 is determined to be a connection response frame provided in response to the connection request frame transmitted in step S2012, a wireless connection is established (step S733).

As described above, the wireless communication apparatus according to the present embodiment adds a CRC parity code to a connection request frame and transmits the connection request frame with the CRC parity code added thereto. The wireless communication apparatus further performs a CRC operation on a frame received from another wireless communication apparatus. If a reception error occurs when the wireless communication apparatus receives a connection request frame from another wireless communication apparatus, the wireless communication apparatus having failed to receive the connection request frame transmits a connection request frame to the other wireless communication apparatus. This allows a wireless connection to be established without delay.

Eighth Embodiment

FIG. 21 schematically shows a wireless communication apparatus 2100 according to an eighth embodiment. The wireless communication apparatus 2100 includes a power supply control unit 2101 in addition to the components of the wireless communication apparatus 1900 shown in FIG. 19. The power supply control unit 2101 controls a power supply for a transceiver unit 2102. Here, the transceiver unit 2102 includes the wireless unit 202, the transmitting unit 203, the receiving unit 204, the control unit 205, the subinterval selection unit 208, the receiving circuit timer 601, the frequency channel switching unit 1001, the frequency channel selection unit 1002, the response signal timer 1401, the CRC parity addition unit 1901, the signal detection unit 1902, and the CRC operation unit 1903.

Figure 22A:
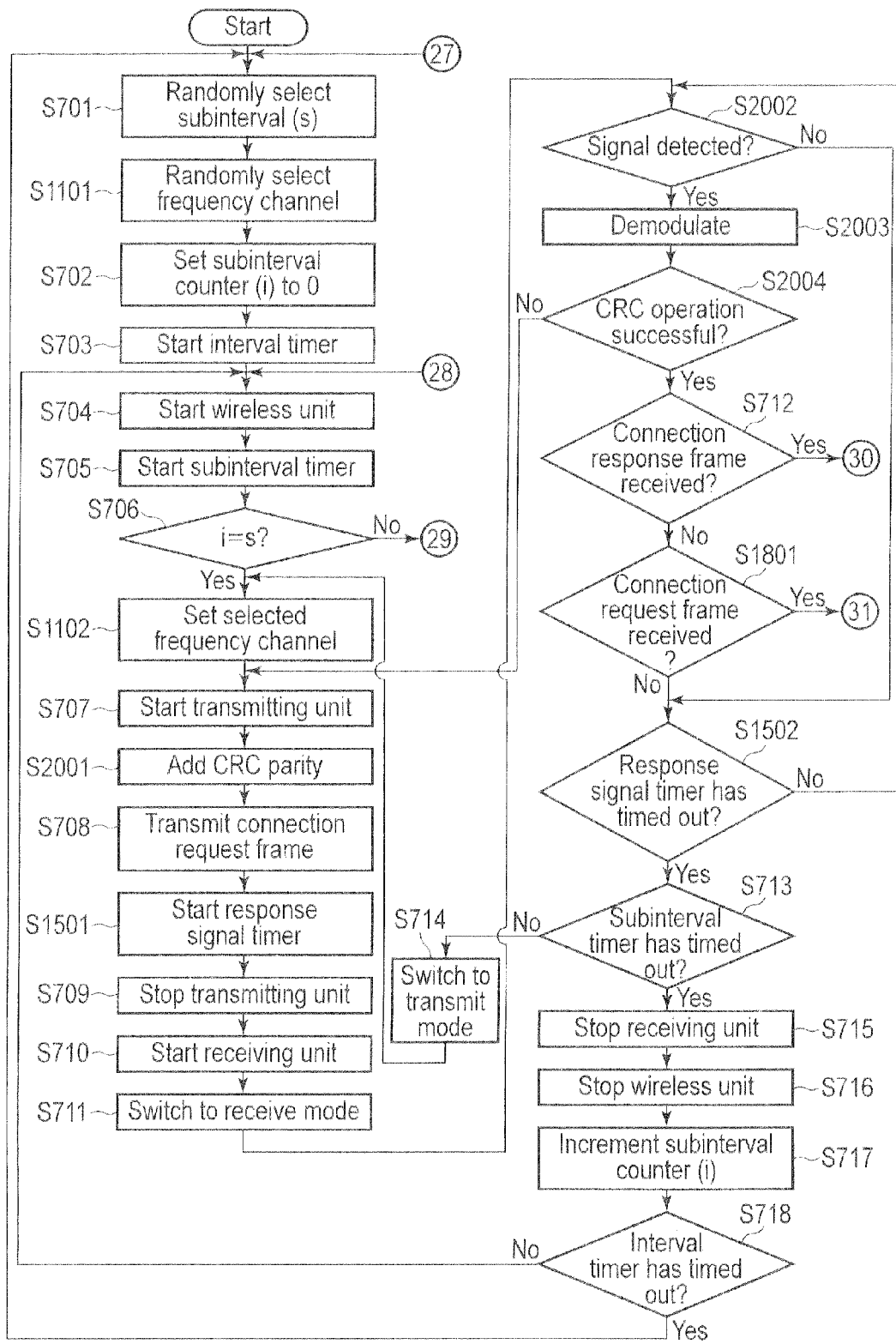
FIG. 22A and FIG. 22B are a series of flowcharts illustrating an example of a connection trial process carried out by the wireless communication apparatus shown in FIG. 21.
Figure 22B:
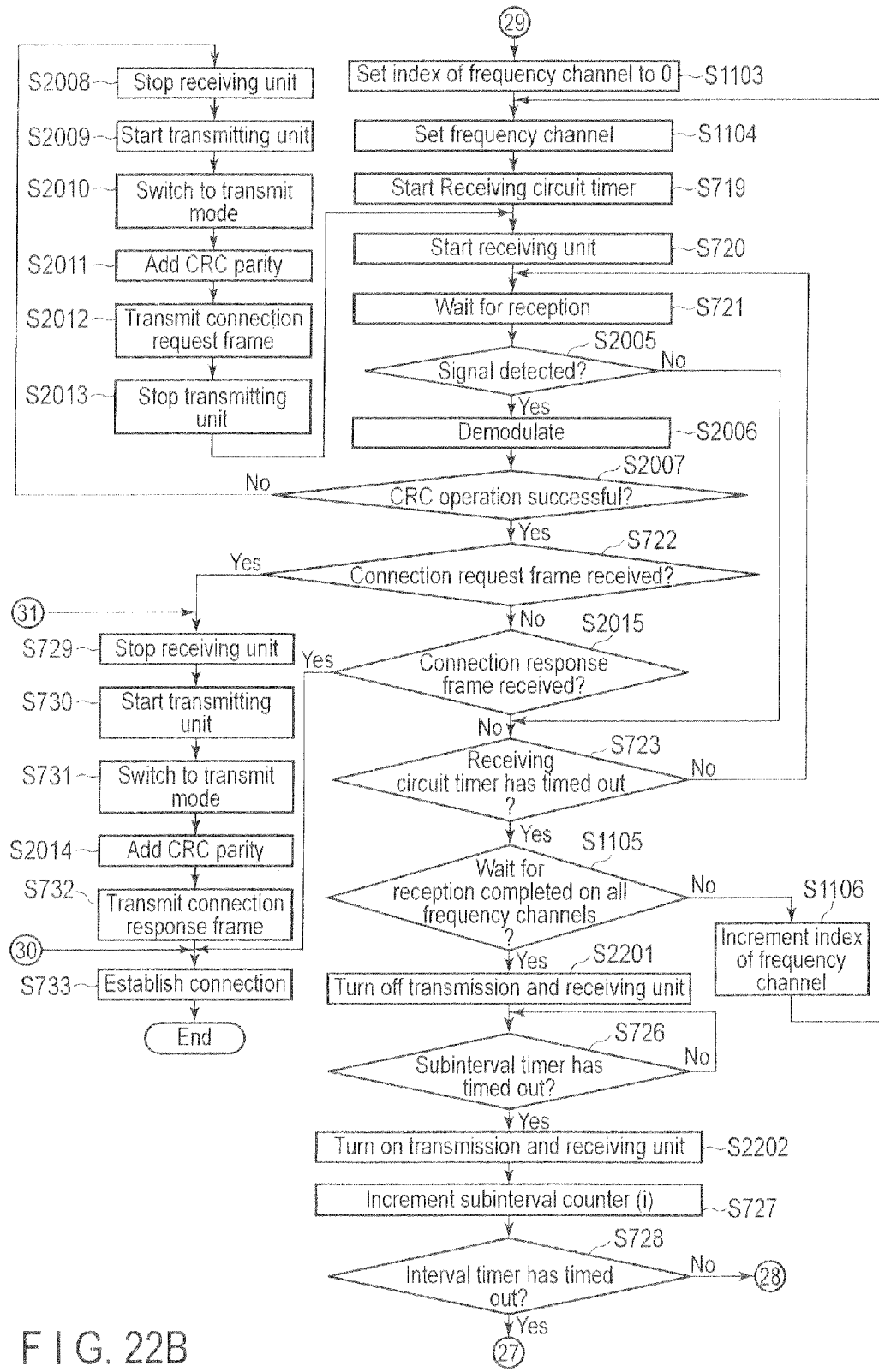

FIG. 22A and FIG. 22B show an example of a connection trial process carried out by the wireless communication apparatus 2100. Processing in FIG. 22A is the same as that described above with reference to FIG. 20A and will not be described below. Furthermore, the same units and portions in FIG. 22B as those in FIG. 20B are denoted by reference numerals similar to those shown in FIG. 20B, and will not be described. In FIG. 22B, step S2201 is additionally carried out between steps S1105 and S726. Step S2202 is additionally carried out between steps S726 and S727.

During each of the subintervals other than the one selected in step S701, when a wait for reception is completed on all the frequency channels, the control unit 205 transmits a signal indicative of completion of a wait for reception to the power supply control unit 2101. The process proceeds to step S2201. Upon receiving the signal from the control unit 205, the power supply control unit 2101 stops supplying power to the transceiver unit 2102.

In step S726 according to the present embodiment, the power supply control unit 2101 determines whether or not the subinterval timer 206 has timed out. The power supply control unit 2101 receives a timeout signal from the subinterval timer 206 to recognize that the subinterval timer 206 has timed out. Once the subinterval timer 206 times out, the power supply control unit 2101 starts supplying power to the transceiver unit 2102 (step S2202).

Then, the control unit 205 increments the subinterval counter i (step S727), and determines whether or not the interval timer 207 has timed out (step S728). If the interval timer has timed out, the process returns to step S701 in FIG. 22A. If the interval timer has not timed out, the process returns to step S704 in FIG. 22A.

As described above, the wireless communication apparatus according to the present embodiment turns off the power supply to elements that need not operate. This allows power consumption to be reduced.

Ninth Embodiment

Figure 23:
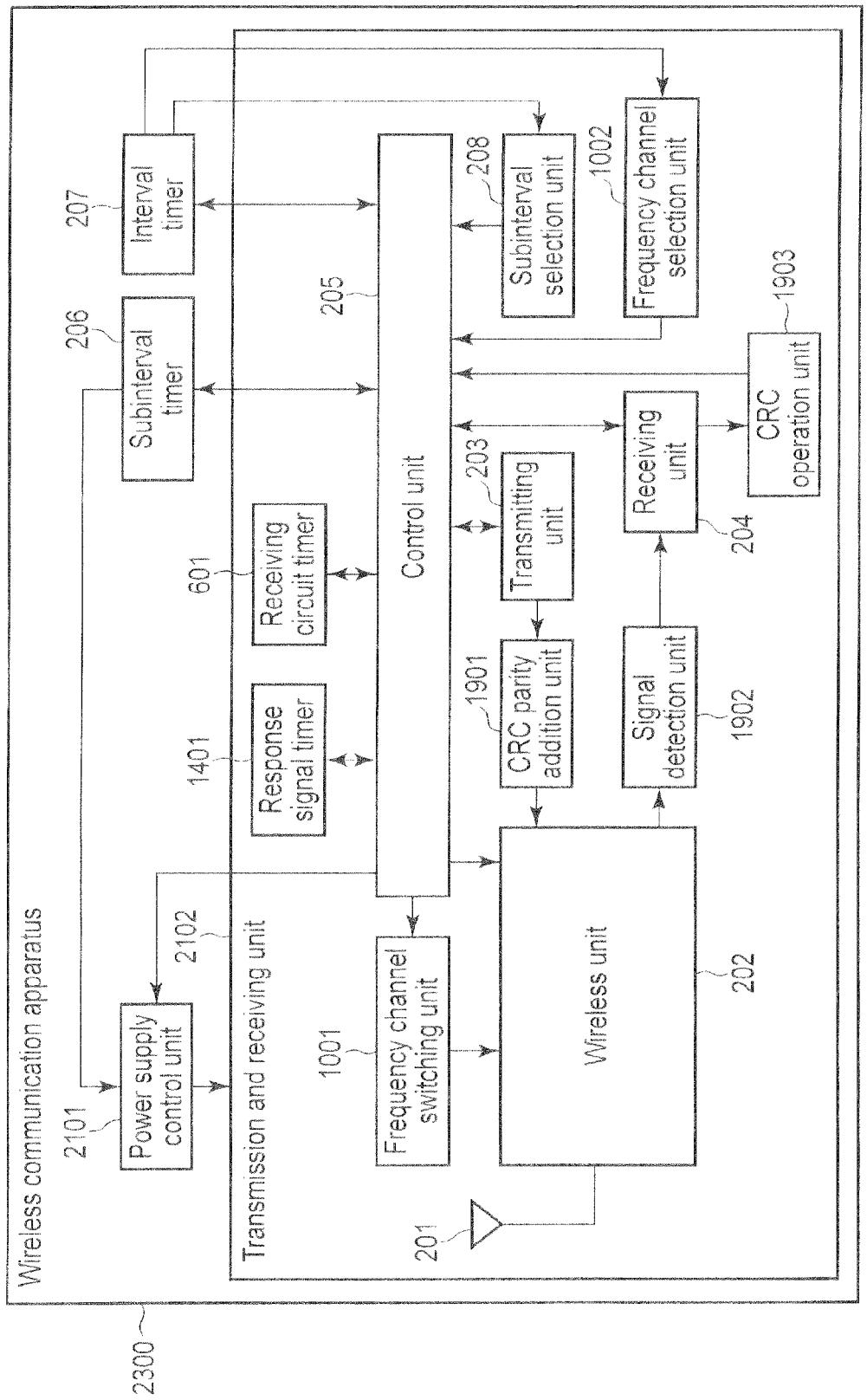
FIG. 23 is a block diagram schematically showing a wireless communication apparatus according to a ninth embodiment.

FIG. 23 schematically shows a wireless communication apparatus 2300 according to a ninth embodiment. The wireless communication apparatus 2300 is configured similarly to the wireless communication apparatus 2100 shown in FIG. 21. The wireless communication apparatus 2300 in FIG. 23 is different from the wireless communication apparatus 2100 in FIG. 21 in that in the wireless communication apparatus 2300, the antenna 201 is included in the transceiver unit 2102. When the antenna 201 is thus included in the wireless communication apparatus 2300, the wireless communication apparatus 2300 can be configured into a single apparatus including the antenna. This enables a footprint to be reduced. Furthermore, in the wireless communication apparatus 2300 in FIG. 23, the antenna 201 is used both for a transmission process and for a reception process. When the antenna 201 is thus used both for a transmission process and for a reception process, the wireless communication apparatus can be downsized.

Tenth Embodiment

FIG. 24 schematically shows a wireless communication apparatus 2400 according to a tenth embodiment. The wireless communication apparatus 2400 includes a buffer 2401 that temporarily stores various types of data, in addition to the components of the wireless communication apparatus 2300 shown in FIG. 23. The buffer 2401 is connected to the transmitting unit 203 and the receiving unit 204. Since the wireless communication apparatus 2400 includes the buffer 2401, transmit data and receive data can be held in the buffer 2401. As a result, a retransmission process and an external output process can be easily carried out.

Eleventh Embodiment

FIG. 25 schematically shows a wireless communication apparatus according to an eleventh embodiment. The wireless communication apparatus 2500 includes a bus 2501, a processor unit 2502, and an external interface unit 2503 in addition to the components of the wireless communication apparatus 2400 shown in FIG. 24. The processor unit 2502 and the external interface unit 2503 are connected to the buffer 2401 via the bus 2501. Firmware runs on the processor unit 2502. When the firmware is thus provided in the wireless communication apparatus 2500, the functions of the wireless communication apparatus 2500 can be easily changed by changing the firmware.

Twelfth Embodiment

FIG. 26 schematically shows a wireless communication apparatus 2600 according to a twelfth embodiment. The wireless communication apparatus 2600 includes a clock generation unit 2601 that generates clock signals, in addition to the components of the wireless communication apparatus 2500 shown in FIG. 25. The clock generation unit 2601 is connected to the power supply control unit 2101, the transceiver unit 2102, the subinterval timer 206, and the interval timer 207. The clock generation unit 2601 is also connected to an external device through an output terminal. Thus, when clock signals generated inside the wireless communication apparatus 2600 are output to a host device so that the host device operates based on the clock signals, the host device and the wireless communication apparatus can operate in synchronism.

Thirteenth Embodiment

FIG. 27 schematically shows a wireless communication apparatus 2700 according to a thirteenth embodiment. The wireless communication apparatus 2700 includes a power supply unit 2701 and a wireless power receiver 2702 in addition to the components of the wireless communication apparatus 2500 shown in FIG. 25. The power supply unit 2701 is connected to the power supply control unit 2101 and the transceiver unit 2102. Furthermore, the power feeding unit 2702 is connected to the power supply control unit 2101 and the transceiver unit 2102. Thus, when including a power source with the power supply unit 2701 and the power feeding unit 2702, the wireless communication apparatus 2700 can control the power source so as to operate with reduced power consumption.

Fourteenth Embodiment

FIG. 28 schematically shows a wireless communication apparatus 2800 according to a fourteenth embodiment. The wireless communication apparatus 2800 includes a near-field communication (NEC) transceiver unit 2801 in addition to the components of the wireless communication apparatus 2700 shown in FIG. 27. The NEC transceiver unit 2801 is connected to the power supply control unit 2101 and the control unit 205. Thus, the NFC transceiver unit 2801 provided in the wireless communication apparatus 2800 enables an authentication process to be easily carried out. Furthermore, the power consumption during a wait for reception can be reduced by using the NEC transceiver unit 2801 as a trigger to control the power supply.

Fifteenth Embodiment

FIG. 29 schematically shows a wireless communication apparatus 2900 according to a fifteenth embodiment. The wireless communication apparatus 2900 includes a SIM card 2901 in addition to the components of the wireless communication apparatus 2700 shown in FIG. 27. The SIM card 2901 is connected to the control unit 205. Thus, the SIM card 2901 provided in the wireless communication apparatus 2700 enables an authentication process to be easily carried out.

Sixteenth Embodiment

FIG. 30 schematically shows a wireless communication apparatus 3000 according to a sixteenth embodiment. The wireless communication apparatus 3000 includes a moving image compression/decompression unit 3001 in addition to the components of the wireless communication apparatus 2500 shown in FIG. 25. The moving image compression/decompression unit 3001 is connected to the bus 2501. Thus, the moving image compression/decompression unit 3001 provided in the wireless communication apparatus 3000 enables a compressed moving image to be easily transmitted and further enables the received compressed moving image to be easily decompressed.

Seventeenth Embodiment

Figure 31:
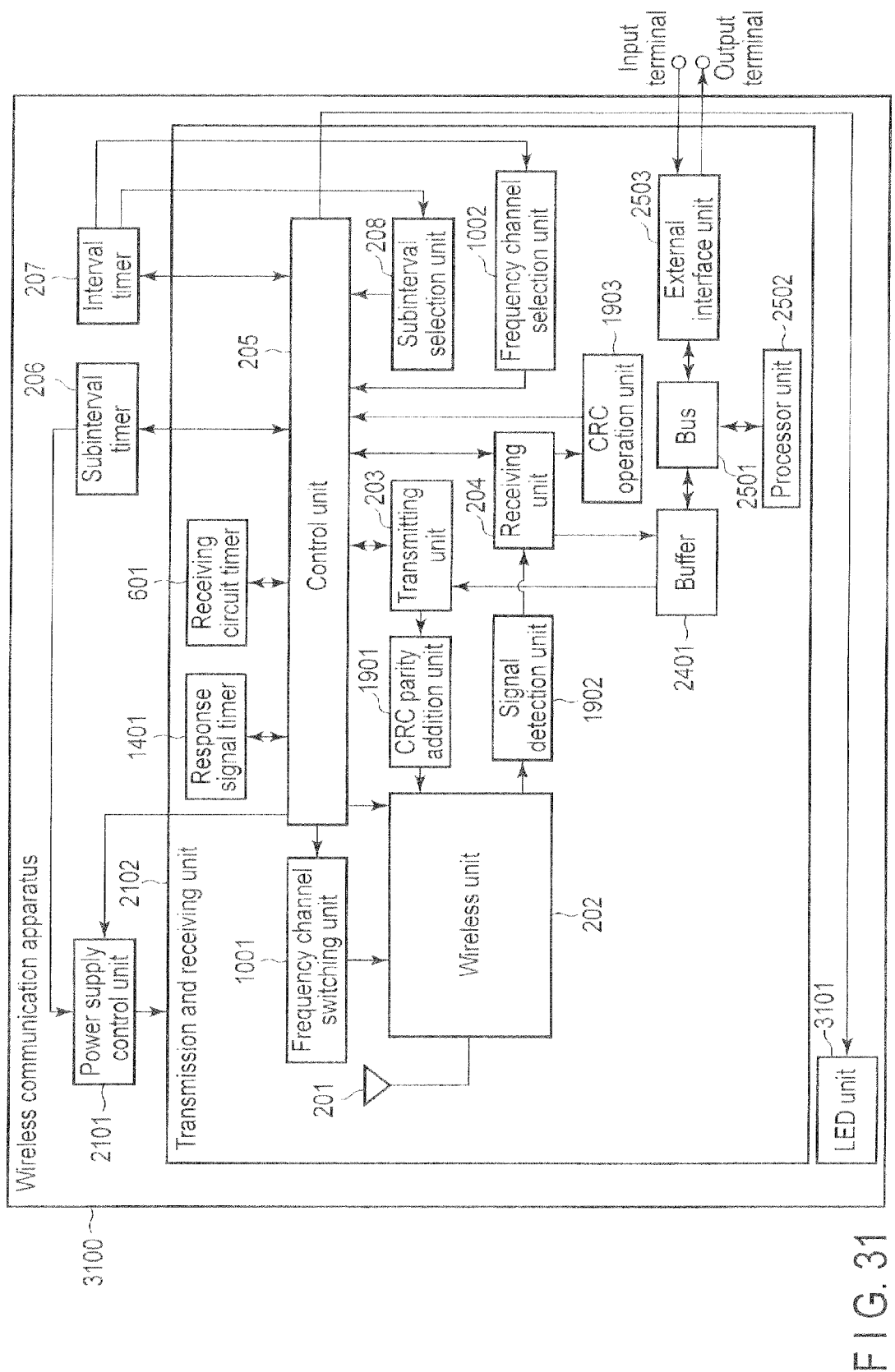
FIG. 31 is a block diagram schematically showing a wireless communication apparatus according to a seventeenth embodiment.

FIG. 31 schematically shows a wireless communication apparatus 3100 according to a seventeenth embodiment. The wireless communication apparatus 3100 includes a light-emitting diode (LED) unit 3101 in addition to the components of the wireless communication apparatus 2500 shown in FIG. 25. The LED unit 3101 notifies the user of the operational state of the wireless communication apparatus 3100. The LED unit 3101 is connected to the control unit 205. Thus, the LED unit 3101 provided in the wireless communication apparatus 3100 enables the user to be easily notified of the operational state of the wireless communication apparatus 3100.

Eighteenth Embodiment

FIG. 32 schematically shows a wireless communication apparatus 3200 according to an eighteenth embodiment. The wireless communication apparatus 3200 includes a vibrator unit 3201 in addition to the components of the wireless communication apparatus 2500 shown in FIG. 25. The vibrator unit 3201 notifies the user of the operational state of the wireless communication apparatus 3200 by vibration. The vibrator unit 3201 is connected to the control unit 205. Thus, the vibrator unit 3201 provided in the wireless communication apparatus 3200 enables the user to be easily notified of the operational state of the wireless communication apparatus 3200.

Nineteenth Embodiment

FIG. 33 schematically shows a wireless communication apparatus 3300 according to a nineteenth embodiment. The wireless communication apparatus 3300 includes a wireless LAN unit 3301 and a wireless switching unit 3302 in addition to the components of the wireless communication apparatus 2500 shown in FIG. 25. The wireless switching unit 3302 is connected to the control unit 205 and the wireless LAN unit 3301. Since the wireless communication apparatus 3300 is provided with the transceiver unit 2102 and the wireless LAN unit 3301, communication based on the wireless LAN and communication based on the transceiver unit 2102 can be switched depending on the situation.

Twentieth Embodiment

FIG. 34 schematically shows a wireless communication apparatus 3400 according to a twentieth embodiment. The wireless communication apparatus 3400 includes a switch (SW) 3401 in addition to the components of the wireless communication apparatus 3300 shown in FIG. 33. The switch 3401 switches a connection target of the antenna 201 between the wireless unit 202 and the wireless LAN unit 3301. Thus, the switch 3401 provided in the wireless communication apparatus 3400 enables the communication based on the wireless LAN and the communication based on the transceiver unit 2102 to be switched depending on the situation, with the antenna used both for transmission and for reception.

According to at least one on the above-described embodiments, there is provided a wireless communication apparatus allowing a wireless connection to be established without the need to individually set operation modes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
a first timer configured to measure first time intervals;
a second timer configured to measure second time intervals, each first time interval including a plurality of the second time intervals;
a third timer configured to measure third time intervals within the second time intervals, each third time interval being shorter than the second time intervals;
a time interval selection unit configured to select a second time interval among the second time intervals in each first time interval, a time position of the selected second time interval being any one of time positions included in each of the first time intervals;
a transmitting unit configured to transmit a first response signal to respond to a first connection request signal transmitted by another wireless communication apparatus, and to transmit a second connection request signal to establish a wireless connection;
a receiving unit configured to receive a second response signal provided in response to the second connection request signal, and to receive the first connection request signal; and
a control unit configured to control the transmitting unit and the receiving unit to operate, during the selected second time interval, in a first operational state in which a transmission of the second connection request signal and a wait for reception of the second response signal are repeatedly performed, and to operate, during each of the second time intervals other than the selected second time interval, in a second operational state which is different from the first operational state and in which a wait for reception of the first connection request signal is performed for the third time interval within each of the second time intervals other than selected second time interval.

2. The apparatus according to claim 1, further comprising a frequency channel selection unit configured to select a frequency channel from a plurality of predetermined frequency channels,
wherein in the first operational state, the transmitting unit transmits the second connection request signal on the selected frequency channel and the receiving unit waits to receive the second response signal on the selected frequency channel, and
in the second operational state, the receiving unit waits to receive the first connection request signal for the third time interval on each of the predetermined frequency channels.

3. The apparatus according to claim 1, further comprising a fourth timer configured to measure a fourth time interval corresponding to a period during which the receiving unit waits to receive the second response signal,
wherein a unit time interval during which the transmission of the second connection request signal and the wait for reception of the second response signal are performed, includes a period required to transmit the second connection request signal, the fourth time interval, and a period required to switch from a receive mode to a transmit mode.

4. The apparatus according to claim 3, wherein the third time interval is equal to or longer than a total of the period required to transmit the second connection request signal, the fourth time interval, and the period required to switch from the receive mode to the transmit mode.

5. The apparatus according to claim 1, wherein when the receiving unit receives the first connection request signal from another wireless communication apparatus while waiting to receive the second response signal, the transmitting unit transmits the first response signal in response to the received first connection request signal.

6. The apparatus according to claim 1, further comprising:
a signal detection unit configured to detect that the receiving unit has received a signal; and
a CRC operation unit configured to perform a cyclic redundancy check (CRC) operation on the received signal,
wherein if the CRC operation unit determines that a reception error of the received signal occurs, the transmitting unit transmits the second connection request signal.

7. The apparatus according to claim 1, further comprising:
a power supply control unit configured to control a power supply to a transceiver unit, the transceiver unit including the transmitting unit, the receiving unit, the control unit, and the third timer,
wherein in each of the second time intervals other than the selected second time interval, the power supply control unit stops a power supply to the transceiver unit during at least a part of a period from a time when a latest third time interval of third time intervals set for each of predetermined frequency channels is over until a time when each of the second time intervals other than the selected second time interval is over.

8. A wireless communication apparatus comprising:
a first timer configured to measure first time intervals;
a second timer configured to measure second time intervals, each first time interval including a plurality of the second time intervals;
a time interval selection unit configured to select a second time interval among the second time intervals in each first time interval, a time position of the selected second time interval being any one of time positions included in each of the first time intervals;
a transmitting unit configured to transmit a first response signal to respond to a first connection request signal transmitted by another wireless communication apparatus, and to transmit a second connection request signal to establish a wireless connection;
a receiving unit configured to receive a second response signal provided in response to the second connection request signal and to receive the first connection request signal; and
a control unit configured to control the transmitting unit and the receiving unit to operate, during each of the second time intervals other than the selected second time interval, in a first operational state in which a transmission of the second connection request signal is executed at least once, and to operate, during the selected second time interval, in a second operational state which is different from the first operational state and in which a wait for reception of the first connection request signal is performed.

9. A wireless communication method comprising:
measuring first time intervals;
measuring second time intervals, each first time interval including a plurality of the second time intervals;
measuring third time intervals within the second time intervals, each third time interval being shorter than the second time intervals;
selecting a second time interval among the second time intervals in each first time interval, a time position of the selected second time interval being any one of time positions included in each of the first time intervals;
during the selected second time interval, executing a first operational state comprising transmitting a connection request signal to establish a wireless communication and waiting to receive a response signal provided in the connection request signal; and
during each of the second time intervals other than the selected second time interval, executing a second operational state that is different from the first operational state, the second operational state comprising waiting to receive a connection request signal transmitted by another wireless communication apparatus for the third time interval within each of the second time intervals other than the selected second time interval.

* * * * *